United States Patent [19]

Mattes et al.

[11] Patent Number: 4,591,967
[45] Date of Patent: May 27, 1986

[54] DISTRIBUTED DRUM EMULATING PROGRAMMABLE CONTROLLER SYSTEM

[75] Inventors: Donald A. Mattes, Lincoln, Mass.; Steven G. Landry, Litchfield; James M. Kendall, Nashua, both of N.H.

[73] Assignee: Andover Controls Corporation, Andover, Mass.

[21] Appl. No.: 758,840

[22] Filed: Jul. 25, 1985

Related U.S. Application Data

[63] Continuation of Ser. No. 393,471, Jun. 29, 1982, abandoned.

[51] Int. Cl.[4] .................. G06F 15/46; G06F 15/16
[52] U.S. Cl. ................................... 364/132; 364/200
[58] Field of Search .......................... 364/131–134, 364/140–147, 550, 551, 138, 139, 418, 184, 185, 200 MS File, 900 MS File; 340/825.06, 825.07, 285.08, 825.1, 825.11, 825.13, 825.15, 825.17, 825.22

[56] References Cited

U.S. PATENT DOCUMENTS

| | | | |
|---|---|---|---|
| 3,976,981 | 8/1976 | Bowden | 364/146 X |
| 4,184,205 | 1/1980 | Morrow | 364/550 X |
| 4,213,174 | 7/1980 | Morley et al. | 364/900 X |
| 4,215,398 | 7/1980 | Burkett et al. | 364/139 X |
| 4,244,018 | 1/1981 | Mui | 364/200 |
| 4,249,186 | 2/1981 | Edwards | 364/550 X |
| 4,253,148 | 2/1981 | Johnson et al. | 364/200 |
| 4,303,973 | 12/1981 | Williamson, Jr. et al. | 364/138 X |
| 4,304,001 | 12/1981 | Cope | 364/132 X |
| 4,319,321 | 3/1982 | Anastas et al. | 364/200 |
| 4,347,563 | 8/1982 | Paredes et al. | 364/133 X |
| 4,380,698 | 4/1983 | Butts | 364/132 X |
| 4,424,559 | 1/1984 | Lorincz et al. | 364/138 X |
| 4,459,655 | 7/1984 | Willemin | 364/132 |

OTHER PUBLICATIONS

Swenson–"Alternate Path Control Systems"–IBM Tech. Disc. Bulletin–vol. 16, No. 5, Oct. 1973–pp. 1586–1588.

"Automate 32"–Reliance Electric Co., Cleveland, Ohio, Oct. 1977, pp. 1–8.

*Primary Examiner*—Joseph Ruggiero
*Attorney, Agent, or Firm*—F. Eugene Davis, IV

[57] ABSTRACT

Master units and slave units are preferably housed in identical housings. Each master unit comprises a Central Intelligence Unit (CIU) which in turn comprises a drum processor and a communications processor, and an Input/Output Unit (IOU) having input terminals and relays for connection to external devices. Each slave unit comprises an IOU. Each IOU is connected to its CIU through a Local bus (L-bus). Up to sixteen IOU's may be controlled by a single CIU.

Up to 16 master units may be connected together by means of console bus (C-bus) and a data exchange bus (X-bus), in which case each master unit is given control of specified "X" variables for update. Each "X" variable has a specific time slot on the X-bus and all "X" variables are stored on an X-drum at each master unit.

The C-bus may be connected to a computer terminal at each master for programming of all CIU's, or to computer devices, or to long distance communication lines.

Each IOU monitors continuously 32 identical input ports and maintains in a table the voltage at that port, whether the voltage has gone up or down through preselected voltages and the number of times this has happened since the last interrogation by its CIU on the L-bus. These tables are transmitted upon interrogation to its CIU. The program at the master can therefore interpret each input as a voltage, a switch, or a pulse source. Each IOU employs a digital filter in its program for interpreting the voltage of the inputs.

32 Claims, 30 Drawing Figures

TERMINATION DIAGRAM

UP TO 15 SLAVES PER MASTER

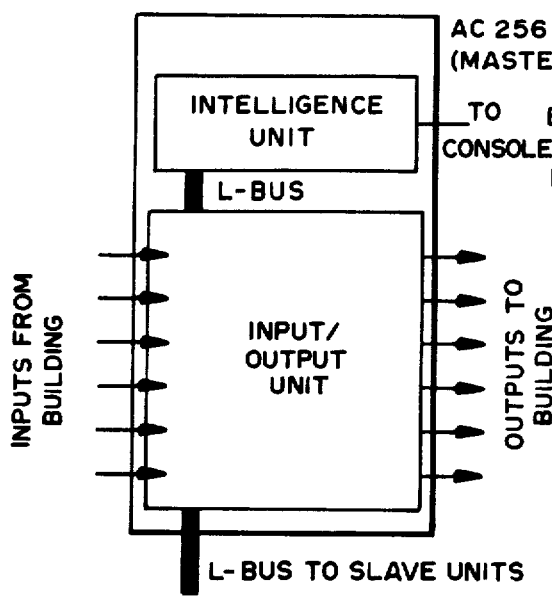
FIG.10
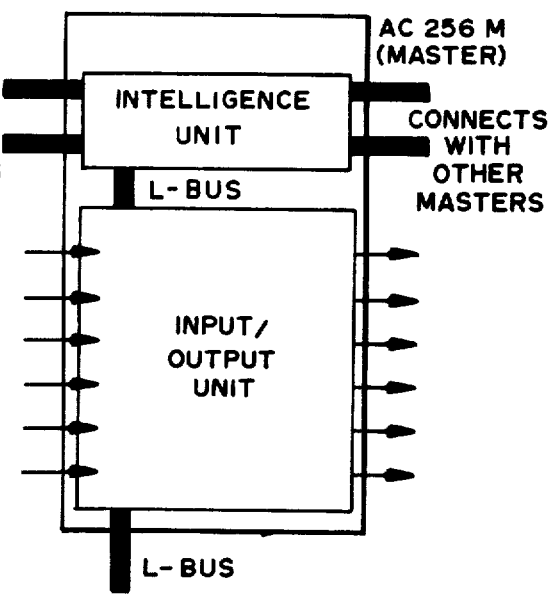
FIG.11
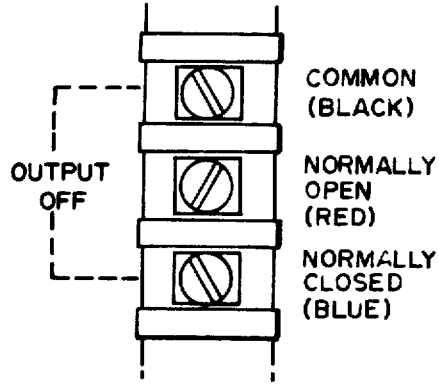
FIG.12
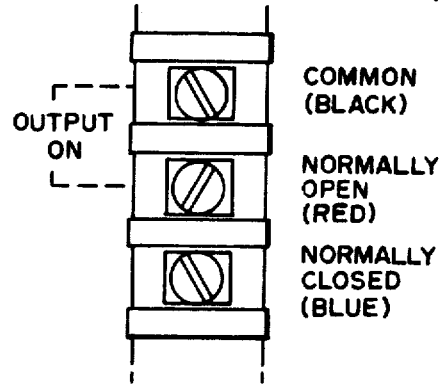
FIG.13
FIG.14
FIG.15
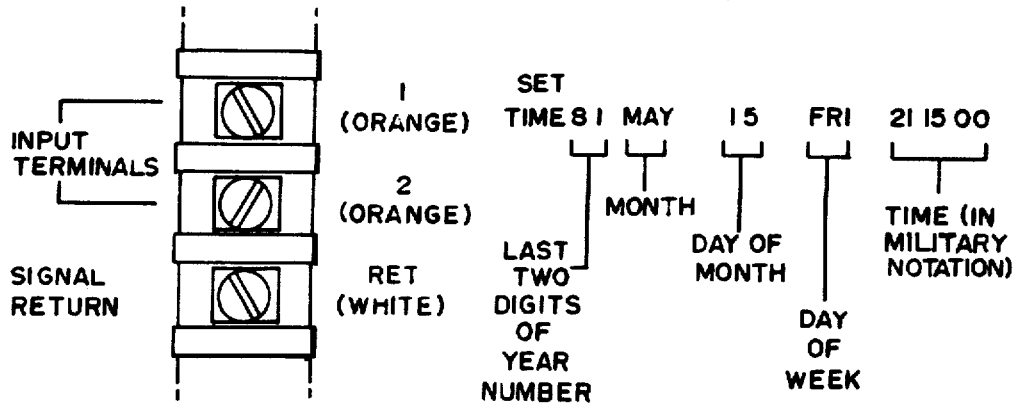

FIG. 16
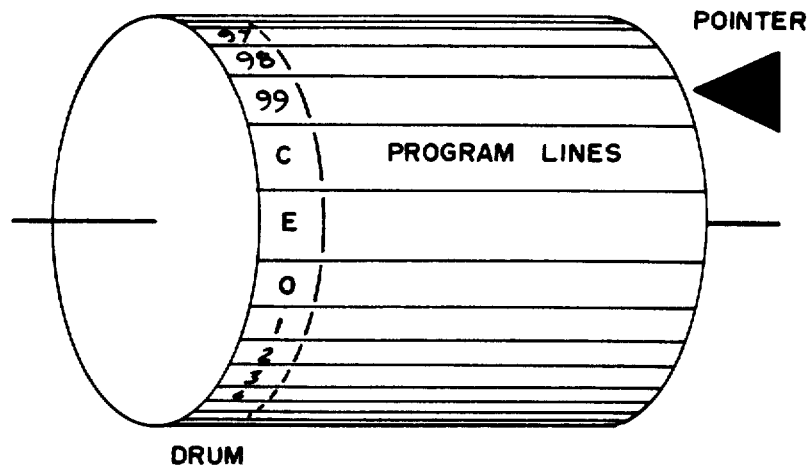
FIG. 17
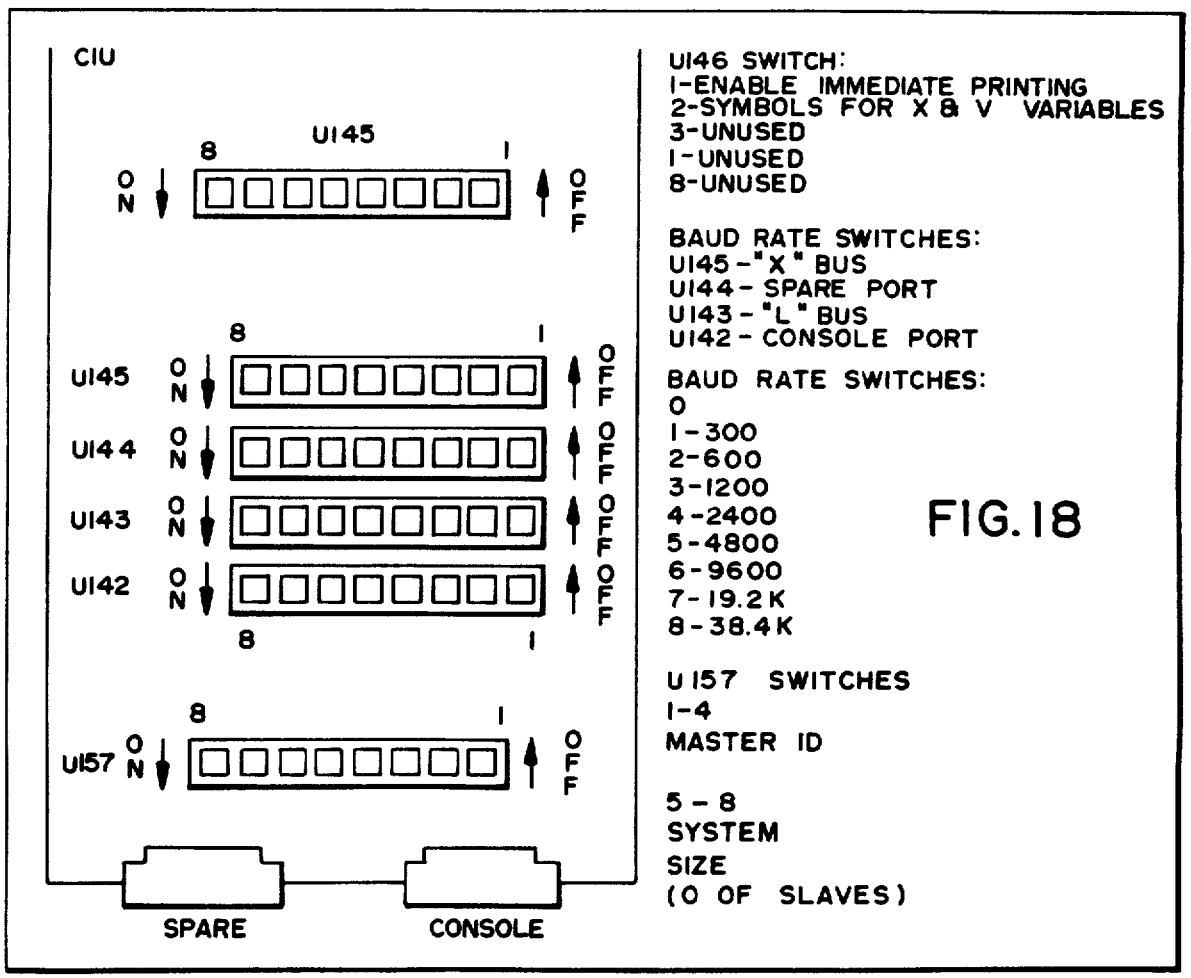
FIG. 18

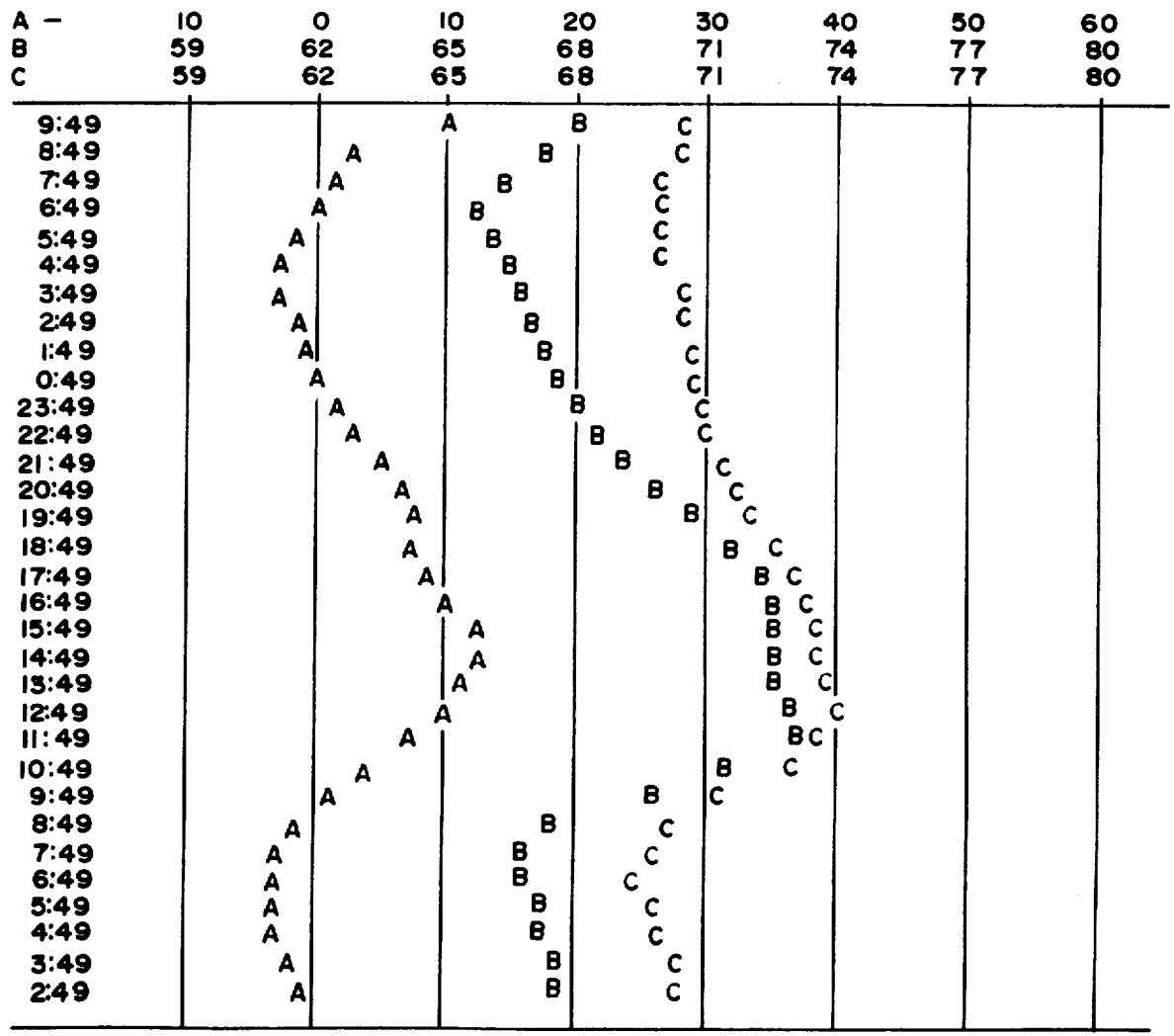

FIG. 21

| DRUM | DEVICE | | | | PURPOSE |
|---|---|---|---|---|---|
| LINE # | SITUATION: | | | | |
| | EFFECT: | | | | |
| 1A) | | 1X) | EXIT | TO LINE | IF |
| 2A) | | 2X) | EXIT | TO LINE | IF |
| 3A) | | 3X) | EXIT | TO LINE | IF |
| 4A) | | 4X) | EXIT | TO LINE | IF |
| 5A) | | 5X) | EXIT | TO LINE | IF |
| LINE # | SITUATION: | | | | |
| | EFFECT: | | | | |
| 1A) | | 1X) | EXIT | TO LINE | IF |
| 2A) | | 2X) | EXIT | TO LINE | IF |
| 3A) | | 3X) | EXIT | TO LINE | IF |
| 4A) | | 4X) | EXIT | TO LINE | IF |
| 5A) | | 5X) | EXIT | TO LINE | IF |
| LINE # | SITUATION: | | | | |
| | EFFECT: | | | | |
| 1A) | | 1X) | EXIT | TO LINE | IF |
| 2A) | | 2X) | EXIT | TO LINE | IF |
| 3A) | | 3X) | EXIT | TO LINE | IF |
| 4A) | | 4X) | EXIT | TO LINE | IF |
| 5A) | | 5X) | EXIT | TO LINE | IF |
| LINE # | SITUATION: | | | | |
| | EFFECT: | | | | |
| 1A) | | 1X) | EXIT | TO LINE | IF |
| 2A) | | 2X) | EXIT | TO LINE | IF |
| 3A) | | 3X) | EXIT | TO LINE | IF |
| 4A) | | 4X) | EXIT | TO LINE | IF |
| 5A) | | 5X) | EXIT | TO LINE | IF |
| LINE # | SITUATION: | | | | |
| | EFFECT: | | | | |
| 1A) | | 1X) | EXIT | TO LINE | IF |
| 2A) | | 2X) | EXIT | TO LINE | IF |
| 3A) | | 3X) | EXIT | TO LINE | IF |
| 4A) | | 4X) | EXIT | TO LINE | IF |
| 5A) | | 5X) | EXIT | TO LINE | IF |

DISTRIBUTED DRUM EMULATING PROGRAMMABLE CONTROLLER SYSTEM

This application is a continuation of application Ser. No. 393,471, filed 6/29/82.

TECHNICAL FIELD

This invention relates to a distributed drum emulating programmable controller system, particularly for use in energy management. The system is a sequence controller utilizing drum emulation and the programming philosophy first disclosed in U.S. Pat. No. 4,213,174, of Richard E. Morley, Michael A. Bromberg, and William Taylor, entitled "Programmable Sequence Controller With Drum Emulation And Improved Power-Down Power-Up Circuitry", issued July 15, 1980, to Andover Controls Corporation of Andover, Mass., the Assignee of the present application. That patent is incorporated herein by reference.

The invention provides a drum emulating sequence controller employing distributed processing for system flexibility and to minimize the distances that sensing or control conductors must be strung to and from units of the system.

BACKGROUND ART

The above-identified United States Patent disclosed a novel programmable sequence controller employing a revolutionary programming method, herein called asynchronous drum programming, wherein a digital computer simulates a plurality of drums, each comprising a plurality of drum lines. Each drum is assigned to a particular output to be controlled and each drum line contains one or more logical statements providing exit conditions to further drum lines. This programming method allows ordinary maintenance people to program such programmable controllers for use in energy management systems.

All such programmable controllers hitherto comprised dedicated single unit systems providing for a limited number of inputs and outputs. This has limited the usefulness of these systems in large complexes such as energy management of large buildings and has increased the expense of their use due to the requirement to run input and output cables to the appropriate input sensors and controlled circuits.

Furthermore, such systems have been limited to specialized dedicated input ports, for example, so many input ports would be connectable to temperature sensors; so many connectable to switches to indicate whether they were open or closed; and so many connectable to a continuously variable voltage source.

Other limitations of prior art systems have included the high cost of buying a larger system than needed, due to lack of modularity; inability of the system to communicate the existence of commonly encountered situations requiring operator attention; the use of large, difficult to program, digital computers to control large systems; and, inability to diagnose the history of certain system failures.

OBJECTS OF THE INVENTION

It is therefore an object of the invention to provide a distributed drum emulating programmable controller system.

Another object of the invention is to provide such a system in modular form.

A further object of the invention is to provide such a system for minimizing wiring external to the system.

Still another object of the invention is to provide such a system employing a universal input port.

Yet still another object of the invention is to provide such a system providing for user written selectable messages.

A further object of the invention is to provide such a system providing increased history capability.

Another object of the invention is to provide such a system having increased program flexibility.

Still another object of the invention is to provide such a system for use in energy management.

Other objects of the invention will in part be obvious and will in part appear hereinafter.

The invention accordingly comprises a system and apparatus comprising features of construction, arrangement of parts, selection of functions, and the relationship of said functions to each other, which will be exemplified in the system and apparatus hereinafter set forth.

The scope of the invention is indicated in the claims.

SUMMARY OF THE INVENTION

Briefly stated, the invention comprises organizing the system of the invention into a plurality of master and slave units, mounted in identical boxes. A slave unit 2, is shown in FIG. 1, and a master unit 4, is shown in FIG. 2. Each master unit 4 (FIG. 3) comprises a Central Intelligence Unit generally indicated at 6 and an Input/Output unit generally indicated at 8. Each slave unit 2 in FIG. 1 comprises only an Input/output unit 8. A plurality of slave units may be connected to the master unit 4 over a local bus (L-bus) 10 as shown in FIG. 7.

A plurality of masters 4 with their local bus connected slaves 2 may be connected together as shown in FIG. 8 by a console bus (C-bus) and an information exchange bus (X-bus).

As shown in FIG. 4, each CIU is provided with an RS422 L-port 142, X-port 144, and C-port 146, for connection to those respective buses. There is also provided a console port converter 136 so that a console or other external device may be connected via an RS232 port 134 to the CIU and the information converted to the RS422 protocol for transmission on the C-bus.

Each CIU comprises a pair of phased microprocessors 90 and 92, cycling alternately, and sharing a 4K Random Access Memory 94. One Central Processing Unit operates the buses and the other executes the drum, i.e., data processing, program.

As illustrated in FIG. 5 each Input/Output unit also comprises a microprocessor unit 62. The inputs are scanned at a high rate of speed greater than the polling rate over the L-bus, as are the statuses of the outputs. This information is stored in a table in Random Access Memory 68.

The inputs are all identical and the program stored in the PROM causes three tables to be set up for each input. In one table their digitalized voltage is recorded; in another, whether that voltage has increased over or decreased below preselected values; and in another table counters are setup which count the number of times the associated input has crossed a preset voltage in one direction since the last polling from the CIU. Thus, each input may be interpreted as a voltage, as an open or closed switch, or as a pulsed input. When the IOU's are polled from the Central Intelligence Unit connected to the L-bus, each of these three tables is transmitted to the Central Intelligence Unit.

A digital filter is implemented in the IOU which limits the maximum rate of change of voltage which will be recorded in the voltage table and smooths it based on past history.

The user can enter a command in the user program to select whether an input will be treated as a voltage, as an open or closed switch, or as a pulse source, and then the appropriate tabled data will be used in the drum program. The user may also designate an input as a temperature input, in which case a conversion table is consulted in the CIU to convert the digital voltage to temperature.

THE DRAWINGS

For a fuller understanding of the nature and objects of the invention, reference should be had to the following detailed description taken in connection with the accompanying drawings, in which:

FIG. 10 is a diagram illustrating the organization of a master unit;

FIG. 11 is a diagram further illustrating the organization of a master unit and its buses;

FIGS. 12 and 13 are diagrams illustrating the operation of output terminals of the system;

FIG. 14 is a diagram illustrating the operation of input terminals of the system;

FIG. 15 is a diagram illustrating how time is programmed in the system of the invention;

FIG. 16 is a diagram illustrating how program lines are organized into "drums";

FIG. 17 is a diagram illustrating how time may be read out according to the invention;

FIG. 18 is a diagram illustrating the setup switches of the system of the invention;

FIG. 19 is a printout showing how the system is programmed to print out a history variable graph;

FIG. 20 is a history variable graph;

FIG. 21 is an illustrative programming sheet according to the invention;

Figure 1:
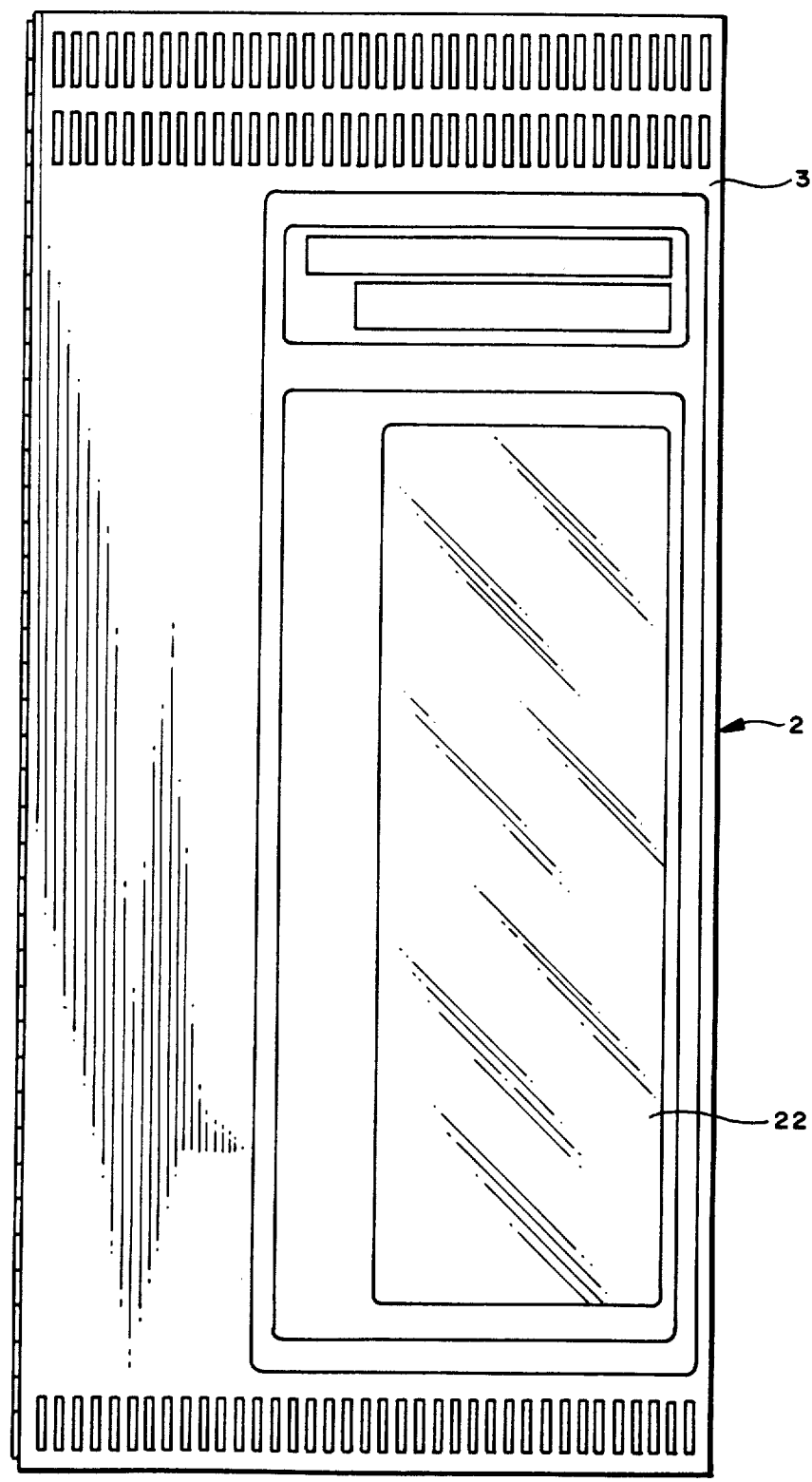
FIG. 1 is a front view of a slave unit according to the invention.

Detailed schematic circuit diagrams of the system of the invention were filed with the application resulting in this patent and are incorporated herein by reference.

The same reference characters refer to the same elements throughout the several views of the drawings.

BEST MODE FOR CARRYING OUT THE INVENTION

Figure 2:
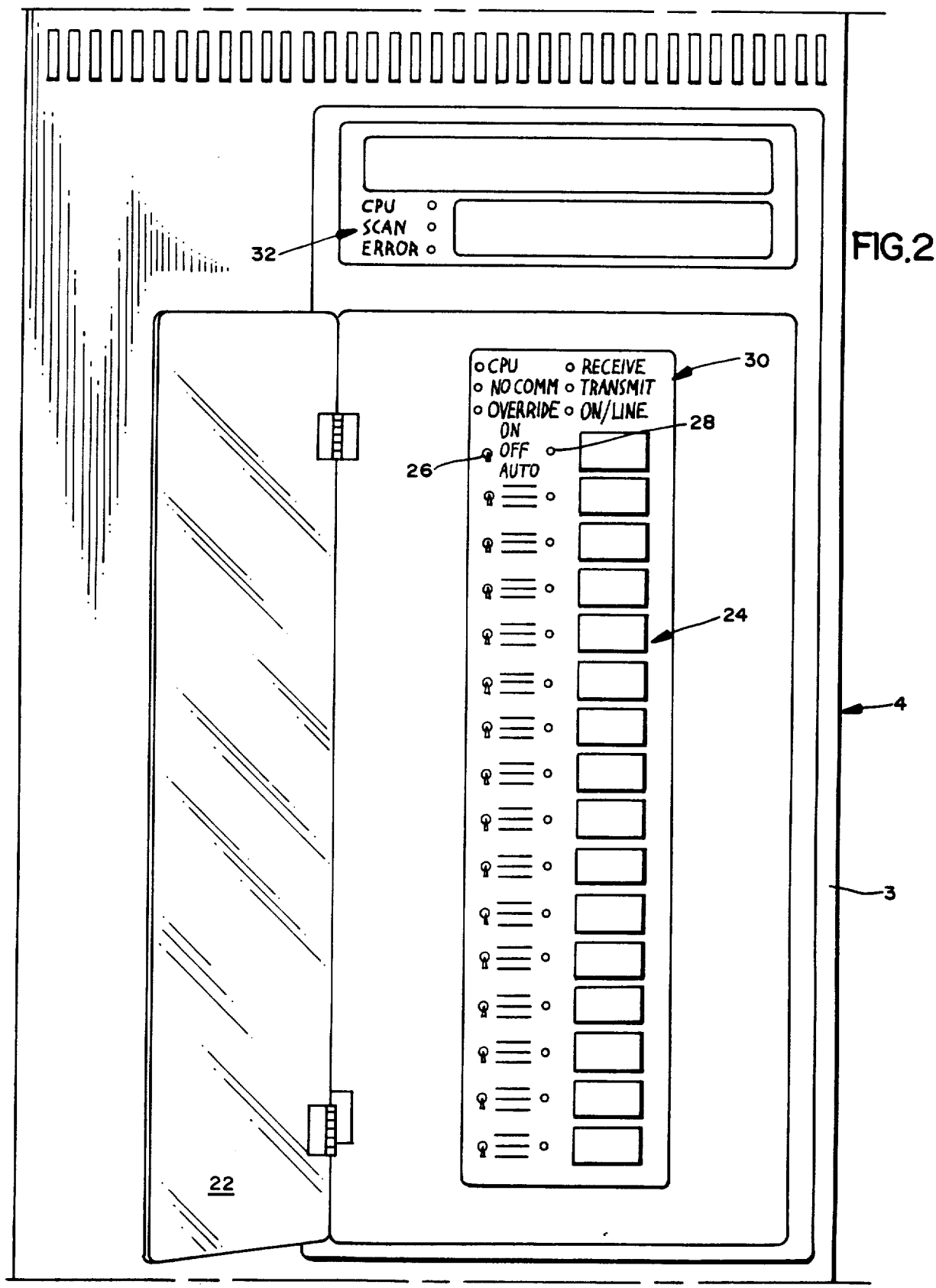
FIG. 2 is an enlarged front view, with the door open, of a master unit according to the invention.

Referring to FIGS. 1 and 2, master units 4 and slave units 2 are preferably contained in identical housings 3. Both master and slave units are provided with an access door 22, which, when opened, provides access to sixteen relays, generally indicated at 24, which are the output of their respective devices. Each relay 24 has associated with it a switch 26 and and indicator light 28.

When the switch 26 is in the auto position, the associated relay 24 to its right is controlled by the device. The device's control may be overriden by putting the switch in the OFF or the ON position, in which case the relay will be in that condition. The condition of the relay is indicated by the light 28; that is, it is lit whenever the relay is in the ON condition.

The master unit 4 illustrated in FIG. 2 comprises a Central Intelligence Unit (CIU) containing the master control program for solving drum lines and communicating with a control panel, remote devices, and with other master units.

Each master also comprises an Input/Output Unit (IOU) which controls the relays 24. Various operating conditions of the IOU are indicated by an array of lights 30. Various conditions of the CIU are indicated by an array of lights generally indicated at 32. Slave units, as indicated in FIG. 1, do not include a Central Intelligence Unit (CIU), but only include an IOU which is identical to the IOU's in the master units.

Figure 3:
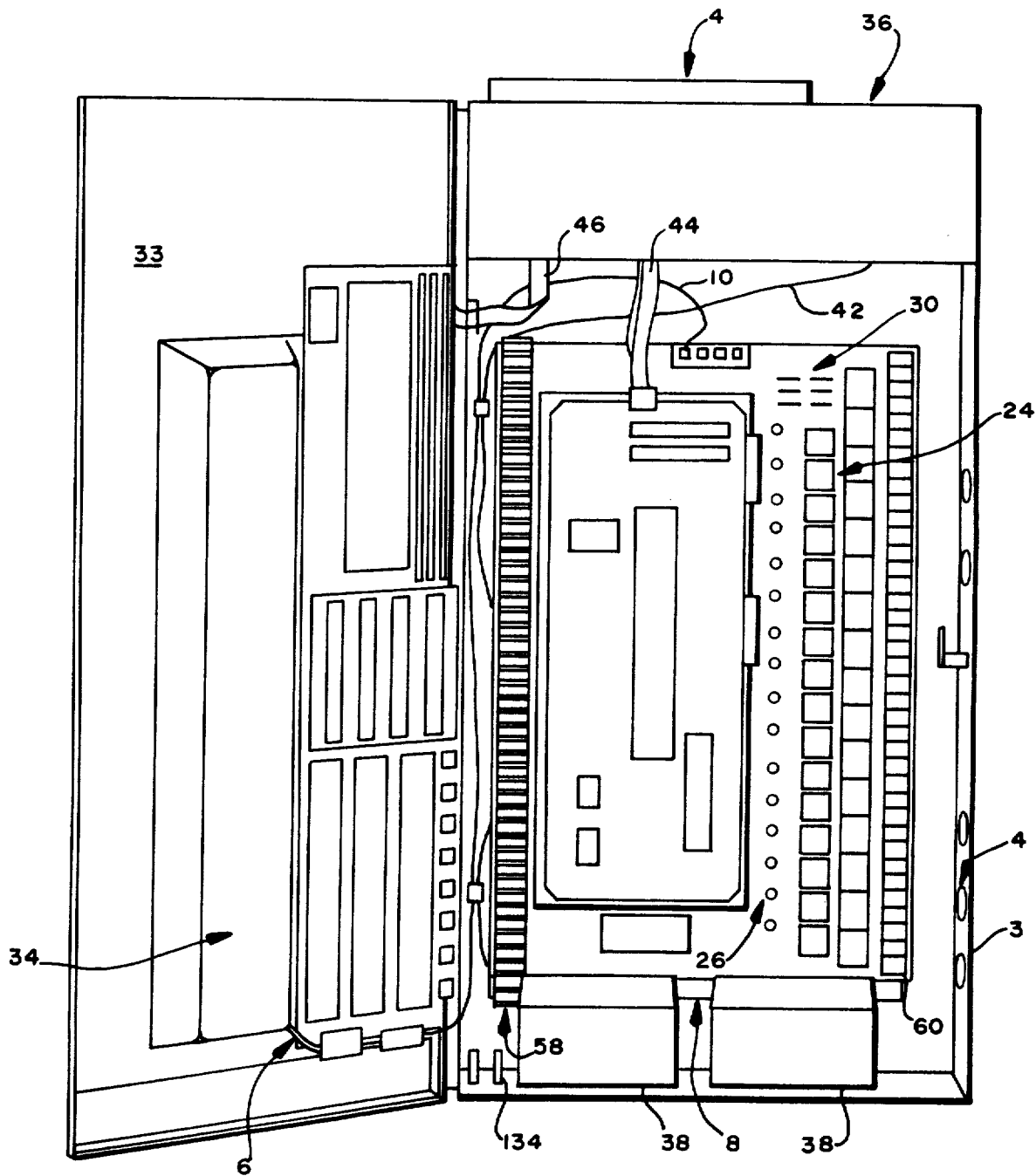
FIG. 3 is a perspective view of an open master unit as shown in FIG. 2, showing the internal elements of the unit.

Now referring to FIG. 3, when front panel door 33 is open the CIU board, generally indicated at 6, and the IOU board, generally indicated at 8, are accessible.

It should be noted how the front panel door 33 includes a cutout, generally indicated at 34, through which the switches 26 and relays 24 and array of indicator lights 30 are presented to the operator. The relays 24 are of the socket type and may be changed by plugging them in and out when the door 22 is open, as indicated in FIG. 2. A master unit also includes a power supply generally indicated at 36, and batteries 38 for battery backup.

As previously stated, a slave unit does not include a CIU board 6. The IOU 8 is connected to the CIU 6 via the L-bus 10. If the unit indicated in FIG. 3 were a slave unit rather than a master unit, there would be no CIU board 6 and the L-bus 10 would be longer and connected to the CIU of the associated master unit.

Batteries 38 are connected to the power supply 36 via cable 42 and the power supply is connected to the IOU 8 via power supply cable 44 and to the CIU 6 via power supply cable 66.

Figure 7:
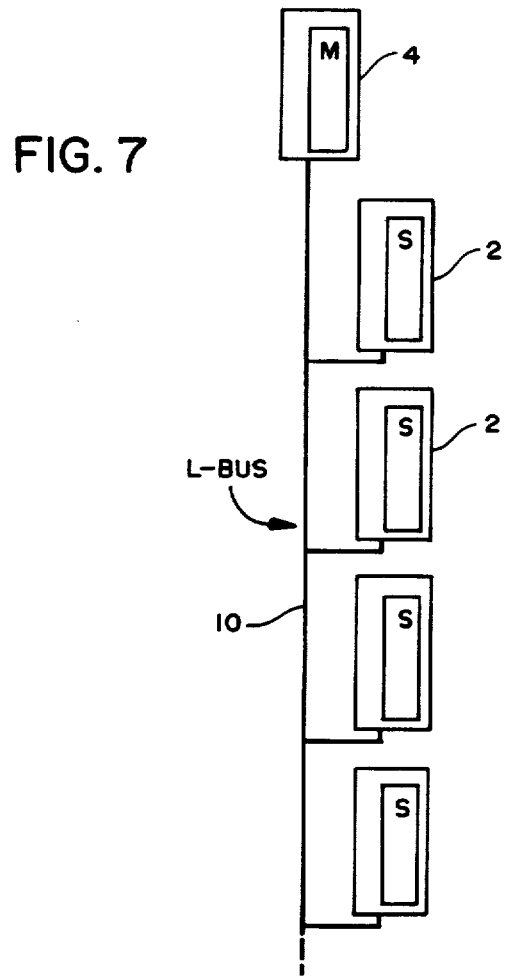
FIG. 7 is a block diagram of a master unit according to the invention connected to a plurality of slave units according to the invention.

Master units 4 and slave units 2 are connected via the L-bus 10 as shown in FIG. 7. Thus the slave units 2 are connected in parallel on the L-bus 10 to the master unit 4.

Figure 8:
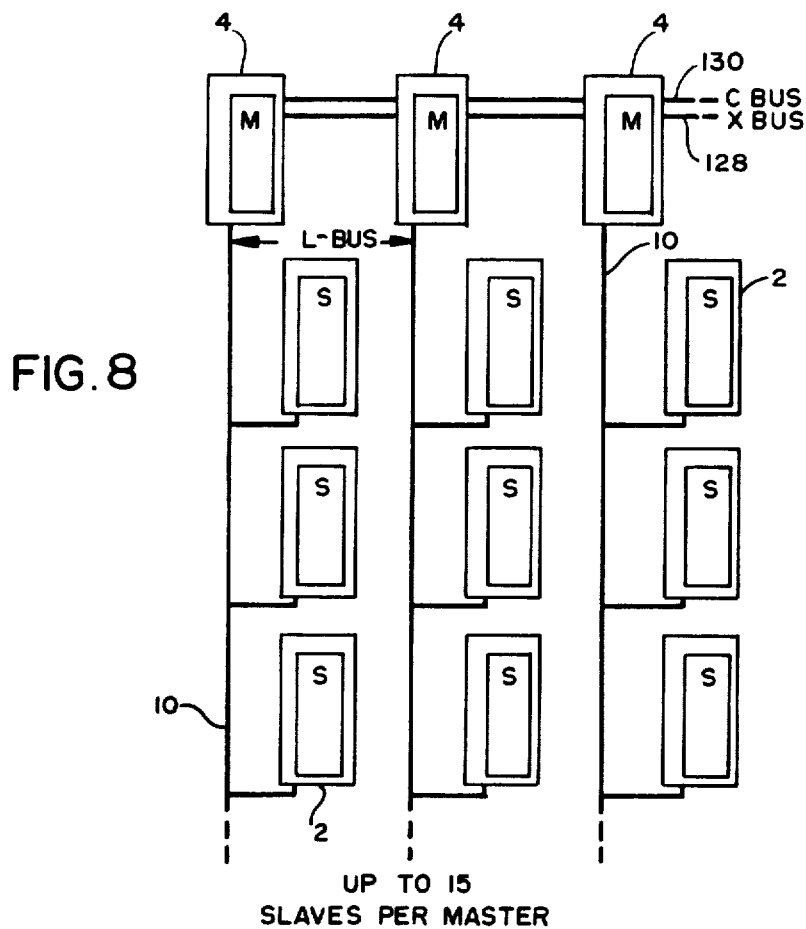
FIG. 8 is a block diagram, similar to FIG. 7, showing how a plurality of masters and their slaves can be connected together.

Master units 4 are connected together via the C-bus 130 and the X-bus 128 (FIG. 8). The C-bus (console bus)

connects to the IOU in each master. Each master 4 has a console port 134 (FIG. 9) which may be connected through a modem 48 and through a long distance connection 50 to a second modem 52 and a console terminal 54. Alternatively, the console terminal can be connected directly to the console port, as can other computer accessory devices, such as tape recorders, disc recorders, and the like. Thus, as system may be built up as shown in FIG. 8, to fifteen slaves per master, that is, sixteen IOU's per master and up to sixteen master units.

The master units communicate with each other via the X-bus. The X-bus is associated with an X "drum" comprising 64 variables. The operator assigns the control of each variable to a particular master and the masters communicate the status of their controlled X variable to the other masters on the X-bus in assigned time slots. Each X variable has a one-half second window assigned to it. For example, if the system has been operating a time, the master which is assigned the variable 5 will transmit variable 5 during its half-second window. Then the master having control of variable 6 will transmit variable 6 during its assigned half-second interval. Even if variable 6 is not transmitted during its half-second interval due to a malfunction of a master, or because that variable is unassigned, the master that has control of variable number 7 will wait the half-second and then transmit variable 7 during the variable 7 window, and so forth.

Alternatively and preferably, each X variable is transmitted immediately after the preceding one has been received without error. If the preceding variable is not received or is in error, then the master that controls the next X variable waits one-half second and then transmits the next X variable.

At START UP those masters which are ready to transmit an X variable will do so. Several may transmit at the same time for several time slots, but eventually one will transmit alone and this will synchronize the X-bus.

Again referring to FIG. 3, each IOU 8 is provided with an input terminal strip 56 and an output terminal strip 58. The input terminal strip provides for 32 identical inputs which may be a voltage source from 0 to 8.190 volts, a switch or a Thermistor temperature sensor. The user in writing his program, assigns to each input the nature of that input; that it is a voltage, or a temperature, or an ON or OFF, or that it is the number of times that the switch is closed and opened, i.e., a counter.

The IOU continuously reviews the status of its associated inputs 58 and stores the status in three sets of tables. One table stores the last voltage recorded. The second table stores whether the voltage is high or low, i.e., a switch closure, and a third table stores the number of times the voltage has changed from high to low since the last time the IOU was interrogated by the CIU; that is, the IOU for each input sets up an internal counter to count the number of times that the input has been changed from a high to a low voltage since the last time the IOU was interrogated.

Digital values, that is whether the input is ON or OFF, are determined as follows. When the voltage becomes greater than 3 volts the input is recorded OFF. When the voltage becomes less than 2 volts the input is recorded ON. That is, changes in the recorded value occur on crossing 3 volts from low to high (OFF) and crossing 2 volts from high to low (ON).

A count is recorded whenever the digital value goes from OFF to ON although the opposite might just as well be the case.

Digital filtering is employed in the IOU to determine the digitalized voltage to be recorded.

The filter is equivalent to one pole at one-half Hertz and is based on the previously recorded value. The rate of change of the recorded voltage from one recording to the next is constrained to be greater than the expected rates of change of the inputs but less than the rate of change of transients which should be ignored. The filter is not used in determining digital values. (ON or OFF)

The filter is realized by a constrained difference algorithm of the following formula:

$$\text{Filtered}_1 = \left( \frac{|\text{Filtered}_0 - \text{Raw}_1|}{2^k} \right) + \text{Filtered}_0$$

Where:

Filtered$_1$ is the newly computed filtered value, i.e., the value to be recorded;

Filtered$_0$ is the filtered value from the prior scan, i.e., the previously recorded value;

Raw$_1$ is the newly sampled unfiltered value;

and the filter factor K is 3.

The above algorithm at the IOU scan rate of 40 Hertz provides a digital filter having 1 pole at one-half Hertz.

Each IOU is interrogated once per scan by the Central Intelligence Unit; the scan being defined in the same way as in the above-identified U.S. Pat. No. 4,213,174, that is, the solving of one line from each of the drums setup in the CIU. Upon being interrogated, the IOU sends back to the CIU on the L-bus each of the three tables and the CIU uses the value from the appropriate table according to how the user has identified that input. (Assign command)

Those skilled in the art will understand that each input is therefore biased with a voltage which provides current when a Thermistor is connected to it to provide a voltage to be read by the IOU, the bias voltage when a switch connected thereto is opened and zero volts when the switch is closed, while a voltage source of appropriate impedance may be connected to the input to provide thereto a variable voltage to be read by the IOU.

Each IOU also when polled transmits back to its controlling CIU the status of each of its sixteen output relays, that is, whether they are in the ON or the OFF condition.

Figure 5:
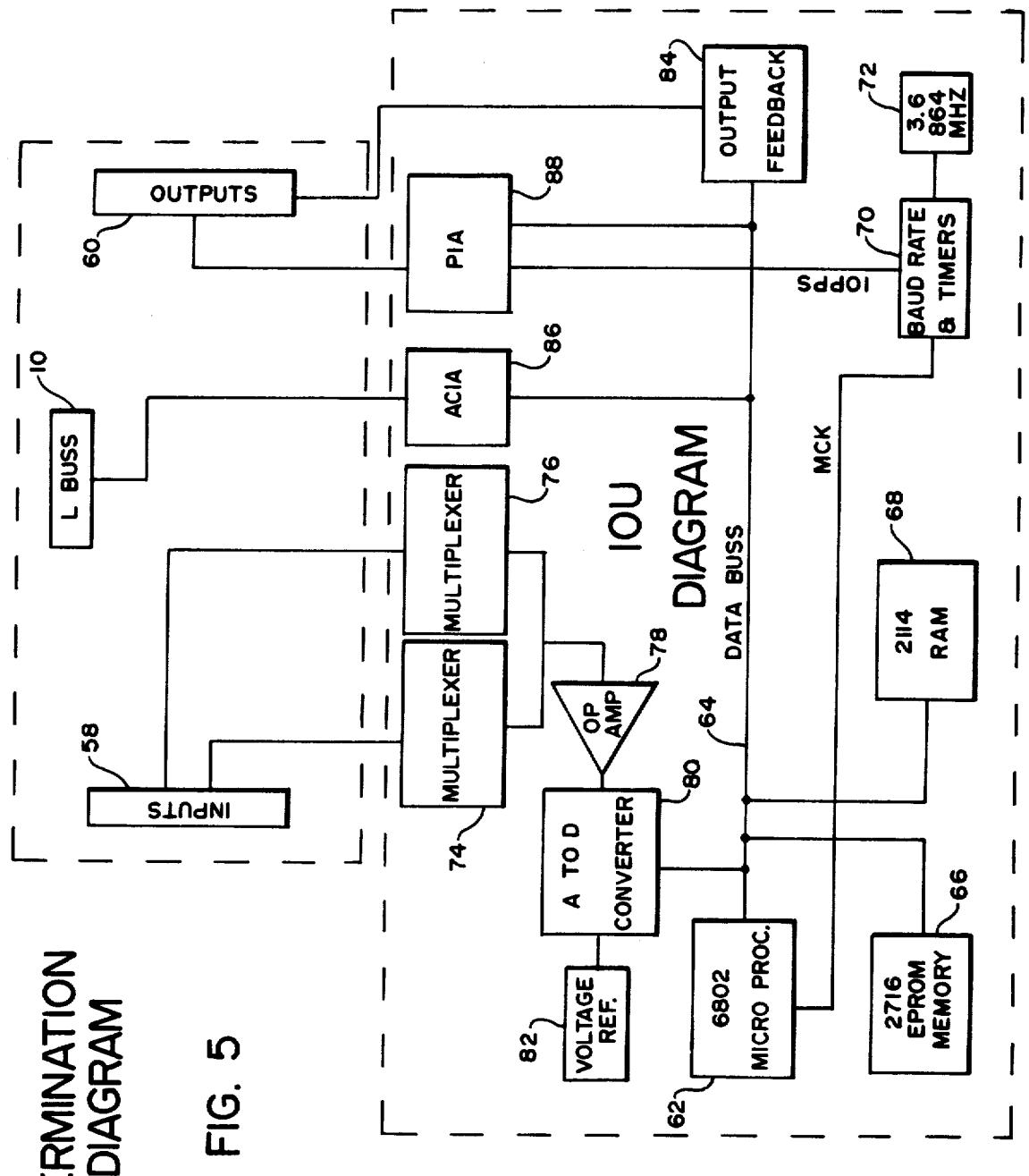
FIG. 5 is a block diagram of an Input/Output Unit (IOU) of the invention.

Referring to FIG. 5, each IOU comprises a 6802 microprocessor 62 providing a data bus 64 to which are connected a Programmable Read Only Memory 66 in which the control program for the IOU is recorded, and a Random Access Memory 68 in which the microprocessor 62 may store data. The microprocessor 62 has associated with it the usual baud rate generator, timers 70 and master clock 72.

Multiplexers 74 and 76 are operated by the microprocessor 62 at a scan rate of forty cycles per second to connect in turn each of the inputs 58 to an operational amplifier 78. The output of the operational amplifier 78 is supplied to an analog-to-digital converter along with a reference voltage from a voltage reference source 82 and this voltage is supplied on the data bus 64.

As previously explained, the microprocessor 62 for each input 58 records in its Random Access Memory 68 the voltage, whether the voltage is greater or lesser than preselected intermediate voltages (to indicate switch closure) and comparing to the previous data, whether the input has crossed a preselected intermediate voltage (to indicate a count).

Similarly, once each IOU scan, the microprocessor 62 records the condition of the outputs 60 via output feedback circuit 84.

Upon receiving a request for data from its associated Central Intelligence Unit on the L-bus 10 through an ACIA 86, the microprocessor 62 also begins counting the number of times each digital value recorded for each input 58 has changed from ON to OFF and records in a table in Random Access Memory 68 the number of times this has happened (counts) since the last inquiry. Upon receiving the next inquiry from its controlling CIU on the L-bus 10, the microprocessor 82 transmits on the L-bus 10 via the ACIA 86 the table of voltages of all inputs 58, the table of whether each input is considered opened or closed, that is, is above or below said preselected voltages, and the table of the number of counts recorded for each input since the last inquiry from the Central Intelligence Unit. Since each IOU is interrogated once each scan of the CIU, these counts may be interpreted as counts per scan, and since the scan intervals are of known time duration, the CIU can interpret the number of counts as counts per time interval.

Once per CIU scan, the CIU transmits via the L-bus 10 to each associated IOU the desired status of the outputs 60, and the microprocessor 62 sets the outputs 60 in accordance with the received data via PIA 88.

Figure 4:
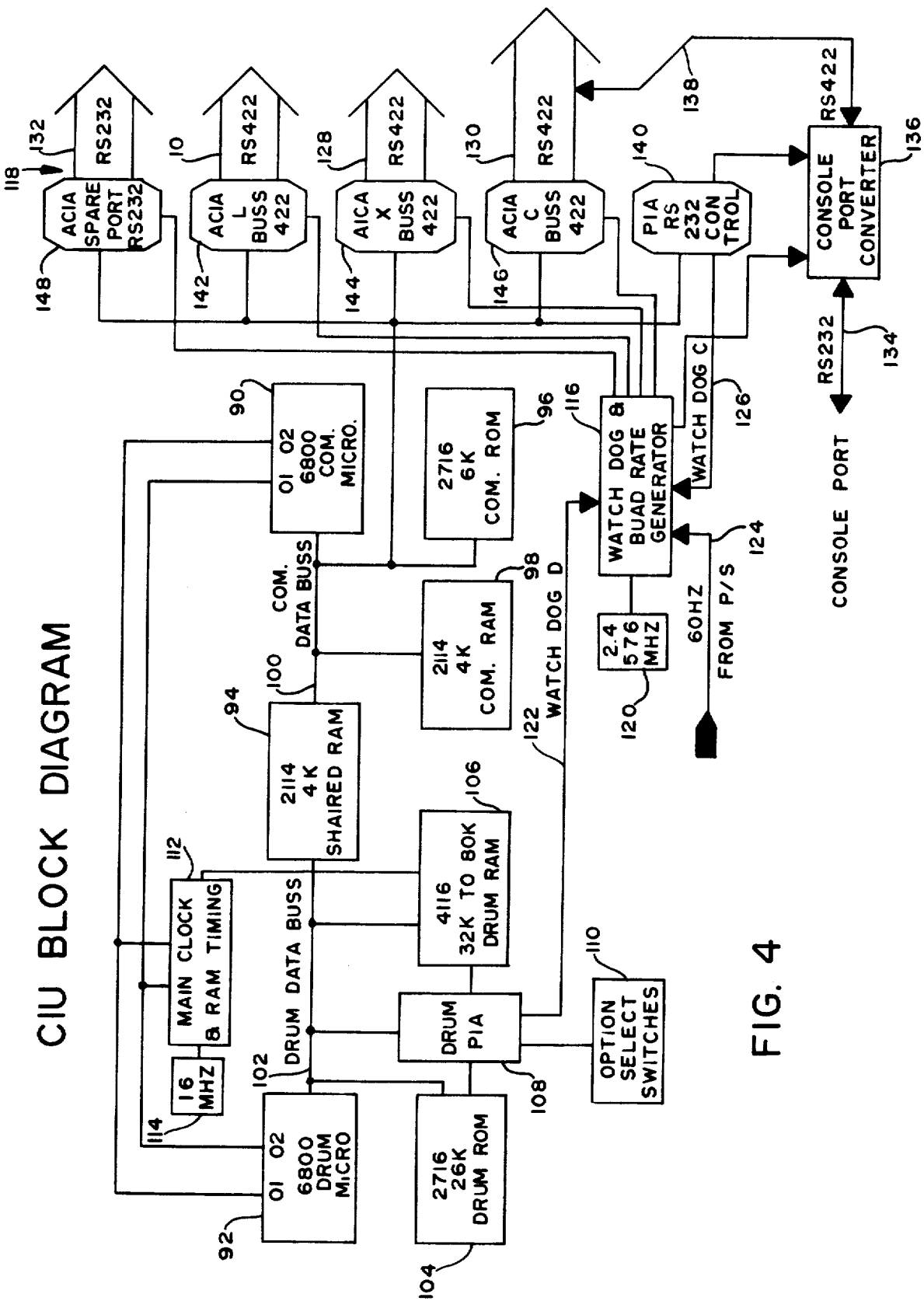
FIG. 4 is a block diagram of the Central Intelligence Unit (CIU) of the invention.

Now referring to FIG. 4 which is a block diagram of the Central Intelligence Unit (CIU), the CIU has two main functions. One is to communicate with the L, X and C buses and the other is to execute the drum processing program.

As shown in FIG. 4, separate microprocessors are organized to perform these functions. Communications microprocessor 90 handles the communications with the outside world, while drum microprocessor 92 executes the drum program. The microprocessors 90 and 92 communicate via a shared Random Access Memory 94.

Communications microprocessor 90 has its program stored in a Communications Read Only Memory 96 and utilizes a dedicated Random Access Memory 98, both connected to a communications data bus 100, which is also connected to the shared RAM 94. Similarly, the drum microprocessor 92 has a drum data bus 102 to which the shared RAM 94 is connected, as well as a Read Only Memory 104 storing its executive program and a Random Access Memory 106, both of which are connected to the drum data bus 102.

Also connected to the drum data bus is a drum PIA 108, to which the option select switches 110 are connected.

The two microprocessors 90 and 92 operate together conveniently since the 6800 microprocessors chosen operate in a two-phase mode. They are controlled by the same main clock and RAM timing mechanism 112 under control of clock 114. Under this arrangement the microprocessors 90 and 92 are caused to operate in opposite phases so that they alternately execute instructions. They communicate by tickling each other, that is, setting flags in the shared RAM 94 calling attention to data they have stored therein.

A watchdog and baud rate generator 116 controls the baud rate on the communications buses generally indicated at 118, under control of a clock 120. The circuit 116 also checks for repetitive operation of the drum microprocessor 92 on watchdog D line, for a 60 cycle hertz signal from the power supply indicating that the power line is operating on line 124, and for activity on the communications lines on watchdog C line 126. Whenever these signals are not properly received the watchdog and baud rate generator institutes appropriate action as explained in detail below.

As indicated in FIG. 4, the L-bus 10, X-bus 128, and C-bus 130, all utilize the RS422 protocol. An extra port 132 utilizes the RS232 protocol. A console part 134 is provided using the RS232 protocol and it is connected to a console port converter 136 which provides for two-way communication of the information supplied to or from the console port 132 to the C-bus 130 via RS422 line 138. The console port converter is under control of PIA RS232 control circuitry 140. Each of the buses 10, 128, and 130, and port 132 are controlled by ACIA circuits 142, 144, 146, and 148 respectively. These ACIA's and the PIA are, of course, connected to the communications data bus 100.

For a fuller understanding of the operation and function of the system of the invention reference should be had to the following User's Manual and Functional Specifications. It should be noted that in the User's Manual the system of the invention of this application, which is assigned to Andover Controls Corporation, is identified as the Andover Controls AC256, and in the Functional Specifications it is identified as the NSP.

USERS MANUAL

© 1981 ANDOVER CONTROLS CORPORATION

SAVING ENERGY

INTRODUCTION

America's recent experiences with energy shortages and wildly spiraling energy costs have made managers and businessmen realize that they must manage their business's energy usage in order to ensure profitability.

There are several ways to manage energy costs. One approach is conservation—analyzing more carefully a plant's energy usage and deciding where cutbacks can be made without hampering the business's operation. Another approach is to install alternative energy systems including solar- and wind-based systems. But any techniques you choose will require more management than you needed when energy costs were not so conspicuous.

The Andover Controls AC256 is a versatile and efficient energy management system. Essentially, it is a computer which ties into your plant. Through its inputs, it can sense temperature, humidity, other environmental conditions, and receive special requests from key personnel. Through its outputs, it can control the building's heating, ventilation, and air conditioning, regulating the building's energy consumption. It is also capable of controlling industrial processes, lighting, and esoteric energy production equipment such as solar and wind energy plants.

Using the simple techniques contained in this manual, you program the computer inside the AC256 to indicate how to relate the outputs to the inputs. The AC256 thus becomes tailored to your plant and your organization.

Installing an AC256 helps you save energy using three general techniques:

- The AC256 can put energy-saving policies into effect automatically, with more long-term reliability than possible with manual methods. (For instance, if you tell it to eliminate ventilation on cold winter nights, it "never forgets" to do so.)
- It can make adjustments in the plant's energy usage continuously and instantly, based on computations too complex for humans to do efficiently. In planning your energy usage, the
  AC256 can make it cost-effective to consider factors you never considered before. It can manage energy as precisely as though you had several employees dedicated to the task full-time.
- It can give you detailed analyses of the plant's energy usage, which can suggest ways to further reduce energy consumption.

ENERGY PRICING

To analyze the problem of high energy costs and see how the AC256 fits in, let's review the ways in which utility companies charge for energy use.

Figure 6:
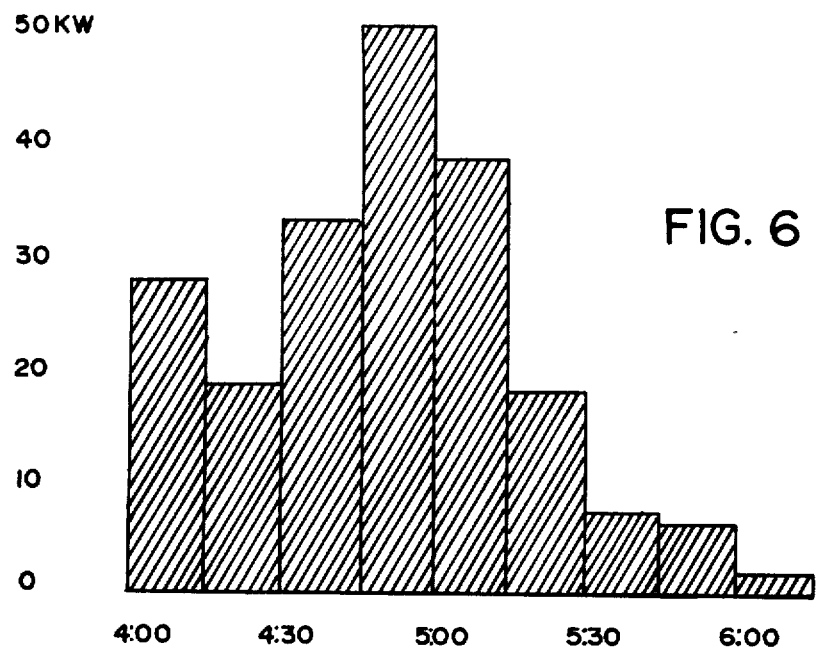
FIG. 6 is an illustrative diagram of electrical power use versus time.

Utility companies monitor your use of electricity on the basis of sampling periods, typically 15- or 30-minute periods. During each period, the utility computes your average rate of energy use. Your energy use can be put into a bar-graph. The width of each bar is the sampling period; the height is the rate (in kilowatts) at which you used energy in that period. Part of such a graph might look like FIG. 6.

The total shaded area shows the total amount of energy consumed (kilowatt-hours). The basic rate for energy is usually based on the total amount of energy consumed (the shaded area). For instance, it costs as much to light a 40-watt device for 5 hours as it does to light a 200-watt device for 1 hour. Often, quantity discounts are also applied to this basic rate.

Demand. Suppose your building uses an extreme amount of electricity during one certain hour of the year. The utility company may incur extra costs generating that unusual level of electricity during this peak consumption period. For instance, to ensure that you will have a high level of electricity then, the utility may have to buy equipment it may not use generally. Since the utility would not have needed that equipment if your energy use had been more uniform, many utilities have a demand clause in their rate tariffs. This imposes an additional energy charge based on the highest peak that occurred in the billing period. The demand charge may constitute 30% of the total energy bill.

Ratcheting. If your utility has a ratchet clause in its tariffs, you may be penalized further for high peaks of energy demand. A ratchet clause imposes some fraction of your peak rate as a minimum charge in future monthly bills. A ratchet clause may raise your energy cost for as much as a year after the original peak.

In our example diagram, a peak occurred between 4:45 and 5:00. If you could have deferred some of the energy consumption from this period to later periods, or anticipated this peak and taken advance steps to avoid it, you would have reduced your energy cost.

Two things are evident from the above discussion:
It is to your advantage to minimize your energy usage.
It is to your added advantage to make your energy usage uniform.

The AC256 can help you do both these things.

ENERGY-SAVING STRATEGIES

The AC256 affects the operation of your building through its control points (outputs). An output signal from the AC256 can turn on and off lighting and fans, modulate ventilation, and so on. In addition, the inputs and internal memory of the AC256 let it make computations and keep records.

The AC256's power is in its flexibility. In your control program, the decision to turn an output on or off can be conditional: It can depend on the outcome of a complex formula or computation; on any condition the AC256 can sense through its inputs; on the date or time of day; or on previous occurrences you have told the AC256 to remember. In short, the decision to turn an output on or off can be based on just about anything you want.

To illustrate this flexibility, consider first several simple applications of the AC256.

SYNCHRONIZING DEVICES—to reduce peak energy demand

Suppose your building consists of several zones, each with its own heater and thermostat. Each thermostat activates the corresponding heater based on the temperature in that zone. Since the several circuits are not synchronized, all the heaters may occasionally be on at the same time. This may produce a demand peak that will incur an extra cost.

If you let an AC256 sense the temperatures as its inputs and control the heaters with its outputs, it can synchronize the heaters so that they are not all on at the same time. This limits demand and saves money.

DIRECT DIGITAL CONTROL

Conventional demand-limiting systems are installed in series with the thermostat. Thus, all they can do is "veto" the thermostat's request for heat. The demand-limiter simply forces each heater off during a certain period of time; it cannot sense the actual zone temperature. This simple strategy lets the temperature occasionally fall below the comfort range.

With the AC256, you replace the thermostats with more accurate, solid-state temperature sensors. These sensors do not switch the heater; they simply provide information to the AC256. The AC256 can switch any heater off or on; it has "direct digital control," not just veto-power.

This approach lets the AC256 program carry out a strategy that is more sensitive to comfort. It also lets you pursue advanced energy-saving strategies discussed shortly.

UNOCCUPIED SETBACK—to reduce total energy use

In buildings that have only one work shift, human comfort is only a factor during a small part of the day. After hours, you can relax temperature thresholds with no ill effects. For instance, the building can be allowed to cool somewhat in the winter, reducing energy needs.

Having the AC256 automatically relax the thresholds is more reliable than assigning responsibility to a person or organization. (Typically, the AC256 program lets supervisors override the shutdown in case people are working after hours.)

To keep the building comfortable when it is occupied, but reduce energy use at other times, the AC256's program must accurately reflect your organization's use of the building. As well as maintaining an official time of day, the AC256 keeps track of the date, automatically changes it at midnight, and knows which day of the week it is. You can easily include in your program such concepts as Daylight Savings Time, weekends and holidays, and your organization's particular work schedules. As those schedules change, it is easy to change the AC256's program.

LIGHTING CONTROL—to reduce total energy use

As well as heating, ventilation, and air conditioning, the AC256 can also control the building's lighting. The decision to switch lights on can be based not only on the time of day but on ambient light as sensed by photocells. Lights on different sides of the building can go on at different times as each area passes into shadow.

ADVANCED STRATEGIES

Many competing energy-management systems limit your energy-saving options to simple duty-cycling or demand-limiting. Some use a heavy-handed approach-such as forcing the heaters off despite the thermostat readings-that can reduce comfort.

Even when correctly implemented, these systems tend to react to, rather than actually manage, your building's energy use.

The AC256 lets you anticipate and prevent high usage levels rather than dealing with them after-the-fact by turning off equipment when it is needed most.

The AC256 can take into account such factors as thermal inertia in order to anticipate the building's future power requirements.

Most of the following strategies are implemented or refined based on a study of your building's particular heating/cooling characteristics.

OPTIMIZED START/STOP—to reduce total energy use

Suppose the AC256 is performing unoccupied setback, as described earlier. To bring the interior temperature within the comfort range by the start of the workday, heating or cooling equipment must switch on in advance of this time. Likewise, the equipment can shut down in advance of quitting time, since the temperatures will not leave the comfort range for some time thereafter.

Based on the amount of heat the building has retained from the previous day and on external temperature readings, the AC256 can compute correct start-up and shut-down times for the heating and cooling equipment. The equipment operates for the smallest interval possible to provide comfort during the working hours.

ANTICIPATORY TEMPERATURE CONTROL—to reduce peak energy demand and total energy use You can expect interior lighting, the operation of equipment, and the body heat of personnel to steadily warm the building during the course of the workday. The extent of this warming varies from day to day, depending on the weather. This principle lets you predict that, on a hot day, the need for air conditioning will increase as the day goes on.

A simple, thermostat-controlled cooling system will remain dormant until the interior temperature reaches the top of the comfort zone. This may not happen until the afternoon. By then, it may take a lot of energy to hold the temperature within the comfort zone. This may produce an extra demand penalty.

You can program AC256 to run the air conditioners moderately during the entire day. Slowing the rise in the buildings's temperature avoids an air conditioning peak in the late afternoon. In effect, the AC256 plays the role of a thermostat where you let the comfort zone move upward during the day.

Pre-cooling. On days when the AC256 determines that cooling will be needed by afternoon, the AC256 can operate ventilating fans in the morning. It brings in cool outside air, holding the interior temperature to the bottom of the comfort range for as long as possible. This minimizes the amount of mechanical cooling the building will eventually need that day.

Pre-heating. On a cold day, equipment operation and body heat will reduce the need for heating by late afternoon. The AC256 can heat the building in the morning to levels that reduce or eliminate the operation of heaters for the rest of the day. The AC256 can do the bulk of the heating before the building opens and lights and equipment begin demanding energy. This removes heaters as a factor in demand peaks.

Temperature reset. The AC256 can control the temperature of the water or other medium in a heating or cooling system. Although conventional systems already do this, with the AC256 you can use this technique to assist your other strategies. For instance, the AC256 can begin heating or cooling the water in the system in advance of an anticipated need for heating or cooling. It can avoid spending energy to heat or cool the water when it knows this will be unnecessary. It can keep the water lukewarm to prevent a temperature differential between floor-level and desktop-level (the "cold wall effect").

ECONOMIZER/ENTHALPY CONTROL—to reduce total energy use

An economizer is a device that can operate a fan to pump outside air into a building as an alternative to activating an air conditioner. The AC256 can be programmed to use this strategy too. The AC256 may even elect to pump in outside air that is warmer than the inside air, if it determines that the outside air is less humid and thus easier to cool.

Economizers are typically wired in series with the thermostat that requests the cooling. With the AC256, you attach exterior temperature and humidity sensors to its inputs and let the AC256 operate the fans directly. This lets the AC256 switch on the fans based on all its environmental inputs, programmed strategies, and determination of future energy needs, even at times when the room temperature itself may not call for cooling.

SEQUENCED START-UP—to reduce peak energy demand

During a power failure, temperatures may drift outside the comfort range. When power is restored, all zones may indicate the need for heating or cooling. The AC256 can activate the equipment in an orderly sequence, preventing a demand peak.

OTHER AC256 APPLICATIONS

Once it is in place and you are accustomed to programming it, you will find many additional uses for the AC256. Its flexibility and general-purpose nature lets it serve the purposes of a process controller or industrial computer.

ENERGY COST MONITORING

The AC256 can deal with counting numbers and decimal fractions representing temperatures, intervals, or even dollar amounts. You can program into the AC256 some or all of the formula the utility companies use to assess changes. The AC256 can notify foremen when energy demand in the plant is in danger of incurring a cost penalty.

MAINTENANCE REDUCTION

Many types of heating and cooling equipment can be damaged by short-cycling (being switched on and off too rapidly). For equipment that doesn't contain internal protection against short-cycling, the AC256, can prevent damage by enforcing a minimum on and off cycle.

You can program the AC256 to activate air conditioning units for a short time occasionally in the winter to prevent seals from hardening.

PROCESS CONTROL

Although the AC256 is most often used for energy management, it is a flexible and easy-to-use programmable controller that can control diverse industrial processes. The AC256 has a proven ability to handle applications such as mushroom growing, commercial laundering, and dairy plant operation. (The AC256 is designed to control processes which do not need monitoring more frequently than every three seconds or so.)

ADVANTAGES OVER OTHER DEVICES

Other energy management systems do not have the flexibility of the AC256. The manufacturer may prepare programming to meet a typical application. You can "customize" your unit only by changing values—specifying different temperature thresholds, duty cycles, or so on. Sometimes "customization" requires electrical rewiring. You don't have the ability to arbitrarily relate or synchronize independent activities, use complex formulas, or program supervisory overrides.

The AC256 gives you a wide range of strategy choices, and lets you vary the operation of your plant with any event or input. The AC256 also makes it easy to change the program to adapt it to changing company policy and government regulations, and to incorporate the additional knowledge of your plant you gain from using it.

To get the flexibility of the AC256, you could buy a general-purpose computer system. But few of these have the hardware or software required for building control, and all of them bring too much complexity to the task. Plant managers typically do not want to deal with reliability and compatibility problems, choice of programming languages, media storage considerations, hiring of programming specialists, and the other trappings of general-purpose computing.

Except for the relays that actually operate the outpu devices, the AC256 is completely solid-state, self-contained, and easy to use and to program. It is designed for ultra-high reliability. It is installed as and serves as an integral part of your building-a component that you can take charge of.

THE FUTURE OF ENERGY PRICING

Advances in technology are letting utility companies measure your energy use more precisely and adopt more complex pricing policies. As they do so, the AC256's advantages over a simplistic energy management system will increase.

MORE FREQUENT DEMAND-SAMPLING INTERVALS

Computer-based energy monitoring equipment will let utilities compute your energy demand by intervals of five minutes or even one minute. Energy management systems that react to demand peaks by shutting down equipment (load-shedding) may not be able to do so fast enough to actually avoid a short peak that the utility company would sense, without risking damage to equipment through short-cycling. As the utility company's ability to sense short peaks increases, you will increasingly need an energy management system which can anticipate peaks, as the AC256 does.

OFF-PEAK RATES

Like the telephone company, some utilities are basing energy costs on the time of day. They offer reduced rates for the power you use when general power consumption is low, such as the time between 10 P.M. and 8 A.M. There are often premium charges during periods of traditionally high demand (late morning and early evening). If you can postpone or advance your use of energy to a time when a lower rate applies, you may cut the cost of this energy by over half. For instance, the preheating and pre-cooling strategies already discussed can save you extra money.

As an AC256 user, you can include your utility company's particular discount periods in the overall strategy reflected in the AC256 programs.

CONFIGURATIONS

MASTERS AND SLAVES

There are two types of AC256 that can be present in an installation:
The AC256M (master) unit, and
The AC256S (slave) unit.

As the names imply, the AC256S requires an AC256M to control it. A single AC256M can control itself and up to fifteen AC256S slave units. You program the master unit as described in this manual; slave units simply take orders from a programmed master unit.

Any AC256 unit can sense up to 32 environmental conditions connected to its inputs, and can control up to 16 devices, appliances, or pieces of machinery by connection to its outputs.

For the simplest applications—those where the AC256 will have to sense no more than 32 inputs and control no more than 16 devices—a single AC256M will suffice.

When you need the AC256 to sense more inputs or control more outputs, you can attach slave units to this master, adding their input/output capabilities to the program you put inside the master. With the maximum 15 slaves, an AC256M can sense up to 512 inputs and control up to 256 outputs. The program you put inside the AC256 can contain direct orders to the AC256S's to sense their inputs and activate or deactivate their outputs. (FIG. 7)

This is a system of up to 16 AC256's. For even more ambitious applications, you can build a network of up to 16 of these systems. A full network (the maximum configuration) can thus sense up to 8,192 inputs and control up to 4,096 outputs. (FIG. 8)

In the network configuration, each master controls its own slaves. But the masters can communicate with one another to synchronize processes or consolidate reporting.

Each master may control different numbers of slaves. Some masters may have no slaves attached. You can expand the network vertically (add slaves) when and where you need more inputs and outputs. You can expand the network horizontally (add masters) to add control and intelligence. Any expansion can add as few as one AC256.

Thus, the AC256 product line consists of modular building-blocks. You can gradually add the units you need for your application, without exceeding the minimum necessary cost. Each AC256 you add gives you immediate benefit; there is no high initial cost as with large computers.

CONTROL CONSOLE

The AC256M has 32 input connections and 16 output connections which attach it to the building around it. It also has input/output ports that let it communicate with the AC256S slave units under its control, and other input/output ports that let it communicate with other AC256M master units in the network.

Figure 9:
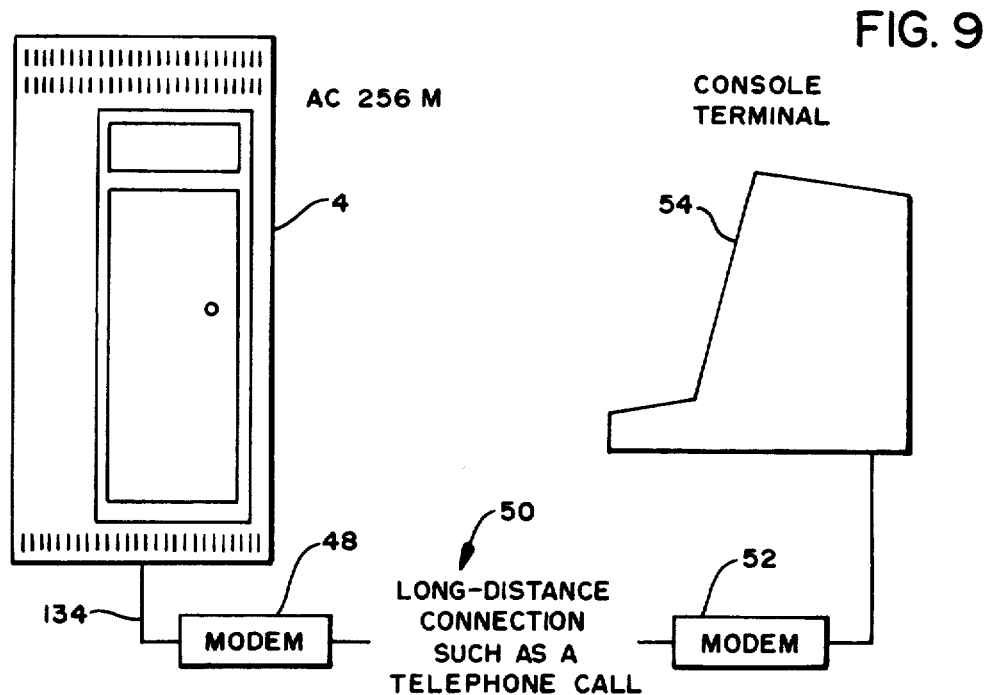
FIG. 9 is a block diagram showing how external devices may be connected to the system.

The AC256M has one other input/output connection. This connects it to you, the operator. You use this connection to program the AC256M, to manually override the states of its inputs or outputs, to receive reports or alarm messages, and to give the AC256M other types of commands. This is the connection to the console terminal. (FIG. 9)

You can attach a variety of equipment to the AC256M as the console terminal. Virtually all terminals you use have a keyboard like that of a typewriter. You give the AC256M commands by typing on this keyboard. Printing terminals let the AC256M respond to your commands by printing on a page or roll of paper. Display terminals respond to you by making text appear on a video screen. In either case, you relate to the AC256M by exchanging text messages with it.

You attach a terminal to the AC256M by cabling it to the port labeled CONSOLE. The console interface uses the common RS232 standard and the industry-standard ASCII code. This may let you use terminal equipment you now own as the AC256M console.

By attaching a modem to the AC256M, you can put long distances between the AC256M and the console. Certain modems let you attach both the AC256M and the terminal to telephones. Attaching an auto-answer modem to the AC256M lets you telephone the AC256M and type to it from your terminal, wherever it may be.

BLOCK DIAGRAM

The AC256M actually contains two small computers. One, called the intelligence unit, interprets your commands and programs. It maintains the variables and drums you will learn about. The other, the input/output unit, samples the inputs from the building and activates and deactivates the AC256M's outputs (control points). The input/output unit is a servant of the intelligence unit. The two units communicate by sending messages across an internal path called the L (local) bus. (FIG. 10)

The less-expensive AC256S slave omits the intelligence unit. It has only an input/output unit. Like the input/output unit in the AC256M, the AC256S slave communicates with the master's intelligence unit over an extension of the L bus. (FIG. 11)

You combine several AC256M masters into a network by cabling them together with one or two buses. The X (external) bus lets programs in the masters communicate. The C (console) bus lets you operate or program any master through a console connected to another master.

The C and X buses are optional. Instead of using a C bus, you can provide a separate console terminal for each AC256M master, or move a single terminal between masters as needed. Omitting the X bus prevents the masters from communicating and synchronizing processes under their respective control.

If two masters are connected by neither a C nor an X bus, they are not in the network configuration. They will operate independently of each other.

ATTACHMENTS

CONTROL POINTS (OUTPUTS)

Each AC256M and AC256S has 16 control points or outputs. These it uses to control equipment in the building. For instance, a single control point might be connected to a heater, fan, or lighting circuit.

Inside the AC256 cabinet, each control point appears on a terminal strip as three connections: a Common, a Normally Open, and a Normally Closed connection: as shown in FIG. 12.

The control point is essentially a single-pole, double-throw switch. When the output is officially OFF, the AC256 closes the circuit between the Common and Normally Closed connections: As shown in FIG. 12.

When the output is officially ON—that is, when the AC256 program explicity activates the output—the AC256 breaks the connection between C and NC and closes the circuit between C and NO: as shown in FIG. 13.

Therefore, when including the AC256 in the power circuit for a piece of equipment, use the AC256 as though it were a switch. Wire the circuit through the C and NO connections, or through the C and NC connections, depending on the state you want the equipment to be in when the AC256 is not active, such as during a power failure.

CONTROL POINT SPECIFICATIONS

Contact Rating:
 10a @ 30 VDC
 10a @ 240 VAC resistive
 0.5 HP @ 240 VAC
Maximum Open Circuit Voltage: 1500 VAC Software. The AC256 program can operate a control point in continuous mode—explicitly activating and deactivating it-or in pulse analog mode, where it is activated for a preset interval. This interval may be as short as 0.1 second or as long as 25.4 seconds, in increments of 0.1 second. Use continuous mode to switch power to a piece of equipment. Use pulse analog mode when the AC256 is modulating valves or dampers to directly control temperatures or ventilation.

The Manual Override switches 28 on the front panel, discussed in Chapter 4, let you force any control point to either the ON or OFF state.

INPUT WIRING

Each AC256M and AC256S has 32 input connections. These let it sense conditions in the environment, the state of the equipment it is controlling, or requests from personnel.

Inside the AC256 cabinet, each control point appears on a terminal strip as two connections: an input terminal and a signal return. All signal returns in a single AC256 are internally connected. One signal return terminal is provided for each two input terminals as shown in FIG. 14.

The AC256 senses conditions in its environment by measuring the voltage level of its input terminals relative to the signal return. The AC256 can sense voltage levels between 0 and +8.190 volts, in increments of 0.002 volts.

Each input circuit contains filtering and overvoltage protection to improve reliability and help them withstand wiring errors and malfunctions in other equipment.

Shorting an input terminal to the signal return makes the AC256 read 0.000 volts on that input. If there is an open circuit between the input terminal and the signal return, the reading is the maximum (+8.190 volts), since all input terminals are shunted to +8.190 volts through a 30K ohm resistor. You typically connect the input terminal to the signal return through a switch or a variable resistor (sensor), producing a voltage level varying with some external condition or event.

Cabling. To connect the sensor or switch to the AC256 terminals, you usually don't need to use shielded wire. But occasionally where there are long wire runs in close proximity to power wiring, 60-cycle "noise" may produce errors in analog readings.

You can solve this problem by placing a 10 uf, 10 volt (or larger) capacitor between the input terminal and the signal return.

The signal return is not "ground." Sensor or switch terminals that return to the AC256 signal return must be left floating, and not grounded outside the AC256.

Input Circuit Specifications

Voltage Range: 0 to +8.190 v
Resolution: 0.002 v
Accuracy: ±0.004 v
Maximum Pulse Frequency: 10 Hz
Input Impedance: 30K ohm to 8.2 v
Filtering: Corner Freq. at 10 Hz −20 db/decade
Over-voltage Protection:
  120 VAC RMS or 120 VDC indefinitely on any single channel
  ±1500 v transient for 50 usec on all channels
Calibration: Permanent Software. Although all the AC256's input terminals are electrically identical, you typically use them to measure different things, and thus want the AC256 to interpret the voltages differently. There are four ways the AC256 can treat its inputs:

V—Voltage Input. Using an input in this mode lets the AC256 program read the voltage level as a number of volts (from 0 through 8.190).

T—Temperature Input. You use this mode when you have attached a thermistor (discussed shortly) to the input. T works the same as V, but T makes the AC256 automatically translate the value so that the program reads a number of degrees.

D—Digital Input. This mode indicates that the input terminal is connected to the signal return through a switch. The switch may be operated by a person or a piece of equipment. (Any switch will do, since it will be switching less than 0.003 amp.) The program senses this input as either OFF or ON. OFF means the switch is open; ON means the switch is closed.

C—Counter Input. In this mode, there is also a switch connected to the input terminal, but the AC256 counts the number of pulses in a certain interval and passes this number to the program. The switch is typically a pulse initiator, such as a watt-hour meter or a flow meter. Pulses can occur at up to 10 per second.

You can determine or change the mode in which an input is used from the console.

SENSING TEMPERATURE

Thermistors are resistors whose resistance varies with changes in temperature. Thus, connecting one of the AC256's input terminals to a signal return through a thermistor lets the AC256 measure temperature in terms of the input voltage.

The Andover Controls 710 Series thermistors are accurate and stable, and provide a high signal level at low cost. These solid-state devices never require calibration or adjustment. Thermistors are available in a variety of housings, to measure room temperature, duct temperature, or for other applications. When you use a 710 Series thermistor, the AC256 automatically converts the voltage reading to a number of degrees Fahrenheit.

Cautions. Never apply a voltage to a thermistor; doing so affects its accuracy and reliability. If you do so by accident, replace the thermistor. Never touch a soldering iron closer than three inches to the thermistor's sensing tip.

Long wire runs between the thermistor and the AC256 affect the thermistor's accuracy. To keep errors under 0.5 degrees F., limit the length of the wire runs, depending on the gauge of wire you are using:

| Minimum Wire Gauge | Maximum Run |
|---|---|
| To sense temperatures up to 130 deg F. | |
| #26 | 750 ft. |
| #24 | 1200 ft. |
| #22 | 2000 ft. |
| #20 | 3000 ft. |
| To sense temperatures up to 230 deg F. | |
| #24 | 175 ft. |
| #22 | 275 ft. |
| #20 | 440 ft. |
| #18 | 700 ft. |
| #16 | 1100 ft. |
| #14 | 1800 ft. |

Do not run thermistor wires in the same conduit with power wiring, since 60-cycle "noise" may disturb the voltage readings.

SENSING VOLTAGES

Valve position potentiometers, humidity sensers, pressure sensors, and other transducers all produce voltages which the AC256 can sense. Choose a device whose output voltage stays in the range from 0.000 to 8.190 volts.

Usually this remote sensor takes power from its own power supply. You must locate this power supply adjacent to the AC256 and power it from the same power line as the AC256.

The AC256 measures voltages relative to its signal return. Sensors produce voltages relative to the negative terminal of their power supply. Thus, you should connect the sensor power supply return terminal to the AC256 signal return. Do not remotely ground any part of the sensor wiring. Doing so will reduce the reliability of the reading and raise the possibility of lightning damaging the AC256.

INSTALLATION

This chapter discusses various topics of concern to the installer, then presents a sequence of steps to take to install the AC256. Please read ALL of Chapter 4 before starting to install the AC256.

MOUNTING AND CONNECTION

Refer to FIG. 3.

Mounting. Mount the AC256 in an upright position on a wall so that you can easily gain access to the front panel. There must be a power outlet nearby; there should be a table or desk nearby for the console terminal.

At the back of the AC256 box, four keyholes exist to attach the AC256 to the wall. Install four screws in suitable positions on the wall. Fit the AC256 enclosure over the screws, and lower the enclosure so that the screws find the keyholes. Now tighten the screws.

Knockouts are provided on both the left and right sides of the AC256 enclosure for the attachment of pipes and conduits. Never drill holes in the AC256 enclosure! A metal shaving could easily cause a short-circuit in the AC256 electronics.

Chapter 3 discusses the input terminals and outputs (control points). The input terminals are arranged on the left side of the control panel and circuit board; the outputs are arranged on the right side. Draw wires from input circuitry through the knockouts on the left side and to the input terminals. Draw control point wiring through the knockouts on the right side and to the output terminals. Do not let input or output wiring cross over to the opposite side. Use tie-wraps to dress and bundle groups of wires to prevent loose wires within the AC256 enclosure.

POWER SUPPLY, BATTERY, AND FUSES

The power supply is located at the top of the AC256 enclosure. It has a standard, three-prong power cord. Plug this cord into a nearby, unswitched power receptacle. (For additional security, use a locking power receptacle to prevent the unit from being unplugged. Do not use a conduit to bring main power to the AC256 power supply.)

POWER SUPPLY SPECIFICATIONS

Input Voltage: 90 v–135 v, 60 Hz
Power Consumption: 200 watts max

Internal battery. Each AC256M master has an internal battery designed to supply power to the intelligence unit during a power failure of up to three hours' duration. This lets the AC256M preserve its program and continue operating during the power failure. Since the AC256 does not perform external switching during a power failure, slaves do not have batteries.

The internal battery resides at the bottom of the AC256M housing. The battery is not connected at the factory; if it were, it would be discharged by the time you received the unit. Unwrap and connect the battery to the appropriate power supply terminals at the top of the unit.

External battery. You can attach an external battery to an AC256M, typically a 12-volt automotive battery. We recommend that you use the Sears Diehard battery (type 4377) in addition to the factory-supplied battery. One Diehard battery typically increases to 24 hours the length of time that power can be down without disturbing the contents of the AC256M program memory. Use additional Diehard batteries for longer power-failure immunity. If you use external batteries, wire them in parallel to each other and to the internal battery.

Locate the battery outside the AC256M enclosure and attach it to the same two terminals on the power supply. Use 14-gauge or larger wire. Make sure to connect the positive battery terminal to the plus terminal, and the negative battery terminal to the minus terminal.

While power is on, the AC256M charges all attached batteries. Chapter 11 discusses power failures in more detail.

Fuses. Note in the preceding photograph the location of the two fuses in the AC256 power supply.

| Label | Rating | Purpose |
|---|---|---|
| F1 | 2 amp slow blow (MDL 2) | AC power fuse |
| F2 | 5 amp fast blow (AGC 5) | Battery fuse |

BUS CONNECTIONS

In the AC256 architecture, a bus is a parallel cable run between up to 16 AC256 units.

Bus connections go between AC256 units to let them communicate. There are three buses, the L (local) bus, the X (external) bus, and the C (console) bus. Their purposes are discussed in Chapter 3.

The L bus connects the intelligence unit in an AC256M master to the input/output units in it and in the AC256S slaves under its control. The L bus runs between all AC256 units in a system. In a network, there is a separate L bus for each master.

The C and X buses are used only in the network configuration. They run between all AC256M masters in the network.

All three types of bus follow the RS422 standard. The procedure for connecting them is similar.

Bus terminals are present in the intelligence unit in the AC256M, and in the input/output unit in the AC256M and AC256S.

L bus terminal strips on input/output units have two additional terminals that are unused.

L bus and C bus connections. To bus together the L bus or C bus terminal strips in two units, connect each of the five terminals in one unit's terminal strip to the corresponding terminal in the terminal strip of the other unit.

Use twisted-pair cable for this application. Connect one twisted pair to the adjacent black and white terminals at both ends. Connect the other twisted pair to the adjacent black and red terminals at both ends. Attach the shielding wire to the orange terminal at both ends.

X bus connections. To connect the X bus terminal strips in two units, you can use cable with a single twisted pair. At each end, jumper the two black terminals together. Also jumper together the white and red terminals. Now connect the twisted pair of wires to the adjacent black and red terminals at both ends. Attach the shielding wire to the orange terminal at both ends.

When connecting two AC256M units, Belden cable type #9730 is convenient because it has three twisted pair. Use one twisted pair for the X bus and the other two for the C bus.

Locations of bus terminals. In the AC256M master unit, the intelligence unit has terminal strips for all three buses. The input/output unit has a terminal strip for the L bus only.

The AC256S slave unit has only the input/output unit seen at the right in FIG. 3. The L bus terminal in this unit must be used to connect it to the AC256M master.

Cable limits for all buses are 4000 feet. This is the maximum distance along the cable of any two units anywhere on the same bus.

INTERNAL SWITCH SETTINGS

IOU identity. Each input/output unit attached to a single L bus has a number between 1 and 16. The input/output unit in the AC256M master is assigned the number 1 at the factory. You must assign numbers to the input/output units in the AC256S slaves. As you add slaves to a system, assign them numbers in ascending order. All input/output units on the L bus must have different numbers, so that only one will respond to any request from the intelligence unit.

You give an input/output unit its number by setting the IOU identity switches during installation.

Set the IOU identity switches as follows (an OPEN switch is OFF):

| Switch Number | | | | |
|---|---|---|---|---|
| 4 | 3 | 2 | 1 | I/O Unit Number |
| OFF | OFF | OFF | OFF | 1(AC256M master) |
| OFF | OFF | OFF | ON | 2(slave) |
| OFF | OFF | ON | OFF | 3(slave) |
| OFF | OFF | ON | ON | 4(slave) |
| OFF | ON | OFF | OFF | 5(slave) |
| OFF | ON | OFF | ON | 6(slave) |
| OFF | ON | ON | OFF | 7(slave) |
| OFF | ON | ON | ON | 8(slave) |
| ON | OFF | OFF | OFF | 9(slave) |
| ON | OFF | OFF | ON | 10(slave) |
| ON | OFF | ON | OFF | 11(slave) |
| ON | OFF | ON | ON | 12(slave) |
| ON | ON | OFF | OFF | 13(slave) |
| ON | ON | OFF | ON | 14(slave) |
| ON | ON | ON | OFF | 15(slave) |
| ON | ON | ON | ON | 16(slave) |

Master identity. In the network configuration, where many AC256M masters communicate over the X and/or C buses, you must likewise assign each master a number. You can assign any number to any master, as long as they all have different numbers.

You assign a master a number by setting master identity switches on the intelligence unit.

Set the master identity switches as follows (an OPEN switch is OFF):

| Switch Number | | | | |
|---|---|---|---|---|
| 4 | 3 | 2 | 1 | Master Number |
| OFF | OFF | OFF | OFF | 1 |
| OFF | OFF | OFF | ON | 2 |
| OFF | OFF | ON | OFF | 3 |
| OFF | OFF | ON | ON | 4 |
| OFF | ON | OFF | OFF | 5 |
| OFF | ON | OFF | ON | 6 |
| OFF | ON | ON | OFF | 7 |
| OFF | ON | ON | ON | 8 |
| ON | OFF | OFF | OFF | 9 |
| ON | OFF | OFF | ON | 10 |
| ON | OFF | ON | OFF | 11 |
| ON | OFF | ON | ON | 12 |
| ON | ON | OFF | OFF | 13 |
| ON | ON | OFF | ON | 14 |
| ON | ON | ON | OFF | 15 |
| ON | ON | ON | ON | 16 |

Label each master in a network with its master number. Label each slave with the master number of its master in addition to its slave number under the master.

System size. In a system with fewer than 16 units, some input/output unit numbers will be unassigned. Intelligence unit messages for those input/output units will go unanswered. This can also happen if an input/output unit malfunctions; in either case, the intelligence unit can still use the L bus to communicate with the active input/output units.

Even so, it takes time and reduces performance if the intelligence unit periodically has to poll input/output units which aren't there. Thus, you can set switches on the intelligence unit to indicate how many input/output units are present in the system.

Set the system size switches as follows (an OPEN switch is OFF):

| Switch Number | | | | Input/Output Units |
|---|---|---|---|---|
| 8 | 7 | 6 | 5 | Which are Polled |
| OFF | OFF | OFF | OFF | Only #1 |
| OFF | OFF | OFF | ON | #1 and #2 |
| OFF | OFF | ON | OFF | #1 through #3 |
| OFF | OFF | ON | ON | #1 through #4 |
| OFF | ON | OFF | OFF | #1 through #5 |
| OFF | ON | OFF | ON | #1 through #6 |
| OFF | ON | ON | OFF | #1 through #7 |
| OFF | ON | ON | ON | #1 through #8 |
| ON | OFF | OFF | OFF | #1 through #9 |
| ON | OFF | OFF | ON | #1 through #10 |
| ON | OFF | ON | OFF | #1 through #11 |
| ON | OFF | ON | ON | #1 through #12 |
| ON | ON | OFF | OFF | #1 through #13 |
| ON | ON | OFF | ON | #1 through #14 |
| ON | ON | ON | OFF | #1 through #15 |
| ON | ON | ON | ON | all sixteen |

If you set all the switches ON, then the system will work no matter how many input/output units you have. If you number your input/output units consecutively and set the system size switches to indicate the present system size, you will always get the fastest communication between the intelligence unit and the input/output units, but you will have to open the master unit and change the switch settings whenever you add another slave unit.

The intelligence does not detect communication errors on input/output units you set it not to poll.

Restart. The AC256 only senses the states of the internal switches when power is first applied. So if you change the switches, you must restart the unit in order for the change to take effect. Restarting the intelligence unit erases its program, as though a "long" power failure had occurred. Thus, before you restart an intelligence unit, you may want to DUMP its program onto cassette tape, as discussed in Chapter 11.

Buttons on both the intelligence unit and input/output unit restart that unit.

Do not touch these buttons unless you mean to restart the unit.

PANEL OPERATION

Master control lights. Four control lights appear on the AC256M master unit only. They monitor the status of the intelligence unit.

The two CPU lights should flash continuously to confirm that the two processors in the intelligence unit are operating. SCAN flashes once at the end of each drum scan (see Chapter 11). ERROR indicates an internal integrity check (see Chapter 11).

Control lights. Six lights appear at the top of the front panel of both masters and slaves. They refer to the operation of the input/output unit.

CPU flashes once every 0.1 second to confirm that the input/output unit's processor is operating.

NO COMM lights up when the input/output unit has not gotten a message from the intelligence unit for four minutes. The input/output unit assumes a malfunction and turns all its outputs OFF until it hears from the intelligence unit.

OVERRIDE indicates an override condition on one or more of the 16 outputs in the unit. (These are discussed shortly.)

ON LINE lights up whenever the intelligence unit selects this input/output unit for communication. It should flash periodically. RECEIVE and TRANSMIT monitor the L bus between the input/output unit and the intelligence unit.

The front panel equipment is arranged in sixteen rows. Each row has a three-position switch, a light-emitting diode (LED) and the relay:

The top row of controls pertain to control point (output) number 1. The bottom row of controls pertain to control point 16.

The switches are known as the manual override switches. Each switch's three positions are labeled ON, AUTO, and OFF. Normally, all switches are set to AUTO. This puts the control point under control of the AC256's program. The equipment controlled is on "automatic"—it can turn on and off automatically, in accordance with the program.

Throwing the switch ON activates the control point (makes a connection between the C and NO terminals, and breaks the connection between C and NC), regardless of the AC256's program. Throwing the switch off deactivates the control point (breaking the connection between C and NO, and closing the circuit between C and NC).

The light next to the switch is on whenever the control point is activated, either by the program or manually using the override switch.

An override condition is happening when a switch is set to ON or OFF and the program is trying to set the output to the opposite state. The AC256 alerts you to override conditions using the ERROR light at the top of the front panel and through responses to certain console commands. Programs can also sense override conditions.

You'd use the override switches (1) in an emergency, where a condition not anticipated by the program happens and you have to override the program; (2) to establish temporary manual control while you correct a problem; or (3) to test the equipment or the wiring during installation before you put the equipment under control of the AC256.

You can damage certain equipment by "short-cycling" it—switching it on and off too rapidly. The AC256 program can guard against doing this, but it can't stop you from doing it with the override switches. Excerise caution and know what you're switching whenever you use the override switches.

During installation, you may use the override switches to test your wiring. During normal operation, set all the switches to AUTO.

The large square components are the relays that switch the control points on and off. They can be unplugged and replaced if they malfunction.

To the right of the relays, there is an area where you can write a description of that control point's use. You should also write in this space the symbol (see Chapter 5) the program uses to refer to that control point.

BOARD REPLACEMENT

The only user-serviceable parts in the AC256 are the relays on the control points. If an output override condition exists but all the manual override switches are in the AUTO position, a relay may be faulty.

Other malfunctions in an AC256 can generally be traced to one of the three major components:
The intelligence unit
The input/output unit
The power supply If the dual CPU lights in the master control group stop flashing, it may indicate a failure in the intelligence unit. Console messages which announce internal integrity test faults may also indicate a failure in the intelligence unit.

The CPU light in the group of six control lights monitors the integrity of the input/output unit. Output override conditions where the relays are not faulty may also indicate an input/output unit failure.

A shutdown of both groups of control lights or a general failure of the AC256 may indicate a power supply problem.

In case of a failure, replace the suspected faulty assembly with a spare assembly to verify that the fault is in that assembly—intelligence unit, input/output unit, or power supply. Ship the faulty assembly back to Andover Controls Corporation for repair or replacement.

To remove the intelligence unit:
1—Attach labels to the bus cables that are connected to the intelligence unit's terminal strips, indicating which strip each cable is connected to.
2—Remove the bus cables.
3—Remove the power connector.
4—Loosen the eight screws and remove the intelligence unit.

To remove the input/output unit:
1—Remove the power connector.
2—Loosen the six screws and remove the input/output unit.
3—Remove the two ribbon cables.

INSTALLATION SEQUENCE

This is a summary of the topics presented in this chapter. [Bracketed steps are optional.]

To install any unit, do these things first:
Mount the unit on the wall.
Attach input and output wires to the appropriate terminals.
Label the unit and the control points appropriately.
To install the first AC256M master, do this also:
Attach the console terminal, as discussed in Chapter 5.
Attach the batteries.
Plug in the power supply.

At the factory, the intelligence unit is already connected to the master's input/output unit over the L bus, and both units' internal switches are already set to support a system with a single input/output unit.

To add an AC265S slave to a system, do these additional things:

Set the IOU identity switches to the next available number for that system.

Connect the AC256S's L bus terminal to any other L bus terminal in the system.

[DUMP the master's program to cassette tape]

[Change the system size switches in the master to indicate that the new slave is present.]

[Restart the master.]

[RELOAD the master's program from cassette tape]

To add another master, take these additional steps:

Set the master identity switches to a value that no other master in the network has.

Connect the X bus terminal strip to that of any other master in the network.

Connect the C bus terminal strip to that of any other master in the network.

[Attach a console terminal]

Attach the internal or external battery.

Plug in the power supply.

USING THE CONSOLE

CONSOLE INSTALLATION

Although not absolutely necessary, it's helpful if the installer of the AC256 connects and uses the control console during installation. You may want to take the additional step of using the console to assign official symbols to the input and output terminals, as explained at the end of this chapter.

The console is either a video terminal, which displays text on a TV-like screen, or a printing terminal, which prints text on a roll of paper.

Locate the terminal near the AC256M master and plug the terminal into a power outlet. Attach the terminal's signal cable to the AC256M at the console port 134 (FIGS. 3 and 4).

Take these other steps to prepare the terminal for use:

Set the terminal's communication speed to 300 baud (30 characters per second). On Texas Instruments printers commonly used with the AC256, you do this by moving the LOW SPEED switch away from the LOW SPEED position. (AC256 units can communicate at speeds other than 300 baud; contact your Andover Controls Representative for details.)

Turn the terminal's power on. If it is convenient to do so, you may want to switch the terminal to LOCAL or OFF-LINE, type a few letters, and make sure you can see them on the paper or the screen. Then switch the terminal to REMOTE or ON-LINE.

Make sure the terminal is switched to FULL DUPLEX, as opposed to HALF DUPLEX or LOCAL COPY.

If the terminal's user manual contains other necessary steps, such as connecting parts of the terminal together or adjusting the display contrast, do those things too.

Lights inside the intelligence unit show the status of the EIA signals between the intelligence unit and the terminal.

For instance, if you turn the terminal on and off, you may see the light marked CTS change states. This is an optional step in verifying correct installation of the terminal.

LOGGING ON

The AC256 provides security control over the front panel override switches by use of a key lock. Since you can exercise just as much control from the console, the AC256 provides software security control too. The AC256 will not accept any commands from the console until you have logged on (identified yourself) through use of passwords. Passwords are secret sequences of characters, different for each AC256.

Device password. The first step is to type the correct device password. The device password is six characters long; the first two are &N. The last four are the AC256M's device name. The device name is assigned when the AC256 is manufactured.

If you are using an AC256 network where several masters are connected through the C bus, each master has a different device name. In the device password, use the device name of the master you want to gain access to. If this is not the master the console is attached to, you will be connected to it over the C bus.

When you use the console, you usually see the characters you type on the paper or screen of your terminal. But the AC256 does not print passwords as you type them, so that unauthorized people will not see them.

Type all six characters of the device password and then press the RETURN key. If you typed the correct password, the AC256 will respond with this:

P>

(If you don't see P>, try typing the device password again several times before concluding that there is a problem.)

Personal password. P> means that the AC256 now wants you to type your personal password. You will not see this password on the paper or screen either as you type it. When you are done typing it, press RETURN again.

The AC256 gives you four tries to type your personal password correctly. If you do it incorrectly all four times, the AC256 ends the session. If you are using a local terminal, you'll have to go back and type the device password again.

When you type your personal password correctly, the AC256 prints its device name, the data and time, and status information. Then it prints this:

R>

This means it is ready for you to type a command.

Additional security. One personal password is assigned to each AC256M as it is manufactured. Chapter 12 shows how you can program additional personal passwords into the AC256, giving certain individuals different degrees of control over the AC256.

Logging off. When you're done using the AC256 through the console, type &G and press RETURN. This ends the session; the AC256 won't let anyone else use it without repeating the password sequence. &G stands for Goodbye. Be sure to always use this command so that unauthorized people won't be able to use the terminal to disturb your programs or the building controls.

On some consoles (those that deassert the CTS signal when turned off), just turning off the console ends the session.

When the session ends, the AC256 hangs up the phone it is using an auto-answer modem.

Remote login. If the first two characters of the device password the AC256 receives are "&R" instead of "&N", the AC256 assumes that it is talking not to a human but to another computer. You might do this to let a general-purpose computer influence the building controls, or to prepare your AC256 commands and programs on a computer and have it type them to the AC256 after you have corrected any mistakes.

The only difference between regular and remote login is that, in remote login, the AC256 uses a protocol. Among other things, it uses special characters and checksums to enclose every line it sends. This lets the other computer detect and compensate for communication errors such as noise on a telephone line.

For the specifications of this protocol, contact your Andover Controls representative.

SPECIAL KEYBOARD KEYS

Certain keys on the keyboard have special meanings to the AC256. You have already seen one example: the RETURN key indicates that you are done typing a command or a line. Always press the RETURN key after typing any command. If your dialogue with the AC256 seems to be stalled, the AC256 may just be waiting for you to press RETURN.

Correcting mistakes. The key labeled DELETE or RUBOUT rubs out the last character you typed. For instance, suppose you wanted to type MODIFY but instead typed:

MODIFH

To rub out the H, press the RUBOUT key. The AC256 prints a backslash (to show that you are rubbing out characters) and prints the character it has rubbed out:

MODIFH/H (You could continue to use the RUBOUT key to rub out more characters from that line.) Now type the Y. The AC256 prints another backslash to show that you are no longer rubbing out characters:

MODIFH/H/Y

You should learn to read this line as though it just said MODIFY.

CTRL key. Your terminal may have a key labeled CTRL or CONTROL. You see this key to send special signals to the AC256 by holding it down while you type a letter. For instance, to "type Control-S," hold down the CTRL key, then type S.

To cancel an entire command line, type Control-U.

ESCAPE. Pressing the ESCAPE key always returns you to R>, where the AC256 is ready for another command (unless you haven't logged on yet). When you are typing a command in response to R>, ESCAPE has the same effect as Control-U. In commands that take more than one line of typing, Control-U just cancels the line you were typing; ESCAPE cancels the entire command, returning to R>. (On some terminals, ESCAPE is labeled ESC or ALT MODE. If your terminal has none of these, use Control[.)

Suspending output. If you type Control-S, the AC256 stops printing text to you. Typing Control-S again makes the AC256 resume printing text from the point where it left off.

Cancelling output. If you type Control-O, the AC256 cancels any message it was printing to you.

GENERAL TYPING RULES

Whenever the AC256 wants you to type something, it prints a prompt that tells you what state the AC256 is in and what type of input would be appropriate now.

P> means you should type your personal password.

R> means you can type any AC256 command.

Other prompts mean that you are in the middle of entering a command or editing part of the AC256's program memory.

Every AC256 command starts with a word, called the keyword, a verb that identifies the type of command. For instance, ASSIGN and CLEAR are keywords. Anytime you want to "type an ASSIGN command," you must start by typing ASSIGN. (Appendix A lists all the commands.)

Depending on the keyword you typed, you must type additional information to specify the exact thing you want the AC256 to do. For instance, in the CLEAR command, you must follow the keyword CLEAR with the name of the thing you want cleared (erased). Some types of commands take several additional pieces of information. You must separate them from each other, and from the keyword, by typing at least one space.

Abbreviation. Whenever you have to type a keyword, you can instead abbreviate the word to its first few letters, as long as the abbreviation is unique. For instance, instead of ASSIGN, you can just type A (since no other command begins with A). Instead of DISABLE, you can just type DI. (Just typing D would not be unique—it might also mean DUMP, which is another command. Appendix A shows the smallest unique abbreviation for each command.)

Long form of commands. This manual shows all commands in their short form, typed entirely on a line. For example, to rotate to line 1 on drum 5, you'd use the ROTATE command:

ROTATE 15

But you can just type the keyword and press RETURN. You'd do this especially if you forgot what other information was needed or the order in which is has to be typed. The AC256 responds by asking you for the additional information it needs. For instance, suppose you just typed ROTATE and pressed RETURN. The AC256 would print "Line #?" You now type the line number and press RETURN. The AC256 now asks, "Drum?" When you type the drum number and press RETURN, you have completed entry of the command.

Help. If you need even more help, you can ask the AC256 to print the help page. This is a 20-line summary of the AC256's commands. If the AC256 has printed R>, you can see the help page by typing HELP and pressing RETURN. If the AC256 has printed a different prompt, meaning that it wants you to type some other information, you can see the help page by typing? and pressing RETURN. After the AC256 prints the help page, it asks you again for the information it wants.

SETTING THE DATE AND TIME

After you type a correct personal password and the AC256 determines that you are authorized to use it, it prints the system status. This message takes several lines and gives you the following information:

The device name.

The numbers of any input/output units where Output Overrides have occurred, or which are not responding to the intelligence unit.

The number of Program Blocks remaining for use. (This is a measure of the program memory you have used.)

An indication of whether the AC256 is taking histories (see Chapter 10).

The unit's official date and time.

You can obtain this same report at any time after you log on by typing the command:

PRINT STATUS

The first time you log on, the AC256 does not know the date or time. It prints zeroes and asterisks where it would normally print the date and time. The status message reminds you to enter the correct date and time.

Proper AC256 operation requires that you type the correct date and time, since you will typically want to write programs whose behavior depends on the date and time. After you type a date and time for the AC256 to use as the official date and time, clocks inside the AC256 automatically change the date and time to keep it correct.

The SET TIME command declares the official date and time. Type the time as it will be when you press the RETURN key to terminate the command. Use exactly the format shown in FIG. 15.

This example is a correct entry for Friday, May 15, 1981 at exactly 9:15 P.M.

As another example of partial command entry, suppose you forget the order in which to type the date/time information. Just type SET TIME and press RETURN. The AC256 asks for the remaining information by printing this:

YY MMM DD WKD HH MM SS?

SYMBOLS

After typing the date and time, you must assign symbols (names) to all the control points and inputs. When programming the AC256, you cannot simply give it an instruction such as "Turn on output 5;" you must use the symbolic name of that output port. Assigning names to the input and output terminals may be done by the electricians who install the AC256.

Legal symbols can have from two to eight characters. The first character must be a letter. The second can be a letter, period, underline, or percent sign. Each additional character can be any of these or a digit. You cannot use as a symbol the predefined variables listed in Appendix A.

The symbols you choose should indicate in an obvious way the devices they refer to. Even so, there should be an official list or chart indicating the devices the AC256 controls and the symbol assigned to each. Here are examples of legal symbols:

| | |
|---|---|
| ZONE1.HT | TEMP_EXT |
| ZONE1.AC | HUM_EXT |
| ZONE1.LT | ALARM%%3 |
| FAN_14_W | SWITCH%2 |
| FAN_14_E | |

An input or output connection can have only one name, and a symbol can refer to only one input or output connection, in order to be a unique reference.

The ASSIGN command lets you assign symbols to the input or output connections anywhere in the AC256 system—that is, in the master or any of its slaves. When you type the ASSIGN command, you identify one of the system's input or output connections and give the symbol to be assigned to it, as follows:

ASSIGN connection name

How do you identify a connection? Suppose first that your system consists of just a master. You identify sixteen control points with the letter O (output), as follows:

| | | | |
|---|---|---|---|
| O1,1 | O1,5 | O1,9 | O1,13 |
| O1,2 | O1,6 | O1,10 | O1,14 |
| O1,3 | O1,7 | O1,11 | O1,15 |
| O1,4 | O1,8 | O1,12 | O1,16 |

You identify the inputs in the same format, although there are 32 inputs. But instead of using the letter O, you must pick one of four letters, indicating the way you will be using the input:

V—to read it as a voltage

T—to read it as a temperature (number of degrees Fahrenheit)

D—to read it digitally (ON or OFF).

C—to read it as a counter (number of pulses sensed in the most recent interval)

For instance, D1,27 refers to input number 27, and declares that you don't want to know the voltage at that input, just whether the swich is ON or OFF.

For every input, you must make this decision when you use the ASSIGN command. That is, you can use each input in only one of the four ways.

Systems. The number before the comma is the number of the input/output unit. If your AC256M master controls several AC256S slaves, then you refer to the slaves' input and output connections with the numbers 2 through 16. For instance, C14,22 refers to the 22nd input of slave number 14, and declares that you want to treat that input as a counter.

Networks. If you have a network of several AC256M masters, they cannot operate each other's control points or sense each other's inputs. They can communicate with each other only in another way to be seen later.

Variables, discussed completely in Chapter 7, can also be assigned symbols. The conversion variables are known as V1 through V128. To assign a symbol to the variable Vn (where n is a number from 1 through 128), use a command of this form:

ASSIGN SVn name

The external variables are known as X1 through X64. To assign a symbol to the variable Xn (where n is a number from 1 through 64), use a command of this form:

ASSIGN SXn name

Here are examples of complete ASSIGN commands:

ASSIGN C1,1COUNT_1

ASSIGN C1,2 COUNT_2

A T1,3 EXT_TEMP

A T1,4 INT_TEMP

A O1,1 LIGHTS

A O1,2 HEATER

A O1,3 FAN

ASSIGN SV20 SUMTOTAL

ASSIGN SX2 SYNCH.2

Reassignment. If you try to reuse a symbol you've already used, the AC256 prints "Duplicate Symbol Assignment". But you can give an item a new symbol. Simply type the ASSIGN command for the new symbol. The AC256 will respond in this way:

SYMBOL ALREADY ASSIGNED TO CHANNEL-REASSIGN?

If you type Y (Yes) and press RETURN, the AC256 performs the new assignment, as you requested, and discards the old symbol. (You can reuse this symbol now if you want.)

You can give an item a new name even after you've typed in a program that refers to it using the old symbol. The AC256 accepts only the new symbol from then on, and automatically changes all its programs to use the new symbol.

Deleting symbols. In many cases, typing the keyword Z (Zap) tells the AC256 to delete some information. If you use the ASSIGN command to assign an input or an output the symbol Z, the AC256 instead deletes the symbol you had assigned. For example:

ASSIGN C1,1 Z

You can delete a symbol even after you've typed in a program that uses that symbol. However, if you ask the AC256 to print your program on the console, it will not correctly print the deleted symbol. If you intend to keep using an input or output connection, you should give it a new symbol after deleting its old one.

Printing symbols. You can see a list of all the input and output connections you've assigned to a particular input/output unit by using the PRINT command followed by the input/output unit's number. (The PRINT command also shows the value of the input or output connection, and some other information.) For instance, suppose you typed all the ASSIGN commands shown in the previous example, and then typed PRINT 1. Here's what you might see:

| Assigned Variables on IOU #1 | | |
|---|---|---|
| | Symbol | Value OVR DIS |
| C1,1 | COUNT_1 = | 20 |
| C1,2 | COUNT_2 = | 540 |
| T1,3 | EXT_TEMP = | 109.2 |

-continued

| Assigned Variables on IOU #1 | | |
|---|---|---|
| | Symbol | Value OVR DIS |
| T1,4 | INT_TEMP = | 109.2 |
| O1,1 | LIGHTS = | OFF |
| O1,2 | HEATER = | ON |
| O1,3 | FAN = | ON |

The column labeled OVR contains an asterisk if an override is occurring on that output. The column labeled DIS contains an asterisk if you have disabled the input or output, as described in Chapter 11.

DRUM PROGRAMMING

A NOTE TO PROGRAMMERS

We at Andover Controls believe that anyone can learn drum programming in a couple of days—but we often jokingly add that "people with previous programming experience may need an extra day." There is an element of truth behind this; in several respects, the AC256 is programmed differently from common general-purpose computers.

Firstly, general-purpose computer programs are instructions to a computer in strict sequence. After carrying out an instruction, the normal thing for a computer to do is to automatically proceed to the next instruction. But the normal thing for the AC256 is to remain on the same line indefinitely until your program explicitly directs it to a different line.

Secondly, if there are eight things you want to accomplish with a general-purpose computer, you write a program to do all eight things and use it under the assumption that only one thing at a time can happen. But on the AC256, you essentially write eight separate programs, one to do each of the tasks. These small programs all proceed at the same time.

Finally, AC256 programs are more structured than the average computer's. When programming the AC256, you must put all your arithmetic computations in one area, all the sequencing instructions in another area, and all the console messages in a third area. You identify variables by numbers; there are several classes of variables with different properties and uses.

To our old customers. If you are familiar with the programming of Andover Controls' Sunkeeper, you will find that programming the AC256 is quite comparable. The AC256 adds several new features, such as symbols for the input and output connections, and several new drums and areas to support new applications. The AC256 also has vastly increased program storage space. But conceptually, the AC256 works in the same way as the Sunkeeper. CONTROL DRUMS Each AC256 provides 320 different program areas, numbered from 1 to 320. You can use as many as you need for your programs.

Think of each program area as a cylindrical drum with program lines on its surface. If you rotate a drum to a certain line, the AC256 will act on accordance with the instructions you put on that line. The drum may stay on that line indefinitely, or it may contain instructions that say when it should exit that line and, if so, to which other line it should rotate.

For every control drum, there is a pointer that tells what line the drum has been rotated to—that is, which line is currently active. (FIG. 16)

The different drums typically described different processes. For instance, you'll see shortly how to write a program that senses a temperature and operates a heater as a thermostat would. An AC256 usually has to control many different processes. One drum is used to describe each process. For instance, a single AC256 can take the place of many thermostats and still do more.

All the processes occur at the same time. Thus, the AC256 simultaneously obeys instructions from all the drums that have instructions on them. This sounds complicated, but in practice, it isn't. Once you have worked out the program for a particular drum so it has no errors, you don't have to worry about it again. It will operate smoothly from then on, letting you move on to the task of describing the next process you want the AC256 to control (Actually, the process is not simultaneous. Chapter 11 shows how the AC256 interprets your programs in a strict, predictable sequence, and shows what happens if, for instance, different drums have contradictory instructions on them.)

CONTENTS OF A DRUM

Every drum has the following lines:
Control lines numbered from 1 through 99. (You need not use all 99 lines.) The control lines contain the main instructions for the AC256, plus information to tell it in what sequence it should obey the instructions.
A comment line. You can put any text you want on this line (typically a description of what you're using the drum to do). The contents of the comment line do not affect the drum's operation.
An emergency line. This is comparable to a control line, but has special significance. It is discussed later.

A comment line consists of a single line of text. Control lines and emergency lines consist of several fields. There are two kinds of fields, action fields and exit fields. In any control or emergency line, you can use up to nine of each kind.

Action fields are actual instructions to the AC256. A typical instruction might turn on or off one of the control points. A line's action fields are numbered 1A, 2A, and so on, up to 9A.

The most common instruction is the assignment instruction. This tells the AC256 to set something equal to a given value. You type an assignment instruction by typing the value, a right arrow (>), and then the place you want that value to go. Control points can receive the values ON and OFF. If there is a control point called HEATER, you can activate it (turn the heater on), with this instruction:

ON>HEATER

This is an instruction, not a command. You may not type this line as a command (when the AC256 displays R>). It can only appear in a drum.

To turn the heater back off, you'd use this instruction somewhere else in the drum:

OFF>HEATER

An assignment instruction can set several things to the same value. For instance, to turn on both the HEATER and the CONVEYOR, you might write:

ON>HEATER, CONVEYOR

In addition to the assignment instruction, there are other instructions, DISPLAY, PRINT, and SET.

You'll see later what these instructions do, as well as many other things you can do with the assignment statement.

An exit field tells the AC256 when it should leave this line and rotate the drum to another line. It also shows which line to rotate to. A line's exit fields are numbered 1X, 2X, and so on, up to 9X.

The contents of an exit field look like this:

Exit to line 2 If TEMP>68

Suppose TEMP refers to an input terminal that senses the room temperature. This exit field tells the AC256 to rotate the drum to line 2 when the temperature is greater than 68 degrees.

If there is nothing following the word "If", then the drum always rotates to the line you specified. Suppose line 5 contains this exit field:

Exit to line 6 If

Then, after doing whatever line 5's action fields told it to, the AC256 always rotates the drum to line 6.

WRITING A DRUM PROGRAM

Write your drum program on paper before you type it into the AC256. The AC256 will let you change or correct the program after you type it, but paper makes it easier to see large amounts of your program at the same time.

Use a coding form such as the one included with this manual. (FIG. 21)

Flowcharts. When you write a drum program, drawing a flowchart may help you visualize the program's operation and detect errors. On the AC256, a flowchart should only describe the operation of a single drum; draw other charts to illustrate other drums. To draw a flowchart, draw a box for each drum line your're using. In the box, write the contents of that drum line. (Write it as you would type it to the AC256 or just explain it in words.) Now, for each exit field on that drum line, draw an arrow on the flowchart to the box representing the line the drum might rotate to.

Flowcharts exist solely to help you and others understand how a particular drum program works. Consider these techniques when drawing or redrawing a flowchart:

Arrange the boxes so that most of the arrows flow in the same direction (usually down).

Highlight the boxes that the drum will be pointing to most of the time.

One way to use a flowchart is to put a coin or marker on one of the boxes and move it to other boxes in accordance with the program you wrote. By estimating the readings input devices might produce in unusual situations, you can verify that the program moves to the correct box to handle the situation. The coin or marker represents the drum pointer.

Example. Here is an example of a small drum program, as the AC256 would print it:
LINE 1
   (1A) OFF>HEATER1, HEATER2
   (2A) ON>INDICATR
   (1X) Exit to line 2 If TEMP<67
LINE 2
   (1A) ON>HEATER1, HEATER2
   (2A) OFF>INDICATR
   (1X) Exit to line 1 If TEMP>73

Explanation. This program uses only the first two of the 99 control lines. As you can see from the exit fields (1X), line 1 and line 2 exit to each other, so the drum goes back and forth. Line 2 says to turn two heaters on and to turn an indicator light off. The exit field makes the drum stay on line 2—with the heaters still on—until the sensed temperature is high enough. Line 1 turns both heaters off and turns the light on. Line 1's exit field makes the drum stay there until the sensed temperature falls below a threshold. Then the drum rotates back to line 2.

Thus, this small program acts as a thermostat, controlling the heating of an area. Programs in other control drums might control the heating of other areas, control cooling, or do other unrelated things.

TYPING IN A PROGRAM

To type a program into the AC256, you must use the EDIT command to tell the AC256 which drum you want to edit; then open, modify and close each line individually.

The EDIT command is followed by the number of the drum you want to edit. For example, to edit drum number 220, you'd type:

EDIT 220

After you type the EDIT command, the AC256 types out the contents of the comment line of the drum you specified. This text may indicate the purpose of the drum program, the intent of the original programmer, and the date of the last modification.

The AC256 normally prints "R>" to say that it is ready for a command. When you give the editing command, the AC256 goes into Editing Mode. In Editing Mode, the AC256 prompts you with the letter E and the number of the drum you are editing. For example:

E220>

To make any modification to a drum line, you must open the line. Doing so selects that line for editing. When you are done changing the line, you close the line. There are several ways to close the line. Let's consider several uses of Editing Mode:

To type a program into a drum, use the EDIT command to select the drum. When you see the E>prompt, type the O (open) command to open the first line you want to work on. For instance, to open line 1, type:

O1

(If you want to work on the drum's Emergency line, type "OE". If you want to work on the drum's Comment line, type "OC".)

Suppose you had selected drum 220 for editing and had opened line 1. The AC256's response confirms these two facts:

E220-1>

The AC256 is now ready for you to type the text for that line.

To type action fields, type the field number (1A, 2A, and so on), followed by the instruction which you want in that field. To type exit fields, type the field number (1X, 2X, and so on), then the line number to exit to, then the "If" expression.

As usual, you can press RETURN after typing the first item; the AC256 will respond by telling you what type of item it wants you to type next.

To type an exit field that always exits, type the field number, then the line number to exit to, then press RETURN. When the AC256 asks you for the "If" expression, just press RETURN again.

If as the field number you just type A, you automatically refer to the first unused action field on that line. If you just type X, you refer to the first unused exit field.

When you are done with that line, you can use the O (open) command to open another line in the same drum. This automatically closes the last line you were working on. Or you can type C (close) and press RETURN. The C command closes out the line you were working on and ends the EDIT command, returning you to R>. When you close a line, the AC256 writes onto the drum any changes you made to that line.

Remember that pressing ESC or ESCAPE cancels any command, including an EDIT command. If you press ESC with a line still open, any text you typed since opening the line does not go onto the drum.

Consider the earlier example of a small thermostat program. If you typed this program into drum 220, this is what would appear on the console (the bold text is what you would type):

```
R>EDIT 220
E220>OC
E220-C>THERMOSTAT PROGRAM
E220>O1
E220-1>1A OFF>HEATER1, HEATER2
E220-1>2A ON>INDICATR
E220-1>1X 2 TEMP<67
E220-1>O2
E220-2>1A ON>HEATER1, HEATER2
E220-2>2A OFF>INDICATR
E220-2>1X 1 TEMP>73
E220-2>C
R>
```

After using the EDIT command to open drum 220, the typist opened the comment line and typed an explanation of this program. The comment line closes automatically after you type a line of text into it. Then the typist opened line 1 and typed three fields: 1A, 2A, and 1X. Then the typist opened line 2 (which closed line 1) and typed the 1A, 2A, and 1X fields for that line. Finally, the C command closed line 2 and completed the EDIT command.

Here are other things you can do in Editing Mode:

To change a field, just type the field name and contents as though you were typing it for the first time. The new text will replace the old text when you close the line.

To not change a field once you've typed the field name, just press RETURN. The line remains open, but the field whose name you typed is unchanged.

To erase a field, type Z (zap) as the contents. The AC256 renumbers any subsequent fields. For instance, if a line has fields 1A, 2A, and 3A, and you erase field 2A, the old field 3A is now called field 2A.

To erase an entire line, type Z (zap), a space, and the line number. If you had a line open, it is automatically closed. Then the entire contents of the line you named are erased.

To erase the program typed in the previous example, you could do it one field at a time:

```
R>EDIT 220 THERMOSTAT PROGRAM
E220>O1
```

```
E220-1>A1 Z
E220-1>A2 Z
E220-1>X1 Z
E220-1>O2
E220-2>A1 Z
E220-2>A2 Z
E220-2>X1 Z
E220-2>C
R>
```

Or you could erase the program one line at a time:
```
R>EDIT 220
E220>Z 1
E220>Z 2
E220>C
R>
```

The CLEAR DRUM command lets you erase an entire drum in a single operation. It is a separate command from the EDIT command; you can use it when the AC256 prints R>. Follow the command with the number of the drum you want to erase. For instance, this command also erases drum 220:

```
CLEAR DRUM 220
```

You can type certain letters instead of the number, to erase the history drum (H), message drum (M), password drum (P), conversion drum (V), or external drum (X). These drums are discussed later.

To clear all the control drums and these other four drums, type:

```
CLEAR DRUM ALL
```

Printing a drum line. To verify that you have typed a drum line correctly, you can use the P (Print) Editing Mode command to see the contents of a line. The P command is only available when the AC256 has typed an E>prompt. It takes three forms:
If you just type P and press RETURN, you'll see the contents of the line that's currently open. (It's illegal to use this form when you don't have a line open.) The program you see is not necessarily permanent—if you have changed this line since opening it, you will see your changes, but they will not be put on the drum until you close the line.
If you follow P with one number, you'll see the contents of the line with that number on the same drum that you are editing.
If you follow P with two numbers, the first number specifies a drum and the second number specifies a line on that drum.

Asking the AC256 to print a line does not close the line you're editing or make any other changes in the program.

The PRINT DRUM command, like the CLEAR DRUM command, is available when the AC256 prints R>. It prints the entire contents of the specified drum. Follow the command with the number or letter of the drum you want printed:

```
PRINT DRUM 200
```
You can also type:

```
PRINT DRUM ALL
```

The PRINT INDEX command is a quicker way than PRINT DRUM to obtain a brief summary of the contents of the control drums. Follow the command with the number of a control drum or the word ALL. The PRINT INDEX command prints the contents of the comment lines of the drums you specified. For example:

```
PRINT INDEX 5
PRINT INDEX 4,5,6
PRINT INDEX 161-320
PRINT INDEX ALL
```

EMERGENCY LINE

Every control drum has an emergency line-"line number E." Emergency lines contain especially important instructions to the AC256.

At any time, a control drum is pointing to one of its 99 control lines. The AC256 is following the instructions on that line. The AC256 ignores the instructions on the other lines until an instruction in an exit field rotates the drum to that other line. But the AC256 will obey exit instructions on the emergency line no matter which numbered line the drum is pointing to.

An emergency line cannot contain action fields; it can only contain exit fields. Like any other exit fields, each of these tells the drum to rotate to a certain line when a certain condition is met. If any of the events the emergency line describes happen, the drum will indeed rotate to the specified line, even though it wasn't pointing to the emergency line to begin with.

This means that, in a drum where you use the emergency line, the lines you drew in the flowchart do not completely describe the drum. The emergency line can interrupt any line at any time.

You'd use an emergency line to protect equipment in case of emergencies. For instance, a thermostat program like the example in this chapter keeps the temperature in a narrow range. It might have an emergency line in case the heater fails. This line checks whether the temperature has fallen below 50 degrees and, if so, interrupts the usual program, regardless of what line the drum was pointing to and whether the heater was on.

In the following example, an emergency line tests for critically low temperatures and forces the drum to rotate line 90, which turns on an alternate heater and sounds an alarm:

LINE E—(emergency line)
 (1X)—Exit to line 90 If TEMP<50
LINE 1
 (1A)—OFF>HEATER1, HEATER2, ALARM
 (2A)—ON>INDICATR
 (1X)—Exit to line 2 If TEMP<67
LINE 2
 (1A)—ON>HEATER1, HEATER2
 (2A)—OFF>INDICATR
 (1X)—Exit to line 1 If TEMP>73
LINE 90 (emergency has occurred)
 (1A)—ON>HEATER3, ALARM
 (1X)—Exit to line 1 If TEMP>73

Note that the temperature would remain critically low for at least a short time even after the drum went to line 90. This would make the emergency line force the drum to line 90 over and over again. (This wouldn't affect our example.) In general, you need more advanced techniques, discussed in the next few chapters, to produce a realistic and useful program.

MANUALLY ROTATING A DRUM

Every drum has a position called line 0. Line 0 has no action nor exit fields. A drum can rotate to line 0; when it points to line 0, the AC256 is obeying no instructions from that drum. When the drum is at line 0, the drum is "out of service."

When you first turn the AC256 on, all drums point to line 0. In addition, if you ever make a drum try to rotate to a line that doesn't exist, it goes to line 0 instead.

The ROTATE command lets you rotate any drum to any line (0 through 99) from the console. To use it, follow the keyword ROTATE with the line number and the drum number. Here are two examples:

ROTATE 16—rotates to line 1 on drum 6

ROTATE 022—rotates to line 0 on drum 22—that is, disables the program on drum 22

You can rotate several drums to the same line number by typing a command like this:

ROTATE 022,23,24,25,26—takes drums 22 through 26 out of service

ROTATE 0 ALL—rotates all the drums to line 0

After writing a program into a drum, remember to rotate the drum to the line which is the starting point of the program. If you adopt the practice of writing all your drum programs to start at line 1, then you can start or restart them all by simply typing:

ROTATE 1 ALL

If you specify in the ROTATE command a line you haven't used, the drum instead rotates to line 0.

The safe way to edit a drum is to use the ROTATE command to move the drum to line 0, use the EDIT command to make your changes, then ROTATE the drum back to the program's starting point. In some cases, you can dispense with the ROTATE command and EDIT a "live" drum. But consider what side-effects could occur if the drum rotated to a line you had changed before you had changed other lines.

Even when a drum is on line 0, the exit fields of the emergency line can take effect. This means that a drum with an emergency field can restart itself even if you rotate it to line 0.

To see what line a drum is on, use this command with the number of the drum you're interested in:

PRINT POINTER 220

EXPRESSIONS AND VARIABLES

THE NEED FOR VARIABLES

The line to which a drum has rotated tells you the essential facts about the state of the process at the present time. In the thermostat example in Chapter 6, if the drum is at line 1, the temperature is sufficieint. If the drum is at line 2, the temperature is too low and the heater has been activated. If the drum is at line 90, the temperature is critically low and emergency procedures are in effect.

But in addition to the current state of the process, many drum programs need to know or remember information obtained in the past. A drum program may want to activate an output based not only on the inputs it can sense right now, but based also on information it computed previously. For instance, a drum program may have to remember that an input switch has been pressed, even if the circuit is no longer closed.

To do this, the program uses variables. Variables are places where you can store information for as short or long a time as you want. They are called variables because their contents can vary. Each variable can hold only one piece of information at a time. You usually use the assignment instruction to put a value into a variable. At this time, its previous contents are lost.

Variables let programs in different drums communicate with each other. There is no way that a drum can force a different drum to rotate, or that a program in a drum can exit to a line in a different drum. But if one drum places a value in a variable, any other drum can sense that value as though it were an input terminal. One type of variable can be sensed even by programs in a different AC256M master unit.

The AC256 has several different kinds of variables. Each kind is suited for different purposes.

FLAGS

Flags are the simplest kind of variable. A flag can have only two contents: It can be ON or OFF. That is, you can activate or deactivate a flag just as you can an output.

Every AC256M master has one set of 320 flags. Their names are F1, F2, and so on, through F320.

Although there are the same number of flags as there are control drums, you don't have to use F1 in control drum 1, and so on. You can use F1 through F280 for any purpose you want, gaining access to them from one control drum or from several.

Flags F273 through F320 are reserved for special uses by the AC256. The AC256 automatically turns these flags ON and OFF to indicate that some event has occurred.

Using flags. You turn flags ON or OFF using the assignment instruction. Here are some examples:

ON>F2

OFF>F201

ON>F5, F6, F7

Turning a flag ON is also called setting the flag. Turning a flag OFF is also called clearing it. You can use the words TRUE or UP instead of ON; the words FALSE or DOWN also mean OFF.

You can sense the state of a flag in the exit field of a drum line. For example:

Exit to line 6 If F2=ON

As a proposition, a flag is "true" if it is set, "false" if it is clear. So instead of the form above, you could simply say:

Exit to line 6 If F2

Transfer of value. Another general function of the assignment instruction is to transfer the value or contents of one variable to another variable. For instance, the following instruction sets or clears flag F30, depending on whether flag F22 was set or cleared originally:

F22>F30

Binary input. Flags are binary or dual-state (ON/OFF) elements. Other binary elements within the AC256 are the control points and digital input terminals (input terminals named in D mode in the ASSIGN command). Thus, you can use an assignment instruction to transfer a digital input into a flag. The flag then "remembers" what state the input was in at the time the assignment instruction occurred.

PHOTOCEL>F114

You can also name a control point to the left of the ">". The assignment instruction then uses the flag to remember whether the output was on or off at the time of the instruction.

HEATER>F122

You cannot use the assignment instruction to transfer a binary value, such as a flag or digital input, to a control point. This is interpreted specially: See "Pulsed Analog Output" in Chapter 11.

Managing flags. For every flag you use in your drum programs, you should be able to describe your use of the flag in an English sentence, so that the sentence is true whenever the flag is set, and false whenever it is clear. Here are examples of sentences describing flags:

F34 Someone has pressed the button requesting heat but the heater hasn't been turned on yet. (One drum might monitor the button, assigning ON>F34 when the button is pressed. Another drum with responsibility for controlling the heater might wait for the flag to be set, turn on the heater, then do OFF>F34. This is an example of using variables of inter-drum communication.)

F35 Air conditioners in Zone 2 of the building must not be activated.

F36 The building is in danger of incurring a ratchet cost penalty; drum programs should take extra steps to conserve energy.

A complete list of sentences describing the flags you are using is a necessary part of the documentation for your program. It is vital to help you and others understand the program inside the AC256, should it ever need changing. Define flags so that they are usually OFF—so that the statement defining them is usually false.

COUNTERS

Each AC256M has a set of sixteen counter variables, or counters. A counter can hold a counting number from 0 through 9999. The counters are named C1, C2, and so on, through C16.

Don't confuse these counter variables with the counter-mode inputs. You can define any input terminal as being a counter by using the letter C in the ASSIGN statement. The sixteen counter variables are independent of these inputs.

Here are examples of four things you can do with counter variables using the assignment instruction:
Assign a certain value to a counter

0>C2

9215>C11

Move a variable's value to a counter

C1>C2

V6>C3

Make a counter count up by one

UP>C5

Make a counter count down by one

DOWN>C5

In these last two forms, the assignment instruction does not assign a value to the counter but instead modifies its present value. An instruction that counts up past 9999 or counts down below 0 will not work.

You can use counters to keep track of the number of times an event has occurred or just to store a number.

Input of counting numbers. Input terminals named in the C mode in the ASSIGN statement provide counting numbers to the program. The counting number indicates how many pulses occurred on the input during a sampling period. You could use the assignment instruction to transfer this count into a counter or variable:

FAN.FREQ>C12

CONVERSION VARIABLES

There are 128 conversion variables whose names are V1, V2, and so on, through V128. They can hold a digital value (ON/OFF), a counting number, or a positive or negative decimal fraction as large as 10 to the 38th power (1 followed by 38 zeroes). A conversion variable can store a decimal fraction with about 6 digits of accuracy.

(Actually, counters C1 through C16 can also hold decimal fractions, but you cannot then count them UP or DOWN.)

Analog input. Input terminals that have been named in T or V mode in the ASSIGN command—that is, those that are sensing temperatures or voltages—return decimal fractions to the program. You can use the assignment instruction to store these values (or any decimal fraction) in any variable except a flag. For example:

EXT.TEMP>V4

VOLTAGE3>C1

98.60>V104

If you use the assignment instruction to move a decimal fraction to a control point, it is interpreted specially. (See "Pulsed Analog Output" in Chapter 11.)

Conversion drum. Although you can use assignment instructions on V variables, you normally use them in a different way. The conversion drum contains a series of equations which define values for V variables. By typing suitable equations into the conversion drum, you can make the V variables depend on the status of the input terminals or of selected variables.

The conversion drum rotates continuously, independently of the control drums. Therefore, the control drums can assume that the V variables are automatically kept up-to-date. Drum programs should treat V variables as values that change independently, as though they were user-defined or "intelligent" input terminals.

Here is an example of part of a conversion drum:

V1=INT_TEMP

This line says that variable V1 will always track the internal temperature sensed by terminal INT_TEMP. (This example is so simple that it would never actually appear in use.)

V2=(V1−32)*(5/9)

Assuming V1 is a temperature in degrees Fahrenheit, V2 is always the same temperature in degrees Celsius.

V3=EXT_TEMP−INT_TEMP

This might represent the difference between external and internal temperatures.

V4=V4+1

This equation means that, on each rotation of the conversion drum, V4 will receive a value of one greater than its previous value.

(A control drum might periodically reset the count by using the assignment instruction 0>V4.)

You can define a V variable with a higher number in terms of V variables with lower numbers, in order to produce highly complex equations. For instance, V6, V7, and V8 could compute intermediate results, and V9 could then combine all three to produce the final result used by the drum programs.

EDITING THE CONVERSION DRUM

You edit the conversion drum using the EDIT command, as you would for any other drum. To specify the conversion drum, you type:

EDIT V

The conversion drum has up to 128 lines. Each line defines the value of the corresponding V variable. For instance, line 4 contains an expression giving the value of V4.

Once you've selected the conversion drum for editing, you use the O (Open) command to specify the line to edit. The AC256 prints the current contents of that line, if there are any, then asks you to type the new contents. For instance, if you were editing line 4, the AC256 would request a new definition of V4:

V4=

The rules are the same as for editing control drums. If you just press RETURN, the contents of line 4 are unchanged. If you type Z and press RETURN, line 4 is deleted. You can type a new expression into this line. It is written into the conversion drum only if you close that line. If you press ESC, you leave Editing Mode and the changes you've made since opening the last line do not take effect.

EXPRESSIONS

Expressions can appear on the left side of the > sign in an assignment instruction, in an exit field in a control drum, and in the conversion drum. Expressions can be as complex as you want. They can contain variables or actual numbers (constants). They can contain counting numbers, decimal fractions, or flags. Here is the complete list of legal expressions:

Any constant or variable is a legal expression by itself.

A legal expression preceded by a unary operator (see below), is itself a legal expression.

Two legal expressions separated by a binary operator (see below) form a legal expression.

A legal expression enclosed in parentheses is itself a legal expression.

All these rules except the first define "legal expressions" in terms of themselves. So you can use these rules to build complex expressions.

A unary operator is a symbol that you type before an expression to modify its value. Here are the unary operators:

− —Preceding an expression with a minus sign produces an expression whose value is the negative of the original expression.

@—Preceding an expression with @ produces the absolute value of the expression. That is, if the expression is negative, preceding it with @ negates it again to convert it to the corresponding positive number. (Preceding positive values with @ has no effect.) For example, this expression computes the difference between two conversion drum variables:

V4-V11

However, if V11 exceeds V4, the above expression returns a negative number. To obtain the difference between these variables as a positive number, type:

@(V4-V11)

The parentheses are needed to make @ apply to the entire expression, not just to V4.

~ —Preceding an expression with a tilde produces a binary expression whose value is the reverse of the original expression: The tilde changes OFF to ON (FALSE to TRUE) and ON to OFF (TRUE to FALSE).

Some console terminals cannot produce the tilde character. You can work around this limitation. If e stands for a logical expression, then the expression ~e ... is equivalent to the expression (e=FALSE)

$—Preceding an expression with a dollar sign takes the square root of the expression.

L1, L2, L3—Preceding an expression with the operators L1, L2, or L3 performs a table conversion. These usually convert a voltage reading to a meaningful value to support various kinds of sensors.

The L1 operation converts the voltage reading from an Andover Controls Model 780 Dew Point Sensor to the dew point, in degrees Fahrenheit.

The L2 operation helps the AC256 convert dew point and dry bulb temperature to relative humidity. The Model 780 Dew Point Sensor User's Manual shows how to do this.

A binary operator is a symbol you type between two expressions to combine their values. Here are the binary operators:

+—The plus sign adds two expressions.

− —The minus sign subtracts (computes the difference between) two expressions.

*—The asterisk multiplies two expressions.

/—The slash divides two expressions.

Logical binary operators are binary operators that combine two numerical expressions but return a value of ON or OFF (TRUE or FALSE) depending on how the two numbers compare. Here are the logical operators:

>—Returns TRUE if the value of the first expression is greater than that of the second.

<—Returns TRUE if the value of the first expression is less than that of the second.

=—Returns TRUE if the expressions are equal.

—Returns TRUE if the expressions are not equal.

In all other situations, these operators return the value FALSE.

Use the equal and not-equal comparisons with caution. Two seemingly equivalent expressions can nevertheless be unequal for the following reasons:

Round-off error. Expressions designed to yield the value 50 at a certain time might, depending on how computed, instead yield the values 50.0001 or 49.9999. Although these values are essentially equal, the "=" operator will still return a value of FALSE.

Real-time situations. A sensed temperature or voltage may cross a threshold value without being exactly at that value when the AC256 senses it. Always write your programs assuming a temperature or voltage is never exactly equal to any number.

Three other logical operators combine digital expressions or flags and produce a value of TRUE or FALSE:

&—means "AND". Returns TRUE if both expressions are TRUE.

!—means "OR". Returns TRUE if either of the expressions is TRUE.

—Exclusive-OR: Returns TRUE if exactly one of the expressions is TRUE.

Order of evaluation. In an expression with more than one binary operator, it's important to know which operation the AC256 will do first. The complex expression 3*4+2 would give the value 14 if the multiplication were done first, but would be 18 if you did the addition first. The AC256 performs computations in strict left-to-right order in which they appear in the expression. This is different from many programming languages, where all multiplications and divisions are done before any additions and subtractions.

For example, suppose V1 contained 15 and V2 had the value 50. Suppose you defined V3 with this expression:

$$V3=V1/3-2*V2$$

The AC256 would first perform the division 15/3, producing 5. Then it would subtract 5−2, producing 3. Finally it would multiply 3*50 and assign the final result, 150, to the variable V3.

If you want the AC256 to perform combinations in a different order, then put inside parentheses the part of the expression you want done first, making sure the part inside the parentheses is itself a legal expression. Use as many pairs of parentheses as you want in order to clarify the expression. But you cannot at any point in an expression have five more left parentheses than right parentheses. This produces an expression too complex for the AC256 to evaluate.

In the example above, suppose you wanted the AC256 to perform the combination from right to left. You could type this:

$$V3=V1/(3-(2*V2))$$

Now the AC256 must evaluate (2*V2) first, and so on.

EXPRESSIONS IN EXIT FIELDS

Exit fields in control drums can contain expressions. The exit field makes the drum rotate to a specified line if the expression is TRUE (or ON) at the time the AC256 evaluates it. The exit field has no effect if the expression is FALSE (or OFF).

Chapter 6 showed a few simple expressions. In fact, the expressions can be as complex as you want. Expressions in exit fields usually include the logical operators:

=—equal
—not equal
<—less than
>—greater than

These expressions usually do one of the following things:

compare a flag or a digital input to the values ON or OFF compare a variable or a counter, temperature, or voltage input to a fixed value compare two variables or two inputs The other three logical operators let you build a complex expression which includes several comparisons. When you use them, enclose the comparisons in parentheses to make sure the AC256 performs the comparisons before it combines their results.

Suppose "a" and "b" stand for any legal comparison:

Exit to line ... If (a) & (b)—rotates the drum if comparison a and comparison b are satisfied, both returning the value TRUE.

Exit to line ... If (a)!(b)—rotates the drum if comparison a or comparison b are satisfied. An alternative is to phrase this as two separate exit fields:

Exit to line ... If a
Exit to line ... If b
Exit to line ... If (a) (b)—
rotates the drum if exactly one of the comparisons is satisfied.

The tilde (~) unary operator changes TRUE to FALSE and FALSE to TRUE. To write an exit field to rotate the drum if an expression is FALSE, enclose the entire expression in parentheses and precede it with a tilde:

Exit to line ... If~(a)

Here are actual examples of compound expressions in exit fields:

Exit to line 20 if F3 & F3 & F4
Exit to line 5—If (TEMP<68)!(TEMP>74)
Exit to line 99—If (TEMP>67) & (TEMP<75)

The last two fields are the reverse of each other. They are typical tests to see if a temperature is outside or inside a limited range.

EXTERNAL VARIABLES

Every AC256M has 64 external variables, named X1, X2, and so on, through X64. Each variable can store digital, counting-number, or decimal-fraction values, just as a V variable can. But in addition, in a network configuration (several AC256M masters connected together), when one master changes the value of an external variable, the other masters can sense the change. Thus, external variables let masters in a network communicate with each other.

Whenever a master changes the value of an external variable, the AC256 sends messages to any other masters in the network, using the X bus. These messages convey the new value of the external variable. So the value a program sees in an external variable is the value it was set to most recently by a program in any of the master units.

In a configuration where there is only one AC256M master, or where the masters are not connected by an X bus, the 64 external variables are still available for general use, but they do not have the special communication ability.

You tell a master unit which of its variables to make external by editing the external drum. To select the external drum for editing, type:

EDIT X

As usual, the O (open) C (close), P (print), and Z (zap, or delete) commands are available once you have opened the external drum.

The external drum has a comment line (line number C) and 64 other lines (numbered from 1 through 64). Lines 1 through 64 correspond to variables X1 through X64. Each of these lines can contain the name of a flag, counter, or conversion variable. Anytime the named variable changes, the external variable also changes and the AC256M sends messages to the other masters in the network telling them this has happened.

Suppose you wanted to use variable V191 as external variable X4. Here is a typical dialogue:

R>EDIT X

XE>04

X4=V191

XE-4>C

R>

The typist opens line 4 (which refers to the variable X4), types V191, and closes the line, which leaves the EDIT command. Now the following things are true:
You can refer to the value of V191 by using the name V191 or by using the name X4. They always have the same value until you change the external drum again.
Anytime the value of V191 changes in this master unit, the master unit will send messages to all other master units to which it is connected, telling them that X4 has changed.
In each other master, expressions in drum programs that contain the name X4 will now use the new value.

Only one master in a network should change the value of a particular external variable. In other words, a particular line in the X drum should be programmed in at most one master.

To successfully use an external variable to communicate between masters, all masters must use them to stand for the same thing. A list of the external variables, by X numbers, together with their meanings, is an essential part of your program's documentation.

PREDEFINED VARIABLES

OVERVIEW

To be truly useful, a drum program may have to modify its behavior dependent on the time of day, day of the week, and other factors which it cannot sense through its inputs nor compute in the ways discussed so far.

For this reason the AC256 provides a wide variety of predefined variables. Each has an alphabetic name that indicates its function. Each returns a counting number to the drum program. You can use these variables, alone or in expressions, just like any other variables. Thus, the value of any variable, the state of any control point, or the behavior of the drum program can change with the time of day, date, or other factors. These relationships can be as complex as you require.

CURRENT TIME

Four predefined variables let a drum program take different action depending on what time of day it is:
OUR Hour of the day. Value varies from 0 through 23, representing military time. Thus, OUR takes the values 0 through 11 in the morning; the values 12 through 23 correspond to P.M. times.
MIN Minute of the hour. Value varies from 0 through 59.
SEC Second of the minute. Value varies from 0 through 59.
For example, at two seconds before noon, OUR has the value 11, MIN has the value 59, and SEC has the value 58.
TOD Time of day. This counting number is always equal to the expression (OUR*100)+MIN For instance, TOD has the value 2315 to represent 23:15 (11:15 P.M.).

The values of these variables change continuously and automatically.

Example. Suppose you want to turn on a circuit of lights at dusk (as sensed by a photocell) and turn them off at 11 P.M. Taking one drum for this program, let line 1 represent the state where the lights are off during the day, while line 2 represents the state where the lights are on. Use a third line, line 3, to represent the late-night period when the lights should stay off even though it is dark. This defines the times of day when the drum should rotate from one line to another. Here is the drum program:
Line 1—(lights are off)
  (1A)—OFF>LIGHTS
  (1X)—Exit to line 2 If PHOTOCEL=ON
Line 2—(lights are on)
  (1A)—ON>LIGHTS
  (1X)—Exit to line 3 If TOD=2300
Line 3—(late night)
  (1A)—OFF>LIGHTS
  (1X)—Exit to line 1 If TOD=1200

The drum rotates to line 3 to turn the lights off at 11:00 P.M. and stays there until noon. Then it goes back to line 1. You know the photocell will be OFF now, so the drum will stay there until dusk.

But there is an important programming principle which the above program doesn't observe: Always write drum programs which would operate acceptably even if rotated to a random line.

In the example above, the drum makes one cycle from line 1 to 2 to 3 to 1 each day. If you manually stopped and restarted the drum during the minute when the drum was scheduled to rotate, the program might not operate correctly until the next day.

Let's redefine the purpose of the program by supposing that you want to use lighting only between the hours of 6 and 11 P.M. Then here is a better drum program:
Line 1—(lights are off)
  (1A)—OFF>LIGHTS
  (1X)—Exit to line 2 If (PHOTOCEL=ON) & (TOD>1759) & (TOD<2300)
LINE 2—(lights are on)
  (1A)—ON>LIGHTS
  (1X)—Exit to line 1 If (PHOTOCEL=OFF)! (TOD<1800)!(TOD=2259)

Since the exit fields now describe any moment when the drum should be on the other line, the drum will always instantly move to the correct line, even if manually moved to the wrong line.

Daylight-Saving Time. A drum program can adjust the official time forward or back one hour at the start or end of Daylight-Saving Time. To advance the time one hour, use this instruction:

SET OUR UP

To retard the time one hour, write:

SET OUR DOWN

Do not use these instructions in cases where they would advance OUR past 23 or retard it below 0. Do not write a program to modify the official time in any other ways.

When writing a drum program to implement Daylight-Saving Time, observe the following cautions:

Make sure that the SET OUR UP and SET OUR DOWN instructions will take effect only once. For example, use a flag variable to remember whether Daylight-Saving Time is in effect. Write your programs so they never advance the clock again if the flag says DST is already in effect.

Make sure your program turns back the clock only once per year. For instance, suppose that on a certain day in the fall, the program changes OUR from 2 to 1. The program should then rotate to a line where it will be stalled for at least two hours, so that the change won't happen again when the time again becomes 2.

CURRENT DATE

Three predefined variables let the AC256 change its behavior depending on what day it is.

DOM Day of the month. Value varies from 1 through 31, changing every day at midnight. The AC256 knows how many days each month has-even Februaries in leap years-and resets DOM to 1 at midnight of the start of each new month.

MTH Month of the year. Value varies from 1 through 12. When using MTH in comparisons, use the following symbols instead of counting numbers, to add clarity to your program:
JAN (1)
FEB (2)
MAR (3)
APR (4)
MAY (5)
JUN (6)
JUL (7)
AUG (8)
SEP (9)
OCT (10)
NOV (11)
DEC (12)

Using DOM and MTH, you can write a drum program to take special action (such as keeping the plant shut down) on fixed-date holidays. For example:
(1X)—Exit to line 50 If (MTH=DEC) & (DOM=25)
(2X)—Exit to line 50 If (MTH=JAN) & (DOM=1)
(3X)—Exit to line 50 If (MTH=JUL) & (DOM=4)

For holidays whose dates vary, such as holidays always celebrated on Monday, the program would be more complicated, reflecting the laws that set the date of the holiday.

WKD Day of the week. Value varies from 1 through 7. When using WDK in comparisons, use the following symbols instead of counting numbers, to add clarity to your program:
MON (1)
TUE (2)
WED (3)
THU (4)
FRI (5)
SAT (6)
SUN (7)

Here is an exit field that takes special action on weekends:

(1X)—Exit to line 80 If (WKD)=SAT)!(WKD=SUN)

Since the symbols JAN, FEB, and so on, and MON, TUE, and so on, are simply counting numbers, you can use the less than and greater than comparisons. For instance, this exit clause has the same effect as the one above:

(1X)—Exit to line 80 If WKD>FRI

ELAPSED TIME

Any drum program which implements a delay must be able to sense the passage of time. Four predefined timer variables let drum programs do so:
TD—Time in days.
TH—Time in hours.
TM—Time in minutes.
TS—Time in seconds.

There is one set of these variables for each of the 320 control drums. Each set measures the amount of time that drum has stayed on the same line. By using these variables in the exit field of the line, you can prevent the drum from rotating until a certain interval has passed.

Each timer variable is set to zero whenever the drum exits (even if it exits to the same line it was already on). It then counts up at the respective interval. If the count reaches 255, it stays there until the drum again rotates. So you can use TS to measure an interval up to 255 seconds; TM to measure an interval up to 255 minutes; and so on. You can't use these variables to measure an interval of, for example, one hour and thirty seconds; by the time TH reached 1, TS would have reached 255 and would not be useful in a comparison.

Example. A typical reason for putting a delay in a drum program is to ensure that equipment is not damaged by short-cycling. For instance, to ensure that a refrigeration unit is not switched on and off too fast, use two drum lines to switch the unit on and off. The first drum line simply stalls for thirty seconds:
LINE 25
(1X)—Exit to line 26 If TS>29
LINE 26
(1A)—OFF>FRIDGE
(1X)—Exit . . .

You can use TD, TH, TM, and TS in the emergency line of a control drum, to force the drum to rotate to a certain line if it has stayed on any numbered line for more than a certain interval.

Caution. TD, TH, TM, and TS change when the corresponding component of the official date or time changes. For instance, TH changes every hour on the hour. TD changes at midnight every day. "Exit . . . if TD=1" does not mean, "wait one day;" it means, "wait until the next midnight." This could exit almost immediately.

In the same way, "TH=2" in a drum program provides a less accurate measurement than "TM=120."

CURRENT DRUM LINE

The predefined variable CL shows the line to which the drum is pointing. It has an independent value for each control drum. For instance, if you use the variable CL in a program in drum 6, CL indicates the line to which drum 6 is pointing.

The only place you'd ever use CL is in the exit fields of the emergency line. Here, it could see if:

the drum had rotated to line 0 (out of service), as it does whenever it is told to go to a line that doesn's exist, or the drum had rotated to a line from which there is no exit.

The emergency line can then "restart" the drum, rotating it to any desired line as the starting point.

For example, suppose a drum performs an important process which must never stop. Suppose the process begins with actions specified on line 10. The emergency line could say:

(1X)—Exit to line 10 If CL=0

Now, if someone inadvertently typed ROTATE 0 ALL to take all the control drums out of service, the drum with the important process would restart itself immediately at line 10.

CHAPTER 9

PRINTING

MESSAGE DRUM

Drum programs can print messages at the console at various times to indicate transitions, request emergency action from the console operator, or provide information.

The message drum holds fixed text for these messages. Any message which a program on any drum wants to print must be present on the message drum.

The message drum has a comment line (line number C) and 64 text lines (numbered 1 through 64). To select the message drum for editing, use this form of the EDIT command:

EDIT M

The O (open), C (close), P (print), and Z (zap, or delete) commands are now available. Here is a typical dialogue where the typist adds text to line 8 of the message drum:

R>EDIT M

ME>O 8

M8=LABORATORY TEMP IN

ME>C

R>

The DISPLAY instruction resides in any action field of a control drum line. (You can abbreviate it as "D".) Every DISPLAY instruction refers to one of the lines from the message drum. The effect of the DISPLAY instruction is to make the text of that message appear at the console. Here is a DISPLAY instruction that would print, "LABORATORY TEMP IN ", if it has been typed into the message drum as shown above:

(1A)—DISPLAY 8

A DISPLAY instruction can also name one input terminal or variable, to print its current value after the fixed text. For instance, suppose ROOM23 was a temperature sensor. Then this action field:

(1A)—DISPLAY 8, ROOM23 . . . might print this information at the console:

LABORATORY TEMP IN ROOM23=90

A line in the message drum can contain no text. You might write a DISPLAY instruction to refer to an unprogrammed line in the message drum in order to simply print the value of a variable or input terminal, without fixed text.

A line in the message drum can include the character Control-G. On many console terminals, this will produce an audible alarm when the line is DISPLAYed. You will also hear the audible alarm when you type the Control-G into the message drum or when you list that line of the message drum.

The DISPLAY instruction takes effect when the drum arrives at the line containing DISPLAY. It does not take effect again for as long as the drum stays on that line.

Time stamp. Every message the DISPLAY instruction sends to the console is preceded by the current time and day of the week, in the format shown in FIG. 17.

PRINT INSTRUCTION

While DISPLAY primarily prints fixed text from the message drum, PRINT prints the contents of variables and other helpful information.

PRINT is a command as well as an instruction. Thus, as well as typing it into the action field of a control drum line for later operation, you can type it after "R>" to see the information printed immediately.

You can follow the word PRINT with any of the following:

The letter C, F, V, or X, to see all variables of that class.

A number, to see the status of every ASSIGNed input terminal and control point from the input/output unit by that number.

The word ALL, to see all the variables, and all ASSIGNed input terminals and control points from every input/output unit.

As a command, you can follow PRINT with the name of a variable, to see the current value of that variable. But this form of PRINT cannot reside in a drum program.

Other forms of the PRINT command are discussed elsewhere in this manual.

You can combine the DISPLAY and PRINT instructions. Suppose line 16 of the message drum contains the following text:

GREENHOUSE TEMPERATURES:

Suppose also that the inputs on input/output unit 2 sense the greenhouse temperatures. Then if one or more temperatures exceed allowable limits, a drum could be programmed to rotate to a line with the following actions fields:

(1A)—DISPLAY 16
(2A)—PRINT 2

This prints the message GREENHOUSE TEMPERATURES: followed by all the temperatures measured by input/output unit 2.

The PRINT instruction takes effect when the drum arrives at the line containing PRINT. It does not take effect again for as long as the drum stays on that line.

NOTES ON PRINTING

There are three ways in which the AC256 prints messages at the console:
By use of the DISPLAY instruction
By use of the PRINT instruction or command
If an AC256 Internal Test fails (see Chapter 11). The result is an "error message."

The AC256 does not print any messages at times when nobody is logged on. It saves them and prints them the first time someone logs on. The AC256 can remember up to 20 messages. To see the last 10 messages again, type:

PRINT ERRORS

For messages generated by the DISPLAY instruction, any value of ASSIGNed variables will be their values when the drum originally reached the DISPLAY instruction. For other variables the current value is displayed.

HISTORIES

Histories are reports the AC256 accumulates to let you evaluate your building's operation or determine the need to adjust your programming. Histories are summaries of the conditions the AC256 senses during its operation.

When the AC256 takes a history, it monitors up to eight variables over a time interval called the sampling period. The AC256 can take up to eight histories at a time.

HISTORY DRUM

The history drum contains a comment line (line number C) and eight numbered lines (1 through 8). You edit the history drum as you would any other drum. To select the history drum for editing, type:

EDIT H

Each numbered line of the history drum contains nine fields. The first field determines the sampling period. The eight lines of the history drum can all have different sampling periods. The other fields on the line are numbered 1V, 2V, and so on, through 8V. Each of these lines names a variable to monitor. A single variable can be monitored in different ways by several different histories.

When you use the O (open) command to select one of the numbered lines, the AC256 first asks:

Number of Minutes in

Sampling Period (100)?

The number in parentheses is the current sampling period. Type a number between 1 (one minute) and 1999 (about 33 hours) and press RETURN. (Just press RETURN to leave that line's sampling period unchanged.)

Now you can gain access to the V fields by typing 1V, 2V, or so on. The AC256 then asks:

Variable, Heading<!>?

Type the variable you want the AC256 to monitor, then a comma, then up to six characters of text. This text is a heading that the AC256 will display whenever it shows you the results of the monitoring.

You can monitor counters, general variables, or flags. For counters and general variables, the AC256 logs their average value during the sampling period. For flags and outputs, the AC256 logs a number between 0.0 and 1.0 which is the percentage of the time the flag or output was ON (TRUE).

If you follow the Heading with an exclamation point, the AC256 does not perform averaging on that variable. Instead, it logs the variable's value at the end of the sampling period. (For flags, the AC256 logs the value 1 for ON and 0 for OFF.)

ACTIVATING HISTORIES

Even if you have typed information into the history drum, you must explicitly tell the AC256 to begin collecting data. To do so, use the SET HISTORY ON command. Follow the command by the number of the history page you want to activate. For example:

SET HISTORY ON 5

SET HISTORY ON 5,6,7

SET HISTORY ON ALL

You can suspend history collection on any or all pages by using the SET HISTORY OFF command. Here are several examples:

SET HISTORY OFF 5

SET HISTORY OFF 5,6,7

SET HISTORY OFF ALL

These commands can also appear as instructions in the action fields of a control drum. This lets a drum program switch histories on and off.

Flag F319 is automatically set to ON whenever the AC256 is monitoring variables and collecting history data. A drum program can determine which pages have been activated by examining these additional flag variables:

F273—ON means page #1 is active
F274—ON means page #2 is active F275—ON means page #3 is active
F276—ON means page #4 is active
F277—ON means page #5 is active
F278—ON means page #6 is active
F279—ON means page #7 is active
F280—ON means page #8 is active A drum program can turn these flags ON or OFF to activate or deactivate individual history pages. The program can do this with an assignment instruction or with the SET HISTORY instruction.

PRINTING HISTORIES

You can type the PRINT HISTORY command to see the information logged in accordance with the History drum. The AC256 remembers the results of the 32 most recent sampling periods. You can also use PRINT HISTORY as an instruction in the action field of a control drum, to print the history data whenever that field is executed.

Follow PRINT HISTORY with a number from 1 through 8. This corresponds to a line from the History drum and prints the appropriate history data. For instance, suppose line 3 of the History drum said to monitor several variables with a sampling period of 10 minutes. To see the values of these variables during recent 10-minute intervals, type:

PRINT HISTORY 3

You will see history data ranging back 320 minutes (32 sampling periods) or to the time that you told the AC256 to start monitoring V20.

The following command or instruction prints the entire history file:

PRINT HISTORY ALL

The CLEAR HISTORY command takes the same format as the PRINT HISTORY command. For instance, the following command erases any history data the AC256 may have accumulated:

CLEAR HISTORY ALL

After you clear a history, the AC256 begins accumulating new data if there are still instructions to that effect in the History drum.

PLOTTING HISTORIES

On AC256M units with the GR3 Plotting Option, the GRAPH command prints at the console terminal a graph of up to three variables previously selected for history monitoring. The GRAPH command is principally useful with printing terminals on which the paper is at least 80 columns wide. The AC256M forms the graph using spaces and ordinary printable characters, so you need no special plotting equipment.

The AC256M refers to the first or only variable you want to graph using the letter A. B refers to the second variable, if any; C refers to the third variable, if any. Before you use the GRAPH command, you must edit the history drum and activate one or more history pages. That is, before you request a graph, you must make the AC256M start collecting data so that it has something to graph.

To obtain a graph, type GRAPH. The AC256M then asks you a series of questions once for each variable A, B, and C. (To end the dialogue before you have specified three variables, answer the first question by just pressing RETURN.) You specify a variable by specifying the history page and its variable number (1 through 8) within that page. Then the AC256M asks you for the low and high limit. Pick numeric values so that all the recorded values for that variable will lie within these limits. A, B, and C can have different low and high limits (FIG. 19)

Form of the graph. When you have defined A, B, and C, or selected a graph of fewer than three variables, the AC256M begins printing the graph at the console terminal. Since for each variable the history page can remember the 32 most recent values, the graph has 32 lines. Each line corresponds to a point in time; the first line printed is the newest data. (FIG. 20)

On each line, a letter A, B, or C represents the value of the respective variable in that time period. (The time periods depend on the sampling period of variable A. If B and C had different sampling periods, the AC256M converts them to the same time base, typically plotting fewer than 32 data points for B and C.)

If the variable's value then was at or below the low limit you just specified, the letter appears at the left edge of the graph. If the variable's value was at or above the high limit, the letter appears at the right edge of a graph. The AC256M represents values between the low and high limits using letters at an appropriate horizontal position. (If the AC256M needs to print several letters in the same column, it uses the single letter X instead.)

Thus, the vertical axis of the graph is "time," proceeding toward the past as you move down the paper. The horizontal axis of the graph is the value of the variables, increasing to the right.

The GRAPH command logs either averaged or instantaneous values of the variable, depending on which type the history page has been recording.

ADVANCED TECHNIQUES

DRUM SCANS

The AC256M master unit contains two computers: the input/output unit that controls the input terminals and the control points, and the intelligence unit. The intelligence unit interprets the drums and executes the drum programs.

This computer operates so rapidly that you can write drum programs as though they were all operating simultaneously. Even so, the computer can actually do only one thing at a time. To take advantage of advanced programming techniques, you should know the exact order in which things happen.

The AC256 divides the activities it has to do into drum scans. On each drum scan, the AC256 surveys the entire application program (all drums) to see what operations need to be performed now. A drum scan consists of these activities, in this order:

1—Evaluate the conversion drum variables in numerical order. That is, the AC256 evaluates the expression on line 1 of the conversion drum and assigns the resulting value to V1. It then does likewise for V2, V3, and so on through V128.

2—Service control Drum 1. The AC256 evaluates the exit fields of the emergency line of the drum, even if the drum is pointing to line 0. If any field's exit conditions are satisfied, that drum rotates to the specified line and the AC256 moves on to service the next drum (step 3 below).

If the emergency line does not force the drum to rotate, the AC256 evaluates the line the drum is pointing to currently. This means (1) performing the actions indicated by the instructions in any action fields of the line, then (2) evaluating the line's exit fields and rotating the drum if the conditions are satisfied.

The AC256 skips to the next control drum if the current drum does not contain a program or if the current drum is rotated to line 0 (out of service).

3—Service the remaining control drums in numerical order. The AC256 repeats step 2 above for drum 2, then 3, then 4, and so on through 320.

Evaluating exit fields means evaluating field 1X, then 2X, then 3X, and so on. That is, if field 1X forces the drum to rotate, the AC256 never even checks field 2X. So when you type an exit condition in field 5X, for instance, keep in mind that this tells the AC256 to rotate the drum if your 5X condition is TRUE and all previous exit fields are FALSE.

Action fields are also performed in numerical order: 1A, then 2A, then 3A, and so on. You can control the strict sequence of actions—such as the order of printing by DISPLAY and PRINT statements-by arranging the action fields in a precise order.

Assignment instructions on a drum line take effect during every drum scan on which the drum continues to point to that line. (Assignment instructions that effect pulsed analog output, however, do not cause multiple pulses.) Other instructions take effect only once, when the drum first rotates to that line. They cannot take effect again until the drum exists that line and returns to it. An exit field that exists to its own line will cause these instructions to take effect again. For example, this line prints an alert at the console and waits for a button to be pressed. But if the button is not pressed, exit field 2X causes the DISPLAY statement to be repeated every 20 seconds.

LINE 1
   1A)—DISPLAY M11
   1X)—Exit to line 2 If BUTTON
   2X)—Exit to line 1 If TS>19

Frequency of drum scans. Normally, the AC256 begins a drum scan immediately on ending the previous drum scan. If you need drum scans to occur at regular intervals, however, use the SET SCAN command. Follow these keywords by the number of seconds you want between the start of two consecutive drum scans. For example:

SET SCAN 5

This makes the AC256 schedule its drum scans five seconds apart.

If, at the end of a drum scan, it is already time to start the next scan—that is, if the scan lasted longer than the desired interval—then the AC256 begins another scan immediately and prints an error message.

To restore the AC256 to continuous scanning, type:

SET SCAN 0

A predefined variable lets your drum programs find out how much time elapsed during the last drum scan: SC Scan time, in seconds.

Pulse counters are input terminals defined in C mode in the ASSIGN command, typically watt-hour meters or flow meters. Pulse counters count the number of cycles sensed during the current drum scan.

To obtain the number of pulses per second, use a conversion drum line to divide the counter input by SC, like this:

V10=FLOWMETER/SC

Write your drum programs to refer to the converted V variable rather than directly to the input value.

Suppose ROTOR is a counter input that counts revolutions of a wheel, but you want to use a number of revolutions per minute. Use the conversion drum, defining a V variable as the following expression:

V20=(ROTOR/SC)*60

ROTOR's value is the number of pulses in the most recent drum scan. Dividing it by SC, the number of seconds in that scan, gives pulses per second. Multiplying the result by 60 gives pulses per minute (RPM).

BUFFERING

Buffering means making a copy of certain information. At times, the AC256 makes a copy of important information. Your drum program affects the copy instead of the real thing. There is thus a delay between the time a drum program orders an action and the time the action officially or actually occurs.

All control points are buffered. When a control drum program assigns a value (ON, OFF, or numeric) to an output, the AC256 makes a note to itself that you want the output's state to change. The AC256 does not actually switch the output until the end of the drum scan.

Suppose a heater is ON. On a single drum scan, suppose the program in drum 1 says OFF>HEATER but the program in drum 2 says ON>HEATER. The AC256 turns its "buffer" off and then on. At the end of the drum scan, the AC256 determines that no net change to the heater occurred. The heater stays ON; it does not switch OFF even for an instant, despite the instructions in drum 1. Thus, buffering helps prevent damage to equipment through short-cycling.

Instructions in higher-numbered control drums always have the "final say," since the AC256 examines them last. IF the AC256 encounters in the same drum scan contradictory instructions on control points from two different drum lines, the higher-numbered line prevails. Drum 320 thus can prevent any output instruction in any other drum from actually taking effect.

All flag variables are buffered. At the start of every drum scan, the AC256 takes a "snapshot" of the flags, remembering their states at that instant. A drum program can only sense the state of a flag as of the start of the current drum scan. Thus during a single drum scan, a flag variable appears the same to programs in every drum.

When a drum program sets or clears a flag variable (as in ON>F200), only the buffered copy is changed. Changes to the actual flag variables take place only at the end of the drum scan. If a higher-numbered drum program gives an instruction overriding that change to that flag variable, it doesn't happen at all, even for an instant.

So, although you can use the flags for inter-drum communication, the communication cannot take place until the start of the next drum scan.

If you declare a flag as an external variable, the AC256M sends messages to the other masters every time the flag changes state. But it sends them only at the end of the drum scan, and doesn't send them at all if the specified change was overridden by a contradicting instruction in a higher-numbered drum.

Conversion variables and counters are not buffered. Assignment instructions that affect them take effect immediately. If a drum changes the value of a conversion variable or a counter, higher-numbered drums will be able to sense the change on the current drum scan; lower-numbered drums will be able to sense the change on the next drum scan. A drum program senses as a variable's value the value to which it was set most recently.

MIXED-MODE ARITHMETIC

When the AC256 evaluates an expression in the conversion drum or the exit fields in the control drum, it converts counters and flags to decimal fractions before doing the arithmetic. Flag variables or logical expressions that appear in arithmetic formulas are treated as the value 0.0 if they are OFF or FALSE, and treated as the value 1.0 if they are ON or TRUE.

You can use multiplication to make the value of a formula conditional on a flag or on a logical expression. For instance, consider this expression:

(V2*(TEMP>69))+(V3*(TEMP<70))

If the temperature at TEMP is 70 or above, the formula becomes:

(V2*1)+(V3*0)

Its value is thus simply V2. But if the temperature is 69 or below, the formula becomes:

(V2*0)+(V3*1)

This yields V3. So the original formula has the value of either V2 or V3, depending on what the temperature is. To make an expression depend on a flag, write it like this:

(expr1*Fn)+(expr2*~Fn)

This expression will be equivalent to expr1 when Fn is ON, but will be equivalent to expr2 when Fn is OFF.

As aother example, the following exit field rotates a drum if a majority of the specified flags are set:

Exit to line 2 If (F1+F2+F3+F4+F5)>2

Each set flag has the numeric value of 1.0 in this expression.

You can use numeric values in the place of logical expressions. The numeric value is regard as FALSE if it is exactly 0.0; otherwise, it is regarded as TRUE. For example, you can use a general variable as an exit condition:

Exit to line 55 If V5

This field rotates the drum if V5 is nonzero.

Exit to line 55 If V5&C5

This field rotates the drum if V5 is nonzero and if C5 is also nonzero.

C5>F149

This sets F149 to ON if C5 is nonzero, and clears F149 to OFF if C5 is zero.

PULSED ANALOG OUTPUT

Chapter 6 shows how the assignment instruction lets programs activate the control points (outputs). To turn on an output, you write:
ON>symbol To turn off an output, you write:

OFF>symbol

You can set several outputs to the same state by writing them all to the right of the angle bracket, separated by commas.

These two instructions are examples of continuous-mode output. Moving the value ON or OFF to an output sets that output to the desired state and leaves it that way until the program changes it.

The drum may stay on the current line for a time, causing the assignment instruction to repeat. This has no additional effect, except to lock out lower-numbered drums from changing the output's state, as discussed earlier in this chapter.

Pulsed analog output describes a situation where you turn on an output for a fixed interval. Implicit in the decision to turn it on is a desire to turn it off a short time later. You use pulsed analog output to modulate dampers to operate other equipment whose effect varies with the precise length of time it is activated.

You could use programming to perform pulsed analog output. For instance, this sequence turns on DAMPER for the number of seconds specified in counter C5:
LINE 40
  1A)—ON>DAMPER
  1X)—Exit to line 41 If TS>(C5-1)
LINE 41
  1A)—OFF>DAMPER
  1X)—Exit ....

However, this method complicates your drum program, and is also imprecise, since the AC256 can decide whether to close the damper only once per complete drum scan.

Whenever you transfer a numeric value to an output with the assignment instruction, the AC256 pulses that output for that number of seconds. This is the usual way of doing pulsed analog output. If you use a decimal fraction, you can achieve resolution of 0.2 second. A negative (−) numeric value has the same effect as a zero.

Thus, a more concise way to carry out the above sequence is to write:
  1A)—C5>DAMPER Transferring a flag variable to an output does not transfer the value ON or OFF, but instead transfers the value 1.0 or 0.0. This pulses the output for one second if the flag variable was set.

If you transfer to an output a number greater than 25.4, the AC256 pulses the output for the maximum 25.4 seconds. Outputting zero or a negative number is identical to outputting thhe value OFF.

If the drum leaves the line with the pulsed analog output instruction, it may encounter other instructions dealing with the same output before the pulse has ended. These instructions override the pulse:

An instruction to turn the output OFF aborts the remainder of the pulse and forces the output OFF.

An instruction to turn it ON overrides the earlier pulse analog instruction and forces the output ON until directed otherwise.

Another pulse analog instruction overrides the earlier one, effectively lengthening the interval of the pulse.

If the drum remains on the same line for a time, causing the AC256 to repeat the pulsed analog output instruction, it does not generate new pulses. The input/output unit ignores the repeat instructions; it knows that a pulse with the specified duration is already being produced. This remains true even if the drum stays on the same line for longer than the entire length of the pulse.

This has a side-effect. If the next output instruction executed is another pulsed analog instruction specifying the same interval, the input/output unit will ignore that too. Therefore, when you operate an output in pulsed analog mode, before executing an instruction that might pulse an output for the same interval as you pulsed it the last time, take a drum line to explicity set the output OFF for at least one drum scan.

POWER FAILURES

At initialization, when the power is first applied to the AC256, the following things are true:
All drums are empty and rotated to line 0 (out of service)
All counters and variables are set to zero; all flags are cleared to OFF; all control points are OFF.

You can return the AC256 to its initial state at any time by using the command:

CLEAR MEMORY

A short power failure is defined as one where the AC256's battery backup can preserve the AC256's internal memory. The power in the internal batteries lasts for about three hours.

During a power failure, all the front-panel relays disengage, putting all control points in the OFF position. However, the conversion drum and control drums continue to rotate. They can change the values of counters, variables, or flags. They can maintain or change the values of the outputs, although these instructions cannot take effect until external power returns. The AC256 continues to maintain the correct date and time.

Flag variable F320 is automatically set when external power fails. It is automatically cleared when external power is restored. Control drums can test flag E320 to sense the fact that the power has failed. Control drum that react to short power failures typically do so by restarting themselves. You can do this by testing F320 in the emergency line. For example:
1X)—Exit to line 1 If F320

When the power returns after any power failure, you must log back on in order to use the console.

A long power failure is defined as one where the batteries cannot keep the AC256's internal memory continuously powered. When the power returns, the AC256 completely reinitializes itself. Programs cannot sense the occurrence of a long power failure, because they are all erased when the power returns. You must reload all programs and drums with their desired contents.

If a long power failure might ever occur, restoring the AC256's drums and memory might entail much typing. To save time in this contingency, you can dump the entire contents of the AC256 memory to an external storage device, from where it can be reloaded after the power failure.

After you have prepared the drum programs the way you want them, type this command to dump the AC256's memory:

DUMP ALL

The AC256 will send to the console the complete contents of its memory. The information will not make any sense as it is printed, but it is in a form where the AC256 can quickly take it back again if necessary. To store this information to avoid retyping, you need a terminal with an attached paper-tape punch, cassette drive, or other storage medium. Immediately after you finish typing DUMP ALL, you must switch your terminal so that the information coming out of the AC256 goes to the storage medium instead of the screen or the paper.

Instead of ALL, you can type any number or letter that identifies a drum. This makes the AC256 type that part of its memory. You can type DUMP S to make the AC256 dump only the contents of its symbol table.

If you type substantial changes to the AC256, dump the memory again to preserve those changes.

Reloading. Suppose you have dumped the AC256's memory to external storage and you experience a lower power failure. Log on to the AC256. Prepare the medium (paper tape, cassette, or whatever) that contains the saved memory. Type this command:

RELOAD

Then switch your terminal so that instead of sending keystrokes to the AC256, it sends the contents of the storage medium.

This restores the AC256's entire memory (or whatever part of it you originally DUMPed) to the state it was in when you typed the DUMP command. The drum programs are now ready to begin operation. They are all rotated to line 0. (Those with suitable emergency lines may restart themselves.)

The Andover Controls Model 604 Program Loader is designed to work well with the DUMP and RELOAD commands. The Program Loader is a tape cassette recorder. You can connect the console terminal to the AC256 through a Program Loader. The Program Loader normally passes information through between the console and the AC256 without modification. However, when you type a DUMP or RELOAD command, the AC256 sends special characters to the console. The Program Loader intercepts these characters and operates the tape in record or playback mode, respectively.

At different times, you can use a single Program Loader to service several AC256M's.

STATUS FLAGS

Just as flag variable F320 tells you that a short power failure has occurred, other flag variables are automatically set to indicate that other things have happened in the AC256M master unit or in the AC256S slaves under control of that master.

Output Override. Every AC256 unit can sense the status of its 16 control points. There are only two reasons a control point should not assume the state a drum program assigned it:
It has been forced to the other state by use of the front-panel Manual Override switches, or
The relay which closes the output circuit is broken.

If either of these things is true and preventing the control point from being in the state the program wants it in, one of the Output Override flags is set:

| | |
|---|---|
| F297 | indicates an override in the master unit |
| F298 | indicates an override in input/output unit #2(slave) |
| F299 | indicates an override in input/output unit #3(slave) |
| . | |
| . | |
| . | |
| F312 | indicates an override in input/output unit #16(slave) |

Communication Error. Sixteen other flags indicate that the intelligence unit in the AC256M master unit has had difficulty communicating with an input/output unit:

| | |
|---|---|
| F281 | indicates an error in the master unit |
| F282 | indicates an error in input/output unit #2 (slave) |
| F283 | indicates an error in input/output unit #3 (slave) |
| . | |
| . | |
| . | |
| F296 | indicates an error in input/ouput unit #16(slave) |

A drum program may monitor these flags and call it to the console operator's attention if any of them turn ON.

In an Output Override error, verify that the front-panel Manual Override switch is causing the error. To prevent the error and give the drum program control over the control point, flip the switch to AUTO. If the front-panel switch is already at AUTO, replace the corresponding relay.

In a Communication Error, call your Andover Controls representative.

When you use the PRINT command followed by a number to see the status of the named input/output channels, an asterisk appears in the OVR column of every input/output channel that has an Output Override Error.

Console terminal. Three flags let you monitor the status of the console terminal. You'd do this to determine whether an operator is present to respond promptly to emergency messages printed at the console. (If not, the program might elect to take other notification steps.) Here is the meaning of the respective flags being ON:

F313—Clear To Send (CTS) is asserted
F315—Carrier Detect (CXD) is asserted
F318—An operator is logged on When the console is wired to the AC256M, F313 is ON when the terminal is switched off. (This depends on the type of terminal and the manner of installation; please verify this on your own unit.) When you are using a modem to enable dial-up access to the AC256M over a telephone. F315 is ON when the modem has detected a phone call and answered the phone.

ERRORS

In addition to the Output Override and Communication Error conditions discussed in the previous section, there are three types of error condition:

Program error. A drum program tries to do something meaningless.
Command error. There is a fault in a line you typed to the AC256.
Internal test failure. The AC256 has detected a possible loss of reliability.

Program errors. The AC256 catches most program errors as you type them. Thus, it deals with them as command errors. Any program actually written into a drum at least adheres to the programming rules, although it may or may not give you desired results.

The only program error the AC256 can detect occurs when a program tries to rotate a drum to a line which, at that time, is not present on the drum. The AC256 reacts to this situation by rotating the drum to line 0 (taking it out of service). The drum's emergency line may sense this fact and rotate the drum back into service.

Command errors. A wide variety of messages tell you that there is some fault with a command line you have typed. These errors appear immediately after you type the command. The AC256 displays, inside [square brackets], a few characters from the command line, to indicate the erroneous item.

Here are the command errors and their meanings:

Access Denied

The personal password you used when logging in carries with it restrictions which prevent you from using the command you typed.

Ambiguous Keyword

You abbreviated a keyword to too few characters. The word you typed could stand for several keywords. For instance, you cannot abbreviate the DISABLE command to D, because D could also stand for DUMP.

Are You Sure?

Every form of the CLEAR command asks you this to keep you from mistakenly erasing something important. If the command you typed is correct, type YES and press RETURN.

Bad Number

A number you typed didn't conform to the rules for numbers. For instance, you may have typed a decimal fraction with more than one decimal point, or a counting number greater than 9999.

Binary Operator Expected

In an expression, you followed a variable or other operand with something other than an operator (such as +). This is usually a typing error.

Duplicate Symbol Assignment

The AC256 lets you change the symbol you have ASSIGNed to an input or output (although it asks you for confirmation). The AC256 doesn't let you ASSIGN a symbol that's already ASSIGNed to another input or output. You must first use the ASSIGN command to give a new symbol to the input or output the symbol in question used to refer to.

Entry Out of Range

Look at the part of the command that the AC256 has retyped. This number is outside the legal limits for it.

Expression Too Complex

In the expression you typed, you used parentheses more than five levels deep. Rewrite the expression more simply. If you were typing into the conversion drum, consider using a separate V variable to hold a partial result. The AC256 normally performs operations left-to-right: Are some of your parentheses unneeded?

Invalid Drum Number

The only valid drums are control drums 1 through 320, the H(istory), M(essage), P(assword), V(conversion), and X(external) drums.

Invalid Keyword

This usually means that you misspelled the command name.

Invalid Line Number

The type of drum you are editing does not have a line with the number you typed.

Invalid Symbol

You used a symbol you have never ASSIGNed.

Invalid Variable

What you typed is not a valid variable name.

Line Lost-Please Zap and Retype

An internal error. The AC256 has somehow destroyed the text of the drum line. If this error recurs, notify your Andover Controls representative.

Line Too Long

Comment lines can be up to 64 characters long. Most drum lines do not have length limits.

Program Area Full!!

Your programs, symbol definitions, and other uses of drums have exceeded the total memory of your AC256 unit. You can obtain more memory for the thing you're working on now by simplifying other parts of your program or shortening text lines.

Required Entry Missing

You omitted an essential part of a command. (In most cases, the AC256 simply responds by asking you for the additional information.)

Syntax Error

"Syntax" is the grammar, or rules, of the AC256 command language. What you typed violated the rules in a way that did not fit into one of the other categories.

Variable or Unary Operator Expected

In an expression, you followed an operator (such as +) with something other than a variable or an operand. This is usually a typing error.

Variable Out of Range

You typed a variable name where the number is out of bounds, such as V0 or F999.

Internal test. While it is doing everything else, the AC256M is continuously testing itself and its major components to ensure they are operating correctly. The AC256M puts its intelligence unit computer through an "obstacle course" of instructions to make sure they always produce the correct result. It continuously examines its built-in program memories to make sure they contain the correct information. And every time it executes a drum line, it performs tests to ensure that the memory containing that drum line is still reliable.

If any of these tests should fail, the AC256M produces an internal error. The command PRINT STATUS tells you how many internal errors have occurred. Normally, the AC256 prints error messages at the console whenever errors occur. (Chapter 9 discusses this in more detail.)

Each error message has this form:

xxxxERROR, TYPE-yy

The line also contains the time of the error and other numbers that can help service personnel diagnose the problem. Whenever an internal error occurs, call your Andover Controls representative. Save the console print-out, or write down all the numbers describing the error. (This doesn't apply to failures whose cause you already understand, such as power failures.)

In the above example, "xxxx" and "yy" are the positions where the AC256 will print the type and subtype of the error. Here are the various types and their meanings:

CPU—Intelligence Unit Failure. The "obstacle course" of instructions-a deterministic, fixed program-has produced an unusual result. The integrity of the intelligence unit is in question.

PROM—Program Memory Failure. The AC256 examined the fixed internal program that implements drum processing. It found the program changed from the one installed at the factory. The memory circuits may be faulty.

INTP—Drum Program Error. While interpreting the contents of a drum line, the AC256 found information there that you could not have typed in. The memory circuits may be faulty.

You need not report the following messages to your Andover Controls representative:

FAIL 50—Short Power Failure. External power has failed, but your program remains intact. The AC256M logs two type 50 errors for each power failure; one at the time that power fails, another when power is restored.

FAIL 51—Long Power Failure or manual reinitialization (CLEAR MEMORY). All memory is cleared; the clock is set to 00:00:00. This message is normal when power is first applied to the AC256. If a power failure actually occurred, you will have to reload the AC256's memory.

OVRN—Overrun. By the time the AC256 was scheduled to start a drum scan, it had not finished the previous scan. The more drums you are using and the more complex the programs there are, the more time you have to allow for scans. Solve this problem by using the SET SCAN command to put more time between scans.

(Overruns never occur when you have SET SCAN 0. Use this setting unless you have reason to do otherwise.)

MEMORY SIZES

You can order an AC256M master unit with four different amounts of program memory. The AC256M measures its memory in "program blocks." Each program block is about the size of an average drum line.

Every drum line that you type requires some of this memory. There is only one large "pool" of memory. You can use it to hold many small drum lines, or fewer, longer lines.

The command PRINT STATUS tells you how many program blocks are remaining for your use.

Ordering an AC256M with a memory expansion option increases the total amount of drum line text you can type. There are no other differences between the various configurations. No features are "missing," and no arbitrary limits are imposed, in the AC256M models with less than the maximum memory.

| Order Number | Number of Program Blocks |
|---|---|
| standard AC256M | 512 |
| ME800 expansion | 1,024 |

-continued

| Order Number | Number of Program Blocks |
|---|---|
| ME1200 expansion | 1,536 |
| ME1600 expansion | 2,048 |

Every input/out unit present in the system requires 9 program blocks. Subtract these blocks from the total number to find out the number of blocks available for programs.

TRACING

You can tell the AC256 to trace any or all control drums. During a trace, the AC256 prints a message whenever any of the traced drums rotates. These messages may interrupt you when you are typing a command. (If so, finish the command normally, or press ESC and start typing the command again.) The messages will not interrupt you when you are editing a drum.

Each message tells you (1) what drum rotated, (2) what line it rotated to, and (3) which exit field in the old line made the drum rotate. For example:

14->90(3)

This says that drum 14 has just rotated to line 90 as a result of field 3X of the line it was on.

To turn on tracing, type the TRACE command. After the word TRACE, type the number of the drum you want to trace. For instance:

TRACE 5

You can trace more than one drum with commands like these:

TRACE 5,6,7

TRACE ALL

To turn off tracing, use the same command, but type the word OFF after TRACE:

TRACE OFF 5

TRACE OFF ALL

DISABLE, ENABLE, AND MODIFY

The DISABLE, ENABLE, and MODIFY commands give the console operator direct control over the AC256's variables, inputs, and outputs. They are comparable to the front-panel Manual Override switches.

The MODIFY command lets you change the value of a variable, input channel, or control point, although the drum program could change them back. The DISABLE command lets you prevent the automatic procedures of the AC256 from changing them. Together, these commands give you absolute control over variables, input, and output. (The ENABLE command simply reverses the effect of DISABLE, allowing the AC256 to again automatically change the specified element.)

When you use the PRINT command followed by a number to see the status of the named input/output channels, an asterisk appears in the DIS column of every input/output channel that you have DISABLEd.

You can follow any of these three commands by any of the following:

the symbolic name of an input terminal or control point a number, to effect all input terminals and control points in the input/output unit with that number a variable name the letter C, F, V, or X, to affect the entire class of variables the word ALL, to affect all variables, input terminals, and control points Disabling something freezes its present value or state. For variables and control points, this prevents drum programs from changing them. Disabling input channels makes them fail to reflect changes in voltage at the input terminal.

Enabling something returns it to normal, automatic operation. When you enable an input whose value you have modified, it quickly reverts to the actual voltage on that input terminal, which is continuously reported by the input/output unit. When you enable a variable or an output, its value changes only when a drum program assigns it a new value.

To use the MODIFY command, type the word MODIFY, the new value, and then the element to which you want to assign this new value. The new value can be a number or the keywords ON or OFF.

Modifying control points lets you override the program's normal use of them, just as the front-panel Manual Override switches do. Modifying input channels lets you "fake" the drum program into perceiving a certain voltage or value on that input terminal. Modifying variables is another way to elicit special behavior from your drum program or verify that it can handle all possible circumstances.

Before modifying an element, you should normally DISABLE it so that the program cannot simply change it back.

The IOU command. When you have disabled and modified an input or output, the PRINT command (such as PRINT 3) displays the value you supplied (although asterisks in the resulting display tell you that certain inputs are disabled and overriden). The IOU command shows you the actual values of all inputs on a specified input/output unit. Follow the keyword IOU with the number of the input/output unit you are interested in. For instance:

IOU 4

The IOU command displays the actual ("raw") input data from the 32 input terminals on the specified input/output unit. You see them as counters, digital, and voltage readings. You see even inputs that you have not enabled the program to use through the ASSIGN command.

11.11 SPECIAL FEATURE SWITCHES

The AC256M has six switches you can use to enable special features. These switches, labeled 1 through 6, are located near the top of the intelligence unit. FIG. 18 shows their location and labeling.

The factory ships units with all switches OFF. The following describes the special feature enabled by moving certain switches to the ON position:

S1—Messages (error messages and messages produced by the DISPLAY instruction) are printed at the console even if no operator is logged on. (Even if you don't select this feature, the AC256 remembers the 20 most recent messages; you can see them by using the PRINT ERRORS command.)

S1—If this switch is ON, you cannot use symbols to refer to the conversion (V) and external (X) variables. (You can still use symbols to refer to inputs and control points.) Making this change gives you 36 additional program blocks for use by control drums.

S3—Not used
S4—Not used
S5—Not used
S6—Not used

If you change the position of S2, you must start the AC256M using the restart button discussed in Section 4.4. (Restarting the AC256M erases all drums; read all of Chapter 4 before taking action.)

ADDITIONAL SECURITY

PASSWORD LEVELS

To gain access to an AC256M master, you can always use its built-in personal password as discussed in Chapter 5. After a long power failure, this is the only personal password you can use. However, the AC256 lets you define up to 8 other passwords for use by other people. You can associate restrictions with an individual pasword. Someone who has logged on using a restricted password will not be allowed to use all the AC256's features.

The AC256 has three levels of authorization:

Level 1 lets the operator find out what the AC256 is doing but not affect the AC256's operation in any way.

Level 2 lets the operator analyze or change the AC256's operation, reprogram it, or erase part or all of its memory.

Level 3 lets the operator do anything, even program in or delete other personal passwords.

Appendix A shows, for each command, the authorization level you need in order to use that command. Control drum instructions do not have authorization levels; if you are authorized to use the EDIT command, you can type any program you want.

PASSWORD DRUM

The password drum has a comment line (line number C) and eight numbered lines, 1 through 8. The following command selects the password drum for editing:

EDIT P

You can use the O (open), C (close), P (print), or Z (zap, or delete) commands to edit the password drum as you would any other drum.

Each of the eight numbered lines in the password drum can contain a personal password. Any line that does contain one must also contain an access code. This is the numberal 1 or 2 to specify Level 1 or Level 2 authorization, as defined above. (Only the built-in personal password has Level 3 authorization.)

Examples. This dialogue installs a personal password NORMAN with Level 2 authorization. (The bold text is the text the operator types.)

R>EDIT P

PE>O 1

P1=NORMAN, 2

PE>C

R>

This dialogue changes the authorization to level 1:

R>EDIT P

PE>O 1

P1=NORMAN, 2

P1=NORMAN, 1

PE>C

R>

This dialogue removes the password NORMAN:

R>EDIT P

PE>Z 1

PE>C

R>

You can also use the command

CLEAR DRUMP

By erasing the entire password drum, this command prevents the use of any personal password other than the built-in one.

APPENDIX

SUMMARIES

This section contains alphabetical summaries of the elements of AC256 operation, with references to the section of this manual where each element is discussed.

INSTRUCTIONS AND COMMANDS

A command is a line you can type when the AC256 prints "R>" (Ready). An instruction occupies an action field in a control drum.

The format in this summary shows you the general rules for typing the command or instruction. Words that start with a capital letter in this summary must be typed exactly the way they appear, although you can omit letters from the word that are shown in lowercase letters. For instance, the capital letters in the table tell you that the PRINT HISTORY ALL command (Print History All) can be abbreviated to P H A.

Words that appear entirely in lowercase letters are not to be type; instead, type the thing you want in place of the keyword.

The type in the table below indicates whether an item is a command or an instruction, and what level of privilege is necessary to use the item:

0—This command is available to anyone, even without logging in.

1—This command is available to anyone after logging in.

2—This command is available to persons who have logged in using a personal password with at least Level 2 authorization (see Chapter 12).

3—This command is available only to persons who have logged in using the built-in personal password, which has Level 3 authorization (see Chaper 12).

I—This is an instruction. If you are allowed to edit a control drum (Level 2 authorization), you can type this into a control drum.

| Format | Type | Sec. | Meaning |
|---|---|---|---|
| value > element | I | 6.3 | assignment instruction-move value to variable or output |
| &G | 1 | 5.2 | goodbye (log off) |
| &Nxxxx | 0 | 5.2 | log in (local) |
| &Rxxxx | 0 | 5.2 | log in (remote) |
| Assign tm.nn symbol | 2 | 5.6 | assign symbol to input or output terminal |
| Assign tm.nn Z | 2 | 5.6 | delete an assigned symbol |
| Clear DRum x | 2 | 6.5 | delete all information on specified drum |
| Clear DRum ALL | 3 | 6.5 | delete all information on all drums |
| Clear History n | 2 | 10.3 | delete specified page of history data |
| Clear History ALL | 2 | 10.3 | delete all collected history data |
| Clear Memory | 3 | 11.5 | delete everything (return master unit to initial state) |
| DIsable item | 2 | 11.10 | disable specified variable, input, or output |
| DIsable number | 2 | 11.10 | disable all inputs and outputs on specified input/output unit |
| DIsable ALL | 2 | 11.10 | disable all variables, inputs, and outputs |
| DIsable C | 2 | 11.10 | disable all counters |
| DIsable F | 2 | 11.10 | disable all flags |
| DIsable V | 2 | 11.10 | disable all conversion variables |
| DIsable X | 2 | 11.10 | disable all external variables |
| Display n | I | 9.1 | display fixed text from message drum |
| Display n,var | I | 9.1 | display fixed text and input or variable |
| DUmp x | 1 | 11.5 | dump specified drum to cassette tape |
| DUmp ALL | 1 | 11.5 | dump everything to cassette tape |
| EDit number | 2 | 6.5 | edit specified control drum |
| EDit H | 2 | 10.1 | edit history drum |
| EDit M | 2 | 9.1 | edit message drum |
| EDit P | 3 | 12.2 | edit password drum |
| EDit V | 2 | 7.5 | edit conversion drum |
| EDit X | 2 | 7.8 | edit external drum |
| ENable item | 2 | 11.10 | enable specified variable, input, or output |
| ENable number | 2 | 11.10 | enable all inputs and outputs on specified input/output unit |
| ENable ALL | 2 | 11.10 | enable all variables, inputs, and outputs |
| ENable C | 2 | 11.10 | enable all counters |
| ENable F | 2 | 11.10 | enable all flags |
| ENable V | 2 | 11.10 | enable all conversion variables |
| ENable X | 2 | 11.10 | ENABLE ALL EXTERNAL VARIABLES |
| Graph | 1 | 10.4 | (optional) plot graph of 1, 2, or 3 history variables |
| Help | 1 | 5.4 | display 20-line command summary |
| Iou number | 1 | 11.10 | print raw data from specified input/output unit |
| Modify val item | 2 | 11.10 | preset specified variable, input, or output |
| Modify val number | 2 | 11.10 | preset all inputs and outputs on specified input/output unit |
| Modify val ALL | 2 | 11.10 | preset all variables, inputs, and outputs |
| Modify val C | 2 | 11.10 | preset all counters |
| Modify val F | 2 | 11.10 | preset all flags |
| Modify val V | 2 | 11.10 | preset all conversion variables |
| Modify val X | 2 | 11.10 | preset all external variables |
| Print number | I,1 | 5.6 | print symbols, input values, and output values on specified input/output unit |
| Print variable | 1 | 9.2 | print current contents of variable |
| Print All | I,1 | 9.2 | print all variables, assigned inputs, and outputs |
| Print C | I | 9.2 | print all counters |
| Print DRum x | 1 | 6.5 | print contents of specified drum |
| Print DRum ALL | 1 | 6.5 | print contents of all drums |
| Print Errors | 1 | 9.3 | print last 20 stored messages and errors |
| Print F | I | 9.2 | print all flags |
| Print History n | 1 | 10.3 | print specified history |
| Print History ALL | 1 | 10.3 | print all collected history data |
| Print Index n | 1 | 6.5 | print contents of specified drum's comment line |
| Print Index All | 1 | 6.5 | print comment lines from all control drums |
| Print Pointer x | 1 | 6.7 | print specified drum's pointer (find out which line drum is rotated to) |
| Print STatus | 1 | 5.5 | print system status |
| Print V | I | 9.2 | print all conversion variables |
| Print X | I | 9.2 | print all external variables |
| REload | 2 | 11.5 | reload memory from cassette tape |
| ROtate line drum | 2 | 6.7 | manually rotate one or more drums to specified line |
| ROtate line ALL | 2 | 6.7 | manually rotate all drums to specified line |
| Set History OFF | I,2 | 10.2 | suspend specified history |
| Set History OFF ALL | I,2 | 10.2 | suspend all history collection |
| Set History ON | I,2 | 10.2 | activate specified history |

-continued

| Format | Type | Sec. | Meaning |
|---|---|---|---|
| Set History ON ALL | 1,2 | 10.2 | activate all history pages |
| Set Our DOWN | 1 | 8.2 | set official clock back one hour |
| Set Our UP | 1 | 8.2 | advance official clock one hour |
| Set SCan n | 2 | 11.1 | specify number of seconds between drum scans |
| Set SCan 0 | 2 | 11.1 | specify continuous scanning |
| Set Time yy mmm dd wkd hh mm ss | 2 | 5.5 | change official date and time |
| Trace n | 1 | 11.9 | trace specified control drum |
| Trace ALL | 1 | 11.9 | trace all control drums |
| Trace OFF n | 1 | 11.9 | stop tracing specified control drum |
| Trace OFF ALL | 1 | 11.9 | stop all traces |

PREDEFINED VARIABLES

Predefined variables and values cannot be abbreviated. You cannot ASSIGN a symbol to an input or an output with the same name as a predefined variable from this list.

| Variable | Sec. | Meaning |
|---|---|---|
| APR | 8.3 | the number 4, for comparisons with MTH |
| AUG | 8.3 | the number 8, for comparisons with MTH |
| CL | 8.5 | current drum line |
| DEC | 8.3 | the number 12, for comparisons with MTH |
| DOM | 8.3 | day of the month |
| DOWN | 7.2 | same as OFF (except when assigned to a counter, decrements the counter by one) |
| FALSE | 7.2 | same as OFF |
| FEB | 8.3 | the number 2, for comparisons with MTH |
| FRI | 8.3 | the number 5, for comparisons with WKD |
| JAN | 8.3 | the number 1, for comparisons with MTH |
| JUL | 8.3 | the number 7, for comparisons with MTH |
| JUN | 8.3 | the number 6, for comparisons with MTH |
| MAR | 8.3 | the number 3, for comparisons with MTH |
| MAY | 8.3 | the number 5, for comparisons with MTH |
| MIN | 8.2 | minute of the hour |
| MON | 8.3 | the number 1, for comparisons with WKD |
| MTH | 8.3 | month of the year |
| NOV | 8.3 | the number 11, for comparisons with MTH |
| OCT | 8.3 | the number 10, for comparisons with MTH |
| OFF | 6.3 | the logical value OFF (deactivated) or the numeric value 0.0 |
| ON | 6.3 | the logical value ON (activated) or the numeric value 1.0 |
| OUR | 8.2 | hour of the day |
| SAT | 8.3 | the number 6, for comparisons with WKD |
| SC | 11.1 | time in seconds of most recent drum scan |
| SEC | 8.2 | second of the minute |
| SEP | 8.3 | the number 9, for comparisons with MTH |
| SUN | 8.3 | the number 7, for comparisons with WKD |
| TD | 8.4 | time in days since this drum's last exit |
| TH | 8.4 | time in hours since this drum's last exit |
| THU | 8.3 | the number 4, for comparisons with WKD |
| TM | 8.4 | time in minutes since this drum's last exit |
| TOD | 8.2 | time of day, (OUR * 100) + MIN |
| TRUE | 7.2 | same as ON |
| TS | 8.4 | time in seconds since this drum's last exit |
| TUE | 8.3 | the number 2, for comparisons with WKD |
| UP | 7.2 | same as ON (except when assigned to a counter, increments the counter by one) |
| WED | 8.3 | the number 3, for comparisons with WKD |
| WKD | 8.3 | day of the week |

FUNCTIONAL SPECIFICATIONS
C ANDOVER CONTROLS CORPORATION

The system of the invention is an integrated network of units capable of monitoring up to 8000 points and controlling up to 4000 points. The modular design of this NSP accommodates both small and large system requirements and significantly reduces installation costs by distributing intelligent monitoring units to the area where the physical points reside.

INTRODUCTION

The NSP Network is a technically advanced, modularly expandable system architecture for the precise control and data analysis of energy systems, whether electrical, gas, solar, etc. Each NSP network consists of 1→16 NSP Systems. NSP incorporates state of the art hardware integrated with sophisticated system software to produce an easy-to-use, user-programmable and cost-effective solution to most energy problems. NSP provides the user with a total energy management/control system with data acquisition capabilities for the recording of energy consumption and utilization statistics.

The NSP System has been designed for the end user familiar with mechanical control systems. The application (user-specified control and data acquisition) programs are made to appear as though they are a collection of mechanically rotating drums. There are up to 320 process control drums, an arithmetic conversion drum, and a history drum. These drums are easily programed via the system console and are extensively supported by many diagnostic and print information commands. These commands allow the user to completely test all applications programs before they are put into use.

In addition to the process control aspect, the NSP system also possesses a comprehensive data recording facility for analyzing the energy system being monitored. Up to 8 "pages" of averaged or dynamic data may be assembled over a period of time. This accumulated data may be transmitted to a user terminal or a host computer via the communication channel.

GLOSSARY OF TERMS

CIU—Central Intelligence Unit. Comprised of two processors: (1) performs all communication with external devices (local IOUs and other CIUs); (2) executes the specified control/monitoring drum programs.

Drum—An internal sequence controller implemented in software in which the user may implement his process control monitoring processes.

History File—Logging data residing in memory. This is comprised of 64 elements specified on up to 8 pages of the last 32 logging periods.

IOU—Input/Output Unit. Is responsible for the actual monitoring and control of system inputs/outputs.

Logging Period—The Logging Period refers to the number of Process Control and Monitoring Scans that are performed before the assimilated data is to be recorded in the History File.

Memory Bits—Internal Flags which are used to signal events detected by control drums. Memory Bits have two states, on and off.

NSP Network—New Sunkeeper Product. The acronym for the product described by this document.

NSP System—An NSP System is a stand-alone processing sub-system within the NSP network. An NSP System consists of a Drum Processor, Comm Processor and 1 to 16 IOUs.

Scan—A Scan refers to processing/monitoring of data inputted from external sources. Scans are performed at preset or variable intervals, as specified by the user.

Variable Masking—Variables may be "Masked" or Disabled to allow them to remain static.

ENVIRONMENT

HARDWARE CONFIGURATION/SYSTEM ARCHITECTURE

Figure 22:
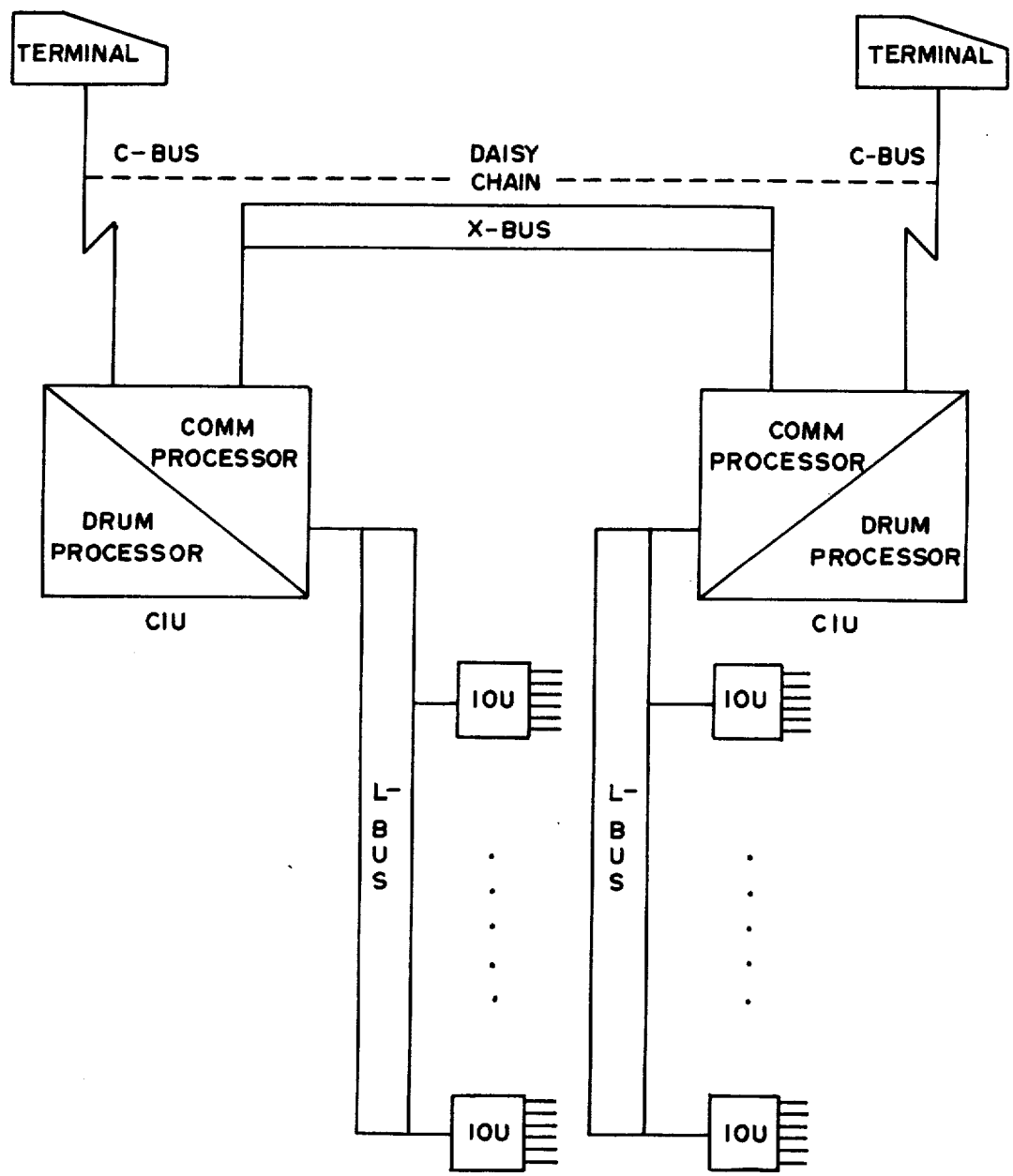
FIG. 22 is a systems diagram of the invention.
Figure 23:
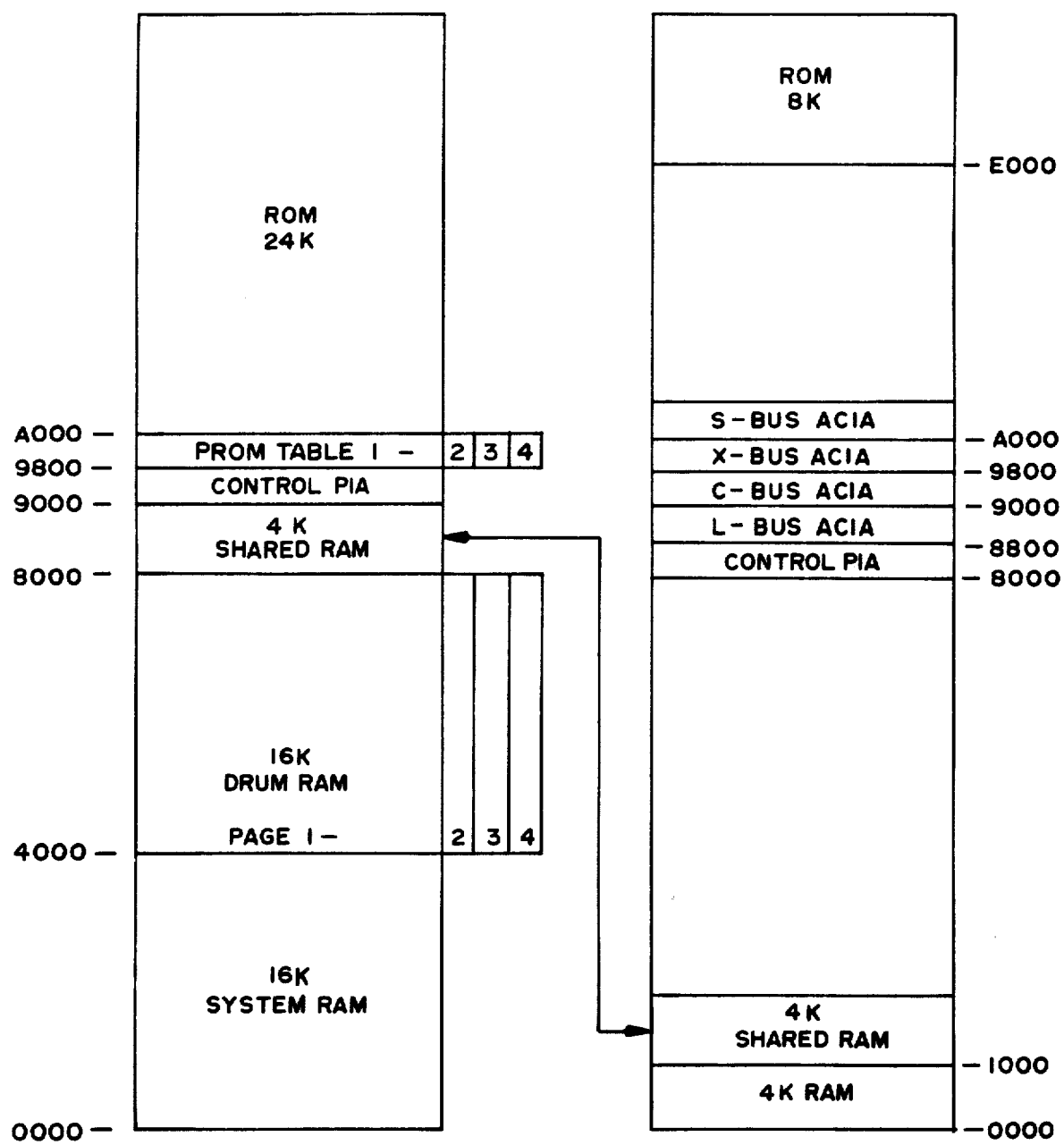
FIG. 23 is a diagram of the memory organization in the Central Intelligence Unit of the invention.

The NSP Network is a distributed processor system. The architecture of the system is illustrated in FIG. 22.

CIU (CENTRAL INTELLIGENCE UNIT) CONFIGURATION

CIU DRUM PROCESSOR

1. PROCESSOR

Motorola 6800 Operating at 1 MH
  Real Time Clock (100 MS interrupts)
  Watch Dog Timer

2. MEMORY

Program Storage PROM: 24K
Table Storage & Auxillary Package PROMs: 4×2K*
RAM Storage (History+Working Variables): 16K
RAM Storage (Drum Programs+Symbol Table): 4×16K**
RAM Storage (Shared): 6

*4 Optional 2K PROMs. These may contain:
Conversion Table (must be inserted at bank O)
Graphics Package
Control Drum Programs and Symbol Table burned into PROMs.
**Drum Program and Symbol Table RAM storage may be configured in 1 to 4 16K RAM segments.

The memory map following this section depicts the memory organization within the Drum Processor.

3. INTER-CIU COMMUNICATION

Data link utilizing the non-maskable interrupt line for inter-processor control.

4. CONFIGURATION CONTROL SWITCHES

Bit O—
  Set—print control drum specified data on request.
  Reset—if user not logged on, buffer 20 control drum print requests until next log on.
Bit 1—
  Set—Configure symbol table for V and X variables in addition to IOU points.
  Reset—No symbol table space for V and X variables.

COMM PROCESSOR

1. PROCESSOR

Motorola 6800 Operating at 1 MH
  Real Time Clock (100 MS interrupts)
  Watch Dog Timer

2. MEMORY

Program Storage PROM: 16K
RAM Storage (Shared with Drum Processor): 6K

3. I/O DEVICE SUPPORT

4 Asynchronous Serial Channels
  C-Bus operating at 300→9600 baud: (EIA-RS232-C)
  X-Bus operating at 300 baud
  L-Bus operating at 19.2K baud
  S-Bus operating at 9600 baud: (EIA-RS232-C)

4. INTER-CIU COMMUNICATIONS

Non-Maskable Interrupt

5. CONFIGURATION CONTROL SWITCHES 4 bits—CIU Number
4 bits—Number of Attached IOUs (0→15)

Notes

1. The Real Time Clock Logic is shared between the Comm and Drum Processing CIUs.
2. The Watch Dog Timer is shared between both CIU processors. If either processor fails to tickle the Watch Dog Timer within a two-second period, both processors are reset.

IOU (INPUT/OUTPUT UNIT) CONFIGURATION

1. PROCESSOR

Motorola 6800 Operating at 1 MH
  Real Time Clock (100 MS interrupts)
  Watch Dog Timer (2 second time-out before reset)

2. MEMORY

Program Storage PROM: 2K
RAM Storage: 1K

3. I/O DEVICE SUPPORT

1 Asynchronous Serial Channel *L-Bus operating at 19.2 K baud
32 Inputs *(Digital, Counter, Temperature or Voltage)
16 Digital Outputs

4. CONFIGURATION SWITCHES 4 bits—IOU Number

COMMUNICATION ENVIRONMENT

This section outlines the communication requirements for the various communicates buses utilized within the NSP network. These buses are:
C-Bus for user terminal communications;
L-Bus for CIU-to-IOU communications;
X-Bus for NSP System-to-NSP System communications.

C-BUS COMMUNICATION

The C-BUS is a full-duplex, medium-speed communication channel between an NSP System and the user terminal.
C-Bus speed: 300→9600 baud.
The C-Bus may be daisy-chained between NSP Systems.

L-BUS COMMUNICATION

The L-Bus is a high-speed, full-duplex communication channel between the Comm Processor and local IOUs. Each IOU should be able to monitor only communications from the Comm Processor.
L-Bus speed: 19,200 baud

X-BUS COMMUNICATION

The X-Bus is a low-speed, half-duplex communications channel between NSP Systems. Each NSP System must be able to monitor all communications on the X-Bus.

X-Bus speed: 300 baud.

DESIGN GOALS

This section outlines the system design goals which are employed during the design and implementation of the NSP product.

GOALS

A modular system that:
1. is cost effective for applications requiring few monitoring and control points;
2. is expandable to provide extensive monitoring and control facilities for very large applications;
3. provides for remote monitoring and control of input/output points. This significantly reduces installation costs for the user.

End User Designed Interface.

The goal here is to design the NSP operator interface (specifically, operator commands and application programs) to be easily learned by non-computer lay people. This is accomplished by creating a small set of highly recognizable English word commands and through the use of prompting messages that request argument information unspecified by the operator. Albeit this will cause some retraining of personnel already familiar with current Sunkeeper commands; this should prove minimal and provide quicker training periods for new users.

The system is to be implemented (via conditional assembly) in two varieties:
1. the total system as defined in this document;
2. a small "low cost" unit supporting a sub-set of features as described in this document.

4 NSP FUNCTIONAL DESCRIPTION

The modular architecture of the NSP Network addresses both the variation in system monitoring/control requirements, as well as the need to decentralize the physical connections where the hardware inputs are monitored and outputs controlled.

The basic module within an NSP Network is an NSP System. An NSP System can monitor 32 to 512 inputs and control 16 to 256 outputs. Up to 16 NSP Systems may be connected together (either within the same building or remote buildings using telephone lines) to provide an NSP Network a maximum 8192 inputs and 4096 outputs.

NSP Systems interact with one another through common or external variables (Xn). Up to 64 X-variables may be specified for inter-NSP System Communications.

Figure 24:
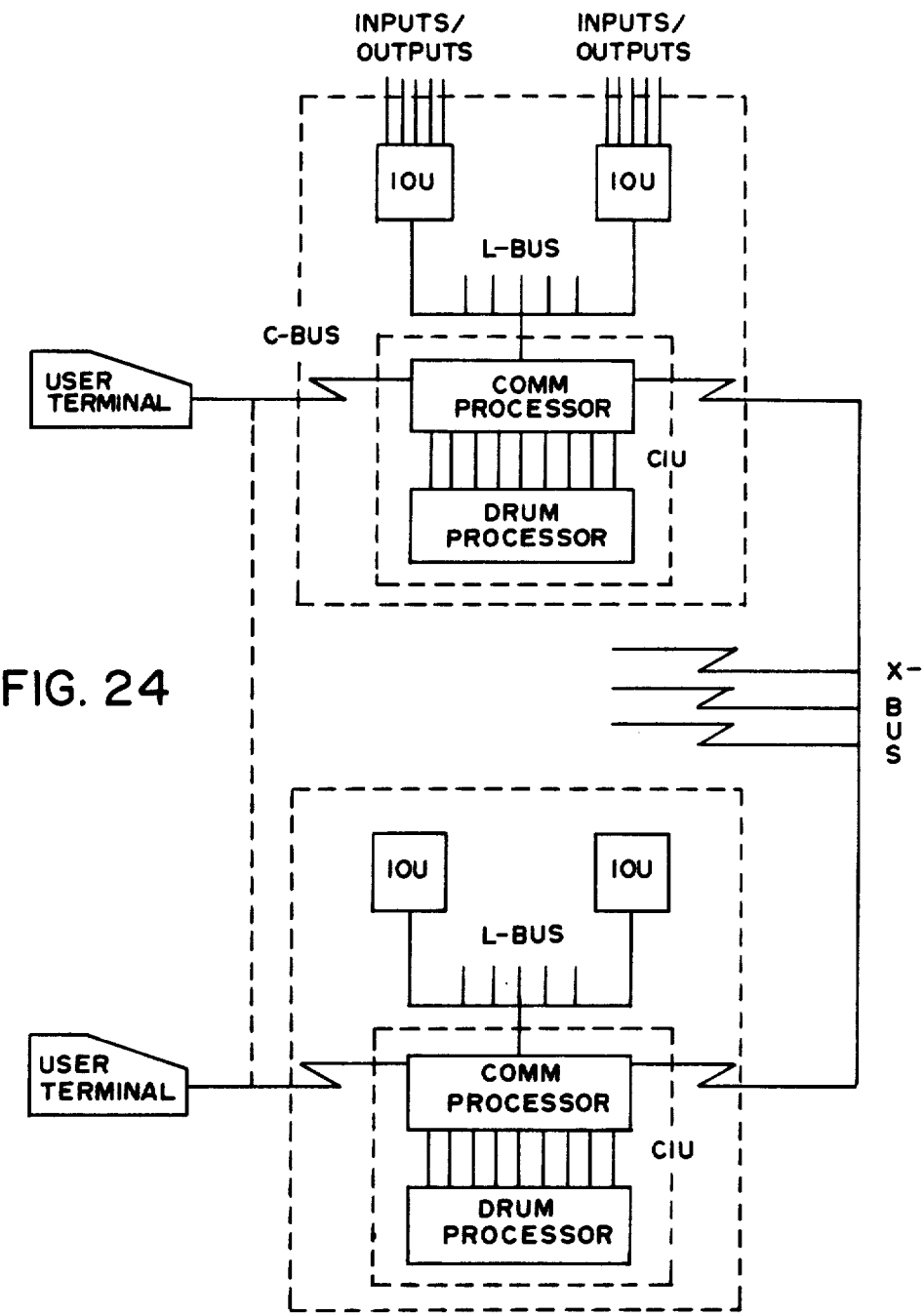
FIG. 24 is a diagram illustrating the system of the invention.

FIG. 24 depicts the modular architecture of NSP.

NSP SYSTEM FUNCTIONAL OVERVIEW

The NSP System is the primary operating module of the NSP. An NSP System consists of the following components:

1 Drum Processor
  The Drum Processor performs/executes all the user-specified control, arithmetic, and history drum programs.
1 Comm Processor
  The Comm Processor performs the data gathering and dissemination function for an NSP System unit. This consists of communications to:
  a. Drum Processor,
  b. Local IOUs,
  c. Other NSP Systems,
  d. User Terminal.
1 to 16 IOUs
  The IOU performs the actual data acquisition of inputs to be monitored and disposition to the outputs being controlled. Each IOU is capable of monitoring 32 inputs (voltage, temperature, digital or counters) and controlling 16 digital outputs.

Figure 25:
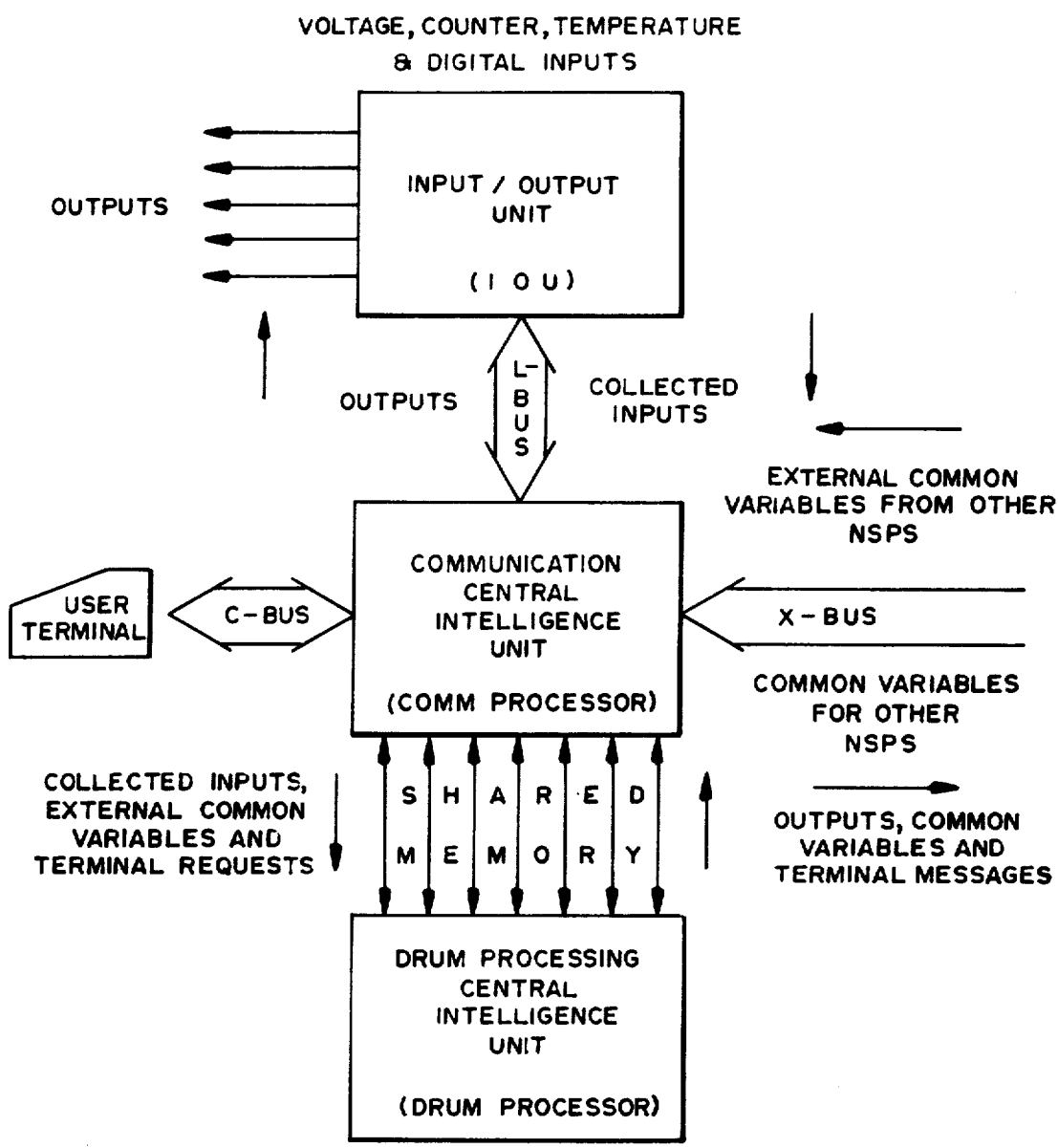
FIG. 25 is a diagram illustrating the organization of the Central Intelligence Unit of the invention.

FIG. 25 depicts the relationship between the components of an NSP System.

DRUM PROCESSOR OVERVIEW

The Drum Processor performs the "number-crunching" and data manipulation for the NSP System. This is comprised of executing user-"programmed" control drums and arithmetic drums to output driver settings and average/accumulate history data.

The Drum Processor is divided into several distinct system action levels. They are, in order of priority:
External Interrupts (Real Time Clock and Comm Processor),
User Terminal (Console) Requests,
Process Control/Monitoring Scan (PC/MS),
Component Integrity Checks.

The Drum Processor is a priority-driven system where tasks are always executed to completion or until interrupted by a higher priority task. The Process Control/Monitoring Scan (PC/MS) utilizes the majority of the CPU's resource; cherefore, other lower priority tasks are only executed in whatever time remains. For this very reason, User Terminal Requests are given a high priority in order to provide acceptable operator response times. This may result in irregular data collection scans during periods of operator interaction.

PROCESS CONTROL/MONITORING SCAN (PC/MS)

The PC/MS performs the analyzing and assimilation of the collected inputs (from either local IOUs or external NSP Systems) on a fixed or variable basis. This activity may be divided into the following events:
1. Collect Inputs (Comm Processor)
2. Background Scan Initiation
3. Execute Limit Drum
4. Execute Conversion Drum
5. Execute Control Drums
6. Accumulate History Data Event 1, the collection of inputs, is performed by the Comm Processor at the direction of the Drum Processor (either on a fixed or variable timed interval); events 2 through 5 are executed in background, activated by completion of the data collection event. Also note, Event 6 (the History Drum), is only executed once per logging period; all other events occur once per PC/MS cycle.

To achieve accurate measurements, PC/MS scans are activated on the next 0.1 second interval.

In addition to the process control and monitoring performed during the PC/MS cycle, consistency and integrity checks are performed on every drum line executed. This insures that only accurate and correct processes are performed. If an error is found in a Control Drum, the drum will automatically be rotated to line 0. If an error is found in an Arithmetic Drum, the line's equation will not be computed. In either case, a system error condition will be flagged.

Figure 26:
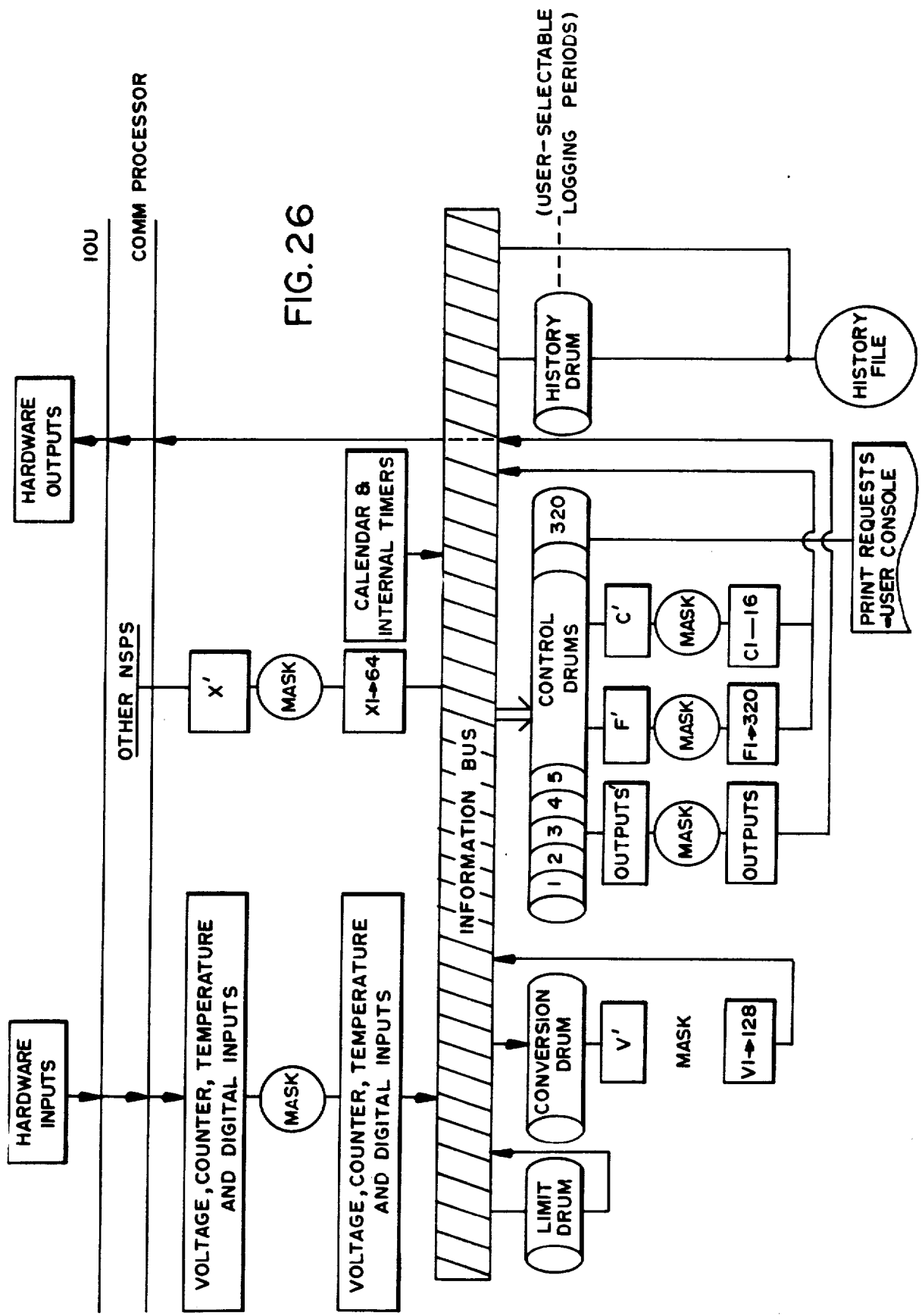
FIG. 26 is a diagram illustrating the flow of information in the system of the invention.

FIG. 26 is a conceptual illustration of the entire PC/MS processing flow:

COLLECT LOCAL IOU INPUTS

On a periodic basis the Drum Processor signals the Comm Processor to begin the collection of inputs from attached IOUs.

This process is performed asynchronous to the Drum Processor activities and only requires that the previous collection of inputs have been, or currently are being, processed.

In the event that a fixed scan interval has been specified and the input collection cannot proceed because the previous (PC/MS) cycle has not been initiated, a warning error will be generated and collection postponed until the previous set of collected inputs are accepted by the PC/MS cycle in background. The inputs collected are:

Voltages
Temperatures,
Digital Inputs,
Hardware Counters,
System Timers,
External Values.

After all inputs have been assembled, the remainder of the Process Control/Monitoring Scan (PC/MS) will be queued for execution by the background. This will commence immediately or directly following the completion of the previous PC/MS.

BACKGROUND SCAN INITIATION

Upon initiation of the PC/MS at the background level, all collected inputs are moved to their respective input software variables for drum execution. Any disabled input variables are then set to their last or specified constant values; i.e., the collected input value is ignored. The conversion drum is then activated.

CONVERSION DRUM

The Conversion Drum pre-processes the raw inputted data generating scaled/linearized V-variables. The V-variables are generated in numeric sequence; V1 is the first V-variable calculated, V2 is the next, etc. Any disabled V-variable is immediately set to its specified constant value; i.e., the calculated value is ignored.

V-variables are never cleared by the system, excepting, of course, system restart. Therefore, V-variables are useful for continuous accumulation of data. This can be done by V-variable calculations which reference the value of the variable on the previous scan. For example, $$V10 = V10 + 1$$

would make V10 a continuous counter.

Also note that V-variables are computed in numeric sequence and that subsequent computations may reference the computed values in preceeding computations made during the same scan.

The Control Drums are now activated.

CONTROL DRUMS

The NSP System now processes the Control Drums. Up to 320 Control Drums may be programmed. Each drum may have up to 99 control lines (1 to 99) and an emergency line (E). The maximum number that can be stored is limited by the complexity of the individual lines. There are two aspects to the processing of each Control Drum:

First, the emergency line is interrogated. If the emergency condition specified exists, the drum line pointer is advanced to the line specified in the emergency line exit condition.

Next, if the drum line pointer is not zero, the current drum line will be executed. The drum control line sets outputs and memory bits as specified by the drum line being processed. In addition, each line may evaluate expressions which establish the conditions for leaving the line.

As each Control Drum is examined, outputs and memory bits are set, and control may be transferred to another line within the drum, depending on whether or not an exit condition is met. At this time, outputs and memory bit changes are only recorded in a working buffer and have no effect on the processing of other control drums during the current PC/MS cycle. Because changes made during a drum scan are recorded only at the end of the scan, output and memory bit changes take effect only after all drums have been processed. This prevents short pulses on the output lines caused by two or more drums modifying the same output driver, and ensures that all drums examine a same set of memory bits. It also means that the last drum processed has the final say on any generated outputs.

After all Control Drums have been processed, all non-disabled memory bit settings are changed according to the contents of the working buffer. Disabled memory bit settings are unchanged.

Next, all non-disabled output settings are changed according to the contents of the working buffer. These outputs are then transmitted to their respective IOUs to be acted upon. Disabled output settings are unchanged.

Note that in the absence of an emergency condition, once a drum is set to a given line, it remains on that line until an exit condition for that line is satisfied. When an emergency condition has been met, the drum is advanced to the drum line specified by the emergency condition.

After all programmed Control Drums have been processed, control passes to the History Drum.

HISTORY DRUM

The History Drum is segmented into 8 pages with each page capable of averaging or capturing the value of up to 8 data variables. Execution of the History Drum causes the current average or value of the specified variable to be stored into the History File. The system provides for 32 periods of data to be stored for each page specified in the History Drum.

When averaging is mentioned in relation to the History Drum, it has the following connotations:

For discrete digital variable (such as digital inputs and memory bits), it indicates the percentage of scans that the variable was ON during a given History Period.

For all other variables, average does, indeed, refer to the mathematical average of the variable over the specified History Period.

USER TERMINAL INTERFACE

The User Terminal Interface is responsible for communications between the NSP System and the system operator or remote computer. It allows the system operator to control, monitor, program and test the NSP System.

OPERATOR COMMANDS

The following sets of commands are available to the system operator for interacting with the NSP System.

See the section on Operator Commands for detailed descriptions.
System Control and Monitoring,
Print and Message Transfer,
Diagnostic,
Application Program Editing.

SYSTEM INTEGRITY

One of the most important and often neglected aspects of any on-line unattended control system is the assurance that the system is functioning correctly and accurately. This principle must be applied, within reason, to the system as a unit as well as the hardware and software sub-systems. This section describes the internal software sub-system validation and recovery processes.

The NSP System Drum Processor performs several discrete checks to certify the performance of the microprocessor and its memory. Certification of other hardware components by the system software is under review. The certification checks are performed in the background (when scans are not being performed), and are to determine if a fault has occurred. These checks may not identify its cause nor the action needed to remedy the situation. The certification checks performed by the NSP System Drum Processor are:
1. performance checks on the micro-processor operation;
2. correctness of user-written application programs stored in Random Access Memory (RAM).

It is the general philosophy of these software sub-system certification procedures to:
identify component deterioration failures so they can be corrected before they impact system operation;
identify any system failures for correlation against system operation failures or system logging inconsistencies;
in rare cases, attempt to correct system failures.

As alluded to above, all system anomalies will be stored in memory for retrieval when the system is next logged on. This playback will be automatic and will consist of a synopsis of the last 10 errors. More detailed information may be requested by the user. This is done via the List Error Command.

MICRO-PROCESSOR PERFORMANCE

One of the background tests is an instruction obstacle course designed to validate the operation of the microprocessing unit. A failure in this test will be considered a fatal system error and will cease further system operation until the problem is corrected or disappears.

RAM (DRUM LINE) INTEGRITY CHECKS

As each drum line from ram is processed, it is carefully checked to insure data validity before line execution. If an error is detected, the condition will be logged and the line exempted from further processing. Additionally, the drum will be "parked" at line zero.

FUNCTIONAL DESCRIPTION—CIU COMMUNICATION PROCESSOR

The CIU Communications Processor (Comm Processor) is responsible for controlling the data flow within the NSP System. As stated above, four data communications paths are handled by the Comm Processor. They are between the Comm Processor and:
1. Drum Processor,
2. Local IOUs,
3. Other NSP Systems,
4. Attached User Terminal.

DRUM PROCESSOR TO COMM PROCESSOR COMMUNICATION

Drum Processor to Comm Processor communication is performed via static memory shared between the two processors. The shared memory is controlled by the use of flags to indicate which processor has control of data sets within the shared memory. Only one processor may interact with a data set at any period of time, thus preventing partial/corrupted data sets.

The communications between the two processors consist of:
1. To Drum Processor:
   a. collected local inputs,
   b. external variables from other NSP Systems,
   c. terminal requests directed to the specified NSP System;
2. From Drum Processor:
   d. control drum specified outputs,
   e. computed variables to be transmitted to other NSP Systems,
   f. messages for printing at a terminal attached to the NSP System.

IOU TO COMM PROCESSOR COMMUNICATION

IOU to Comm Processor communication is performed over a high-speed, multi-dropped communication serial line (L-Bus). The Comm Processor controls the communications of the L-Bus. This consists of three basic message types:
1. Stop data collection and ready data to transmit to Comm Processor.
2. Poll requests for collected data to each IOU.
3. Select messages to transmit data to each IOU.

The details of the L-Bus communication are described in the Appendix.

It should be noted that L-Bus communications are error-detected, not error-corrected. The error detection is attained by both character parity checks and a checksum appended to each communication block. Error correction is not attempted since the data will be re-requested or re-transmitted in a short period of time. Meanwhile, the previous data received will be substituted for the data in error. This means an IOU failure will cause all inputted data to remain static until the IOU returns to operation.

The communications between the Comm Processor and the IOU consist of:
1. To IOU: outputs to be activated;
2. From IOU: inputs collected, output failure flag (indicates specified output has been overridden at the IOU).

OTHER NSP SYSTEM TO COMM PROCESSOR COMMUNICATION

Other NSP System to Comm Processor communication is performed over a medium-speed, multi-point serial communication line (X-Bus). In general, the data is time-plexed over the communication line with all NSP systems monitoring/collecting the data.

The details of the X-Bus communications are described in the Appendix.

It should be noted that all X-Bus communications are monitored by all NSP Systems. Also external variable sharing transmissions are only error-detected, not error-corrected. Error detection techniques employ both character parity and message checksum checks.

Error correction is not attempted since the data will be re-transmitted in a short period of time. Meanwhile, the previously stored external variable data will be substituted for the data in error. This means an NSP System failure will cause external variables supplied by it to remain static in the other NSP Systems.

Communications between the Comm Procesor and the other NSP Systems consist of:
1. To Other NSP Systems: internal variables to be shared by other NSP Systems;
2. From Other NSP Systems: external variables transmitted by other NSP Systems.

ATTACHED USER TERMINAL COMMUNICATION

User Terminal to Comm Processor communication is performed over a medium-speed, dedicated or daisy-chained serial line (C-Bus). The User Terminal allows an operator (or remote computer) to control, monitor, program and test the NSP System.

Communications between the User Terminal and Comm Processor are normally ASCII text strings. However, if a remote computer attaches (logs on) to the C-Bus a simple protocol envelope will encase all transmissions over the line with full error detection and error correction. See the Appendix for details.

FUNCTIONAL DESCRIPTION—INPUT/OUTPUT UNIT

The Input/Output Unit (IOU) is the interface to the physical points to be monitored and controlled. The function of the IOU is to statistically smooth the inputs and forward them to the CIU for processing, and to assert the outputs as directed by the CIU.

Inputs are continuously monitored at the IOU. Upon receiving a Stop Scan Message from the Comm Processor,
1. the collected inputs are copied into a transmission buffer to be sent to the Comm Processor;
2. the input area initializes;
3. input monitoring resumes.

The collected inputs are then ready to be transferred to the Comm Processor when the IOU is polled.

All inputs monitored are passed to the CIU as a 16-bit value and an 8-bit value. The first 16-bit value is the value registered by the input (the Drum Processor converts this value to voltage, temperature or digital value as used by the drum programs); the second 8-bit value is the number of transitions which occurred since the last reading by the CIU. Transitions may occur at rates up to 10 Hz.

The outputs processed by the IOU include:
Continuous Digital Outputs, (the output is either asserted on/off until changed by the CIU);
Pulsed Digital Outputs, (the output is asserted on for a specified time period).

APPLICATION PROGRAMMING

The NSP system supports the following classes of programmable drums:
1. Control Drums (1 . . . 320)
    Control drums perform the actual process controlling/monitoring functions.
2. History Drum (H)
    The History Drum specifies which variables are to be automatically averaged/snapshotted during a history period.
3. Message Drum (M)
    The Message Drum specifies text messages which are displayable via the action field commands of control drums.
4. Password Drum (P)
    The Password drum specifies which user defined personal passwords will be accepted by the system and further specifies which system functions will be available to the user.
4. Conversion Drum (V)
    The conversion drum performs mathematical functions/reductions on system data.
5. External Variable Drum (X)
    The External Variable Drum specifies local iou or internal system variables to be shared with other NSP systems within the NSP network.

This section is concerned with the programming of the control and conversion drums. The other drums can generally be regarded as passive elements within the system and are covered in the section entitled "OPERATOR COMMANDS—APPLICATION PROGRAM EDITING".

Before getting into specifics regarding drum programming, a discussion of the types of variables available to the user is necessary.

NSP SYSTEM COLLECTED/CONTROLLED VARIABLES DISCUSSION

Before proceeding with the discussion of system variables, it is important that the reader understand how collected variables are handled. As stated before, inputs are continuously collected and statistically smoothed by the IOU. At the start of a scan, the Comm Processor signals all IOUs to save all collected inputs and ready them for subsequent transmission to the CIU. This means that all inputs are collected over the same scan period. The Comm Processor then polls each IOU and receives the counter, digital and voltage value for each point monitored. (Communication failures result in the previously collected set of values being forwarded for processing.)

For temperature inputs, the voltage value is automatically converted to the temperature base used by the customer. This is done by looking up the temperature value in Table 4. The user has the option of working with either Farenheit or Celsius temperature values.

IOU INPUT/OUTPUT REFERENCING (SYMBOL ASSIGNMENT)

Drum programs and operator commands require that specific references to IOU input/output channels be made via symbolic names, such as:
HEATER 4
OUT. TEMP
LAB_LITES These symbolic names must be assigned to the IOU channel before they can be referenced in drum programs or operator commands. This assignment is made via the ASSIGN command. The ASSIGN command is described in detail in the Appendix. In the ASSIGN command the user specifies the mode of the channel, the iou number and the channel number.

The mode of the channel refers to its usage characteristics. These are:
input channels (1 . . . 32)

C—Counter;
D—Digital Input (on/off);
T—Temperature (voltage value interpolated from table 4);
V—Voltage
output channels (1 . . . 16)
O—Output Channel (the value specified to be output determines the channels characteristics; Digital Output (on/off); Pulsed Digital Output (time interval to pulse output on); or numeric value output.

NSP SYSTEM VARIABLES

There are five classes of NSP System variables, they are:
1. IOU Input/Output Variables,
2. Internal Variables,
3. Calendar and Time Variables,
4. Interval Timer Variables,
5. System Variables.

IOU INPUT/OUTPUT VARIABLES

The IOU input/output variables are collected from the attached IOU(s). IOU variables are accessed symbolically by their previously assigned name.
1. IOU Counter Inputs
    The IOU counters accumulate events at rates up to 10 Hz. Each counter is 8-bits wide (0 to 255) and represents the number of transitions that have occurred at the channel since the previous processing scan. Once a counter reaches its maximum limit (255), it remains at that value until it is reset at the start of the next scan.
2. IOU Digital Inputs
    The IOU digital input represents the state of the input channel at the start of the processing scan. The IOU assumes that the input is on if the voltage is greater than 4 volts; else the input is considered off. Usually, digital inputs are tested to be either OFF (0) or ON (<>0).
3. IOU Temperature Inputs
    The IOU temperature inputs are the value of the voltage input converted to degrees. Temperature inputs are interpolated to their respective values by interpolating the inputted voltage value by Table 4. it is assumed that inputs used as temperature values are attached to standard thermistors.
4. IOU Voltage Inputs
    The IOU voltage input specifies the voltage value of the sensor attached to the input channel at the start of the processing scan. The range of IOU voltage inputs is 0 to 8.191 volts.
5. IOU Outputs
    An IOU output can be programmed to specify a discrete digital value (ON/OFF), a pulsed digital value (time period to pulse the output on), or a simple numeric value (0 to 3276.3). The actual usage of this value is determined by how it is connected at the IOU.

INTERNAL VARIABLES

Internal variables are variables which may be modified as well as referenced by drum programs. They are used to accumulate or convey information regarding the operation of the system. The internal variables are:
1. Internal Counters (C1 . . . C16)
    Internal counters are mainly used to accumulate a count of a specified activity. Internal counters are modifiable via control drum programs and are referencable by any system activity. Internal counters may be UPped (incremented by 1), DOWNed (decremented by 1) or set to a specified value.
    Internal counters may be set to any valid value. If the counter is UPped or DOWNed the counter value is fixed (fractional portion of the counter discarded) and checked to be within the integer range (0 to 9999). If the counter is below the range, the counter is set to 0. Likewise, if the counter is above the range it is set to 9999.
2. Conversion Drum Variables (V1 . . . V128)
    The conversion drum variables contain the values computed by the equations processed by the conversion drum.
    Depending upon the configuration control switch setting, symbols may be ASSIGNed to V-variables.
3. External Variables (X1 to X64)
    External variables are variables which are local to the NSP System which are to be referenced by other NSP Systems. The user must be careful to avoid usage/assignment conflicts between NSP Systems.
    Depending upon the configuration control switch setting, symbols may be ASSIGNed to X-variables.
4. Internal Flags (F1 . . . F320)
    Internal flags are driven by control drums. They are generally used to communicate data between control drums or to the history and conversion drum.
    (F1 through F272 can be freely used for interdrum communications. F273 through F320 are reserved for system communications to/with the drum programs. The designation of these flags is as follows:

| | |
|---|---|
| F273 | Histories are being accumulated for History Page #1 |
| . | . |
| . | . |
| F280 | Histories are being accumulated for History Page #8 |
| F281 | IOU communication fault, IOU #1 |
| . | . |
| . | . |
| F296 | IOU communication fault, IOU #16 |
| F297 | Output Override on IOU #1 |
| . | . |
| . | . |
| F312 | Output Override on IOU #16 |
| F313 | Clear To Send (CTS) state on C-Bus I/O Port |
| F314 | Reserved for future use |
| F315 | Carrier Detect (CxD) state on C-Bus I/O Port |
| F316 | Reserved for future use |
| F317 | Reserved for future use |
| F318 | System Operator is currently Logged On |
| F319 | Reserved for future use |
| F320 | External Power has Failed |

CALENDAR AND TIME VARIABLES

A number of special variables are used to keep track of the calendar and the time of day. These variables are given special names. This name may appear anywhere an IOU/internal variable could be used.

Calendar variables are automatically adjusted for leap year. Daylight savings time is adjusted by toggling internal flags (Fx) by control drum programs. All timer variables are based on a 24-hour military clock period.
OUR—Hour of the Day.

OUR is a number from 0 to 23. OUR changes every 60 minutes, on the hour, and remains constant for another 60 minutes.

MIN—Minute of the Hour.
MIN is a number from 0 to 59. MIN changes every minute, on the minute.

SEC—Second of the Minute.
SEC is a number from 0 to 59. SEC changes every second, on the second.

DOM—Day of the Month.
DOM ranges from 1 to 31, and is automatically reset to 1 at the start of a new month. DOM changes at midnight, and remains constant until the following midnight.

WKD—Day of the Week.
WKD takes the values MON, TUE, WED, THU, FRI, SAT and SUN (1 to 7). MOn is the smallest value, and SUN is the largest.
The above weekday abbreviations may be used in place of numbers when comparing WKD to a trip point. WKD changes at midnight and remains constant until the following midnight.

MTH—Month of the Year.
MTH takes the values JAN, FEB, MAR, APR, MAY, JUN, JUL, AUG, SEP, OCT, NOV and DEC (1 to 12). JAN has the smallest value, ad DEC has the largest. The above month abbreviations may be used as trip points for the MTH. MTH is changed on midnight of the last day of the month.

TOD—Time of Day
Current system time in hours and minutes. The format of TOD is:

HHMM

Where:
HH is the hour (00 to 23)
MM is the minute (00 to 59)
For example:
2315—15 minutes after 11 p.m.
630—30 minutes after 6 a.m.

INTERVAL TIMERS

In addition to keeping track of absolute time, the NSP System allows the control system to time intervals between events. There are four timers for each drum. All timers for a drum are zeroed when control is transferred to a new line of that drum and incremented automatically while the drum is on that line. No matter how long a drum is on the same line, the timer values do not exceed 255. Note, the timers are cleared if an emergency condition for a drum is activated, because the emergency causes a new line to receive control.

The four timers measure different amounts of time. The timer names and their meanings are as follows:
TD—Counts from 0-255 days
TH—Counts from 0-255 hours
TM—Counts from 0-255 minutes
TS—Counts from 0-255 seconds

SYSTEM VARIABLES

The following miscellaneous system variables are provided to the user:
SC—Scan Time in tenths of seconds.
This is the actual elapsed interval between system scans in increments of 0.1 seconds.
CL—Current Drum Line.
This is the drum line currently being executed by the control drum being processed. (Useful for performing emergency line control drum restarts).

ARITHMETIC EXPRESSIONS

The NSP System supports a high-level, arithmetically-oriented, equation-solving notation for the scaling, linearizing, averaging and accumulating of data by the control and conversion (V-Variables) drums.

The arithmetic expressions are specified as algebraic equations. For example:

V6+OUT. TEMP
(9*FAR. TEMP)/5+32

Computations are performed using signed floating point numbers. Floating point numbers range from $+/- 10^{**}38$ and are carried to 23 bits of significance.

ARITHMETIC EXPRESSION SOLVING NOTATION

Arithmetic expressions are evaluated from left to right without regard to operation precedence, except as follows:
sub-expressions within parentheses "(A+B)" are solved first;
unary operators (operators requiring only one operand) are resolved as the value is being scanned.
For example:

A+B*C is the same as (A+B)*C but not identical to

A+((B*C)

Warning: The arithmetic solving notation employed by the NSP System does not conform to normal algebraic combining precedence. That is, multiply is not done before add, unless it is specified to the left of the add within the equation. Parentheses should be used liberally to prevent ambiguous expressions.

ARITHMETIC EXPRESSION OPERATORS

There are two classes of arithmetic expression operators:
1. unary operators, or operators which act upon one operand;
2. binary operators, or operators which act upon two operands.

UNARY OPERATORS

Unary operators are operators which only require one operand.
—Negation
—Logical Inversion— If the operand equals 0, the result is 1; else the result is 0.
$—Square Root
@—Absolute Value—If the operand is negative, the operand is negated to a positive value.
Lx—Table "x" Lookup
Table lookup is intended to aid in the calibrating non-linear input probes and other scaling operations. "x" selects one of four tables (1, 2, 3, 4) to be referenced. The integer value of the operand is used to extract an entry from the selected table. The operand must be in the range of 0 to 8.190 (voltage range). Operands smaller than 0 return the first entry from the table; operands greater than 8.190 return the last entry from the table.

Remember, Table 4 is implicitly used for temperature conversions. The process "L4 value" is automatically performed by specifying a symbol to be an IOU temperature variable.

BINARY OPERATORS

Binary operators combine two operands to form a result.

+ —Add
- —Subtract
* —Multiply
/ —Divide
& —Logical And
! —Logical Or
—Logical Exclusive Or
> —Logical Greater Than—Consider A>B. If A is greater than B, the result is <>0 (TRUE); else the result is 0 (FALSE).
< —Logical Less Than—Consider A<B. If A is less than B, the result is <>0 (TRUE); else the result is 0 (FALSE).
= —Logical Equal—Consider A=B. If A is equal to B, the result is <>0 (TRUE); else the result is 0 (FALSE).
—Logical Not Equal—Consider A#B. If A is not equal to B, the result is <>0 (TRUE); else the result is 0 (FALSE).

CONTROL DRUM PROGRAMMING

The NSP System System supports up to 320 control drums. The drums are numbered 1 to 320. Each drum is comprised of three types of lines; they are:
Comment Line (C Line).
  Annotates usage of control drum.
Emergency Line (E Line).
  Processed on every scan to detect emergency conditions and initiate corrective action.
Process Lines (1 to 99).
  Specify individual programmed control processes.

Comment lines can contain any text information helpful to the user. The Emergency and Process Lines are similar, except that the Emergency Line has no action field. The drum lines are constructed as follows:
1. Action Commands.
  These are the outputs of the particular drum line. They are executed whenever the drum line is processed.
2. Exit Lines.
  These specify what drum line control is to be passed to if the specified condition is met.
3. Exit Conditionals.
  These specify the tests to be performed to determine whether or not control is to be passed to the specified exit line.

Whenever the NSP System is running, drum lines are being scanned. If the operator rotates a drum to line 0, the drum stops and is not processed again until the line number becomes non-zero. This restart can occur because of an emergency condition for that drum, or because of operator intervention (see ROTATE command).

ACTION COMMANDS

Each non-emergency drum line may specify one or more actions to occur as a result of the drum line being processed. The classes of specified actions are:
set outputs,
set internal control flags,
manipulate internal counters,
print data/information messages onto the system console,
control system action via the set command.

The action commands available to perform these functions are listed below.
Display—Display text of message drum line on console
Print—Print IOU, internal system variable(s) or system file on the console
Set—Set history collection on or off and increment or decrement the current system hour (for daylight savings time)
> —Assign expression value to IOU Output, Internal Counter, Internal Flag or V-variable(s)

The Display and Print commands are either executed immediately or delayed until a user is logged onto the system (Drum-CIU configuration switch). If the commands are to be delayed and no user is presently logged on, a number of display/print requests will be buffered to be executed when a user does log on. Display/Print requests exceeding the buffer (20 entries) are discarded. In addition, Display and Print requests are only executed when the control line is first executed, that is, the request will not be reissued for as long as the drum continues to execute the same drum line.

Set commands and variable assignments are always executed and are reexecuted for as long as the drum line is executed.

The syntax of the various action commands is:
Display mesg-no, variable
  The mesg-no selects the line of the message drum (M) to be displayed on the console with the associated variable. The symbol of the variable is also displayed for identification purposes.
Print Disable<iou 1 variable-class (C,F,V or X) 1 ALL>
Print History<history-page 1 ALL>
Print Status
  Print the data concerning disabled/overridden variables, the history file or the system status message on the console.
Print iou 1 variable-class (C, F, V or X) 1 ALL
  Print data regarding all channels of an IOU, class of internal variables, or all variables on the console.
SET HISTORY <ON 1 OFF> 
SET OUR <UP 1 DOWN>
  Set the state of history accumulation for a specified page or all history pages or increment/decrement the system hour.
expression>variable (variable(, variable) . . . )
  The control drum assign performs the assignment of the specified expression to a list of iou output variables, internal Counters, internal Flags or V-variables. The expression may be any valid arithmetic expression, a constant or the following keywords (ON, OFF, TRUE, FALSE, UP or DOWN).
  The keywords UP or DOWN are used to increment or decrement an internal counter (Cx). If the keywords are used with other types of variables they assume the value of <>0 (UP) or 0 (DOWN)
  For example, ON>AC.CNTL: turn the IOU output channel digital output ON
UP>C4: increment internal counter C4 by 1
10>WAT.VALV: pulse on the IOU output channel WAT.VALV for 10 seconds
10*V1>VALVE: pulse on the IOU output channel VALVE for 10 times the number of seconds specified in V1
PRINT 4: print the values of IOU #4 inputs and outputs onto the system console
PRINT STATUS: print the system status onto the system console
SET HISTORY ON 1: activate the collection of history data for the data variables in history page #1
DISPLAY 5, TOD: display the text of line 5 in the message drum (M) with the current time of day on the console
OFF>AC.CNTL, HEAT.CTL, FAN1, FAN2, F205:turn off all outputs in the above list

EXIT LINES (LEAVING A LINE)

Each control or emergency line may specify sets of conditions for transferring control to another line on the same drum. These exit conditions are arithmetic expressions or logical tests relating to the settings of output drivers, digital inputs, limit points for voltage inputs, internal memory, expiration times for timers and set points for counters. The NSP System checks all exit conditions for the emergency line and the drum line being processed during each PC/MS cycle. An exit condition may require a combination of conditions be met or it may allow control to be transferred if any condition is met.

Control is passed to the line number of the first satisfied exit line; succeeding exit lines are not examined. If none of the exit conditions are satisfied, the same drum line is processed on the next cycle. If a drum line does not have any exit lines/conditions, the NSP System remains on that line until the drum is rotated by an emergency condition or by operator intervention.

If a drum line has an exit line, but not an exit conditional, the command is always satisfied and control passed to the specified line.

If an exit line specifies a line number which does not exist in the drum, the NSP System cannot transfer to it. Therefore, even if all of the exit conditions are satisfied, the drum is "parked" at line 0. For this reason, the exit condition must refer to a line which exists.

Multiple exit commands may pass control to the same line.

If an exit condition specifies line 0, the NSP System interprets the specification to mean that the exit is not taken. This may be useful during debugging, when it is necessary to temporarily forbid certain sequences.

EXIT CONDITIONALS

As discussed above, exit conditionals are determined by the boolean (logical) result of the expression being evaluated. That is, if the expression is true (result is not equal to 0) control is passed to the specified exit line. If the expression is false (equal to 0), control is not passed to the specified exit line.

This logical result is usually the result of a simple test. Such as:

TEMP>75

F25=ON

V4>10.5

MTH=FEB

For more complex situations, these simple conditional tests may be logically combined. Such as:

(TEMP>40) & (TEMP<75) {"&" P0 is the symbol for AND}

(F25=ON) & (F26=OFF)

(V4>10.5) ! (MTH=FEB {"!" is the symbol for OR}

Additionally, variables may be arithmetically combined and then compared against an expected value. Such as:

(TEMP * 9)/5+32>100 {check if over 100 degrees C.}

Notes

1. All comparisons are performed using Floating Point Arithmetic. This means testing for equal on calculated results may fail even though the variables "appear" equal.
2. Time Variables, such as MTH and WKD may be compared against text constants; i.e., DEC, MON. These text constants are translated to their corresponding numeric value before making the comparison.
3. Digital values (excluding pulsed outputs) should be compared against the text constants ON or OFF.
4. Make liberal use of parenthesis to insure the correct evaluation of the expression. Remember, the NSP system employs a left to right expression evaluation processor.

CONVERSION DRUM PROGRAMMING

The conversion drum (V-variables) is programmed exclusively using the high level algebraic notation described above. All lines in the conversion drum are evaluated every processing scan. This evaluation process has been discussed in the preceeding section.

Conversion drum lines are specified as algebraic equations. For example:

V6=A21 * 34

V7=V7+V6

The result (left side of equation) is implied by the line number opened while entering the drum. In the above examples, the 6th line of the conversion drum and the 7th line of the conversion drum were opened when the equation was entered (all data after the right side of the =).

OPERATOR COMMANDS

The Operator Commands allow the user to control, monitor or program the NSP System. In general, there are three levels of Operator Commands:
Logon,
Conversational,
Edit.

At each level the operator may enter a specific set of commands. This section describes the format of command entry and briefly describes the various types of commands. More detailed information may be obtained in the Appendices to this document and in the User's Manual.

OPERATION OVERVIEW

The operator interface has been designed to accomodate both the experienced and inexperienced or casual user. This is accomplished by defining a small set of English word commands which are recognizable by the system as either unique command abbreviations or the full command word. Additionally, most commands are self prompting if the command arguments have not been entered on the command line.

For example, to modify the contents of the variable "OUT.TEMP2 to 100, the operator may enter the command in any of the following formats:

M OUT.TEMP 100

MO OUT.TEMP 100

MOD OUT.TEMP 100

MODI OUT.TEMP 100

MODIFY OUT.TEMP 100

MODIFY

Variable? OUT.TEMP

Value? 100

(the underlined messages are generated by the NSP system)

Note that the operator cannot enter

D V1 because the selected abbreviation is ambiguous; the NSP system cannot distinguish between the commands DISABLE and DUMP.

COMMAND SYNTAX

All commands consist of a command identifier and optional arguments. The command identifier or keyword arguments can consist of the entire command name or unique subset of first letters of the command.

Commands and arguments must be separated by at least one space. All commands must be terminated by a Carriage Return.

For example,

MODIFY OUT.TEMP 100 {modify OUT.TEMP to 100}

PR 1 {print the data elements on IOU #1} are all valid commands;

D V5 {ambiguous command (Dump/Disable)}

PR1 {no space between command identifier & argument}

PRNT H {command identifier spelled incorrectly}

SPECIAL FUNCTION KEYS

The following special function keys are available for control of the user terminal:

| KEY | DESCRIPTION |
| --- | --- |
| CTL/O | Suppress output of current report (toggle switch, two CTL/O's restart output) |
| CTL/S | Suspend console output until next CTL/S is depressed |
| RUBOUT | Delete last inputted character |
| SPACE | Command and Argument separator |
| C/R | Input line terminator |
| ESC | Aborts Previous Operator Command |

LOGON COMMANDS

The operator must follow a very specific sequence to LOGON to the NSP System. Upon establishing a connection to the NSP, the operator must enter "&Nxxxx", where "xxxx" is the device password. Each NSP System has a unique device password. The characters of this Logon command are not echoed. If the device password is not correct, there is no response to the operator.

If the device password is correct, the selected NSP System responds with "P>". The operator must then enter his personal password. If he does not enter a valid password after four tries, the NSP System will terminate the connection. Again, input is not echoed.

When a correct operator password has been entered, the NSP System responds with a brief status report which contains:

current date and time,
system configuration,
current state of the attached IOU units,
synopsis of system errors.

The NSP System then responds "R>", which indicates that it is ready for a conversational command.

As described in the Security Section, a specific operator may be allowed access to a limited subset of the conversational commands through the access-code corresponding to his password.

CONVERSATIONAL COMMANDS

NSP System supports an extensive set of conversational commands allowing the operator to:
Control and Monitor System Operation;
Print Current Variable States and Accumulated Statistical Data Reports;
Completely Diagnose and Test Application Program operation.

CONVERSATIONAL COMMAND LIST

The following list is a synopsis of the conversational commands:
ASSIGN—assign iou reference channel to symbol
CLEAR—clear system file, drum program or memory
DISABLE—disable specified variable from changing
DUMP—dump drum programs in condensed image
EDIT—edit (create/modify) drum program
ENABLE—enable specified variable to be modified
(*) GRAPH—print a graph of specified history entries
HELP—print a synopsis of the NSP system commands
IOU—print value of raw inputs for selected IOU
MODIFY—modify variable to specified value
PRINT—print iou, internal variable of system file RELOAD—reload previously dumped drum program image
ROTATE—rotate drum to specified line number
SET—set system time/scan time
TRACE—trace rotation of selected drum
(*)—Optional feature.

The Help command may be invoked at any time by typing in a question mark (?).

The conversational commands are described in the Appendix-A. EDIT is described below.

APPLICATION PROGRAM EDITING

NSP Drum Programming/Program Modification, collectively referred to as Program Editing, is performed on a field or line replacement basis. That is, drum lines or fields requiring modification must be totally re-entered for the correction to be incorporated into the system.

In general, editing is performed in the following manner:
1. Select a drum via the Edit command;
2. Open a drum line via the Open command;
3. Make desired drum program line entries or corrections;
4. Repeat steps 2-4 until all changes are made to the selected drum;
5. Close the drum to complete editing via the Close command.

The program entries/corrections are added to the system program library as soon as the next line is Opened, Zapped (deleted) or editing completed (Close command).

Note that line reference errors may occur if the drum being edited is in operation. Line reference errors cause the drum to be "parked" at line 0. It is therefore a good practice to check the executing drum line (via the Print Pointer command) after editing to insure proper drum execution.

EDITING COMMANDS

Editing is initiated by selecting a drum via the EDIT command. The selected drum number must be either a control drum number, H, M, P, V or X.

The following single letter commands are available:
O n—Open line "n" for editing. The previously opened drum line, if any, is automatically closed. Open must be performed before any changes can be made to a drum program.
P (m)(n)—Print Drum Line. The three formats of the Print command are:
 P—print current drum line;
 P line—print specified line on current drum;
 P drum line—print specified line on specified drum.
Z n—Zap (delete) line "n". The specified line is deleted from the drum program. Additionally, Zap automatically closes the previously opened drum line, if any.
C—Close current drum line and return to the system monitor.

As with other NSP commands, the escape key can be used to abort the current edit process. The currently opened line will not be updated into the system program library.

These general edit commands apply to all drums. The following sections describe the editing process for each type of application drum.

CONTROL DRUM EDITING

Control Drum Editing is performed on a field replacement basis. That is, the operator selects a drum line and field and then proceeds to replace it (or enter it, if new).

The referencable control drum lines are:
C—Drum Comment Line
E—
 Emergency Line
 The emergency line is identical to a control drum line, except no action field is permitted.
1-99—Control Lines
 The selectable fields are:
nA—Action field "n". If "n" is not specified, the next free action field is assumed.
nX—eXit conditional "n". If "n" is not specified, the next free exit conditional is assumed.

In normal mode, the operator opens a line for editing, such as

1E>0 2

1E-2> which opens control drum line 2 the operator then specifies which field is to be replaced. The system responds by first displaying the current contents of the field and prompting the operator to enter in the new field contents as follows:

1E-2>2A

2)ON>HEATER

2)OFF>HEATER 1E-2>

In the above example, action field #2 was changed from "ON>HEATER" to "OFF>HEATER". Editing control was then returned to the main edit prompt level.

For the advanced user, the same result may be accomplished by entering all the required information on the same line, as follows:

1E-2>2A OFF>HEATER 1E-2>

The same principal is applied to the changing of exit conditionals. The major difference is that the operator is required to enter the exit line number. For example, 1E-2>2X 2)Exit 04 If TEMP>68

2)Exit?04

IF? TEMP >70

1E-2>

In the above example, the conditional of exit field #2 was changed to "TEMP>70" from "TEMP>68" with the exit line remaining line 4.

Again, the more advanced user may make the same change by entering all the information of the same line as follows:

1E-2>2X 4 TEMP>70

In addition to the above basic entry/replacement capabilities the operator may delete an action command or exit conditional by selecting the field and entering a "Z" to zap or delete it.

A null line (carriage return only) causes control to be returned to the main edit prompt level without modifying the currently selected line.

HISTORY DRUM EDITING (H)

History Drum Editing is performed on a page entry specifier replacement basis.

The lines referable when editing the History Drum are:

C—Comment Line.
1-8—History Page Specifiers.

Upon selecting (opening) a history page, the operator is allowed to change the history page sampling interval by the prompt:

Number of Minutes in Sampling Period (15)?

with the current sampling interval displayed in parenthesis. If the current interval is appropriate a carriage return is entered, else the desired history interval is entered.

The operator may now select a history variable-specifier for editing by the command nV—where "n" is the variable specifier number (1.8)

Variable-specifiers select the variables to be sampled for the page. The format of a variable-specifier is:

variable-id, variable-heading<!>

Where:
Variable-id is the variable to be sampled.
Variable-heading is an eight-character text string to be printed above the page column for the specified variable.
If an exclamation point (!) follows the variable-heading, the current value of the variable will be the logged rather than the averaged value.

For example (normal mode)

HE-1>2V

V2=IN TEMP INTEMP

Variable Specifier "Variable, Heading<!>"?
IN_TEMP INTEMP!

For example (advanced mode)

HE-1>2V IN_TEMP INTEMP!

In both of the above examples, the second variable-specifier of history page #1 has been changed to log the current contents of IN_TEMP rather then the averaged contents of IN_TEMP

MESSAGE DRUM EDITING (M)

Message Drum Editing is performed on a line/text replacement basis; i.e., the operator selects a line (Open Command) and types in the new/correct text.

The lines referencable when editing the Message Drum are:
C—
Drum Comment Line.

Text String to identify drum.
1-64—
Message Lines.
Message Text String.
For example (normal mode)

ME>O 8

M8=AIR CONDITIONER MALFNCTION

M8=AIR CONDITIONER MALFUNCTIONING

For example (advanced mode)

ME>O8 AIR CONDITIONER MALFUNCTIONING

Both of the above examples produce the same results, that is setting message line #8 to "AIR CONDITIONER MALFUNCTIONING".

Note, it is possible to specify some terminal control codes in the message drum text lines. Most notable is the bell code (control-g) used to sound the audible alarm at the terminal.

PASSWORD DRUM EDITING (P)

Password drum editing is performed on a password-/access code replacement basis.

The lines referencable when editing the password drum are:
C—
Drum Comment Line
Text string to identify the drum.
1-8—
Password/Access Code Lines
Each Password line consists of a password (upto 6 characters) and an access code. The valid access codes are:
1—Only access to the PRINT commands
2—Access to all system functions, except the password drum (this is only accessible from the master system password).

For example (normal mode)

PE>O 1

P1=USER1, 1

P1=USER1, 2

For example (advanced mode)

PE>O 1 USER1, 2

Both of the above examples change the access code of the first password (USER1) to 2 allowing any operators that logon under that password to have access to and modify all system programs, except the password drum.

CONVERSION DRUM EDITING (V)

Conversion Drum Editing is performed on a line/equation replacement basis; i.e., the operator selects an equation (Open Command) and types in the new/correct equation.

The lines referenceable when editing an Arithmetic Drum are:
C—
Drum Comment Line.
Text String to identify drum.

1-128—Equation Lines corresponding to inferred V-variables.

For example (normal mode)

VE>O 5

V5=CUR. VOLT+V5

V5=CUR. VOLT+(CUR. VOLT−V5)/2

For example (advanced mode)

VE>O 5 CUR. VOLT+(CUR. VOLT−V5)/2

Both of the above examples set the conversion drum equation on line #5 to "CUR. VOLT+(CUR. VOLT−V5)/2".

EXTERNAL DRUM VARIABLE EDITING (X)

The External Variable Drum specifies which values within the NSP System are to be made available to other NSP Systems. Up to 64 values may be shared within an NSP Network. It is up to the user to insure that variable usage conflicts and variable assignment overlaps do not occur. This means that only one NSP System may assign a value to any given external variable and that all other NSP Systems must know the contents of that variable.

The lines referable when editing the External Variable Drum are:

C—

Drum Comment Line.

Text String to identify drum.

1-64—External Variable Assignments.

External variable assignments are made by opening a line (implied X-variable) and entering the variable to be shared by other NSP Systems.

For example (normal mode)

XE>O 6

X6=V05

X6=V19

For example (advanced mode)

XE>O 6 V19

Both of the above examples specify that V-variable 19 is to be shared with other NSP Systems as external variable X6.

ALPHABETICAL ORDER COMMAND LIST

This section describes all system operator commands supported by the NSP System. There are two general classes of commands discussed in this appendix, they are:

logon/logoff commands;
conversational operator commands.

The general NSP command syntax is:

CCCCCCC (ARG1) (ARG2)

Where:
CCCCCCC is the command identifier
(ARG1) is command argument #1, if required
(ARG2) is command argument #2, if required Note 1. Arguments are separated from the command identifier and other arguments by at least one space.
2. All command lines are terminated by the Carriage Return key.
3. The command identifier or keyword arguments can consist of the entire command name or unique subset of the first 'n' letters of the command.

Conventions variable-list::(variable-id (, variable-id ( . . . ))
variable-type::individual-variable I C I F I V I X iou-number I ALL
drum::(drum-no (, drum-no ( . . . )) I ALL
drum-no::1 . . . 320 I H I M I P I V I X

LOGON/LOGOFF COMMANDS

| LOGOFF | &G |
|---|---|

The LOGOFF must be issued in order to inform the NSP System that the operator is through issuing commands. The NSP System ignores further commands until a successful logon. If no commands are entered for 5 minutes, the NSP System assumes that the operator forgot to say goodbye, and logs off automatically. In either case, the speed is reset to 300 baud.

| LOGON | &N text |
|---|---|
|  | &R text |

The operator or remote computer must follow a very specific sequence to logon to an NSP System. Upon establishing a connection to the NSP System, the operator must enter "&Nxxxx" (for the remote computer "&Rxxxx"), where "xxxx" is the device password. Each NSP System, whether directly connected or in "daisy chain" to others, has a unique device password. The characters of this logon command are not echoed. If the device password is not correct, there is no response to the operator.

If the device password is correct, the selected NSP System responds with "P>". The operator must then enter his personal password. If he does not enter a valid password after four tries, the NSP System will terminate the connection. Again, input is not echoed.

When a correct operator password has been entered, the NSP System responds with a brief status report which contains:
current date and time;
system configuration;
current state of attached IOUs;
synopsis of errors.

The NSP System then responds "R>", which indicates that it is ready for a conversational command.

As described in the appendix regarding system security, a specific operator may be allowed access to just the informational commands or be allowed to update system control programs via the access code associated with the password used to log in with.

CONVERSATIONAL MODE OPERATOR COMMANDS

This section describes the operator commands which can be invoked after a successful LOGON has been completed with the NSP system. These commands allow the operator to monitor and control the operation of the NSP system at a system level.

Synopsis of Operator Commands

ASSIGN—assign iou refernce channel to symbol
CLEAR—clear system file data area
DISABLE—disable specified variable from changing
DUMP—dump drum program in condensed image
EDIT—edit (create/modify) drum program
ENABLE—enable specified variable to be modified
IOU—print value of raw inputs of selected IOU
(*)GRAPH—print a graph of specified history entries
HELP—print a short synopsis of the NSP commands
MODIFY—modify variable to specified value
PRINT—print iou, internal variable or system file
RELOAD—reload previously dumped program image
ROTATE—rotate drum to specified line number
SET—set system time/scan time
TRACE—trace rotation of selected drum
(*)—Optional feature.

A question mark (?) may be entered at any time to obtain a short message regarding the operational features of the system. This is handier then finding the answer in the manual.

$SV_n$ or $SX_n$ where:
V/X is the variable type
n is the variable subscript
The symbol must be constructed as follows:
must start with a letter;
must be from 2 to 8 characters in length
the second character must not be a digit;
the symbol must not match a reserved system word;
only the following characters may be in the symbol:
  letters A . . . Z
  digits 0 . . . 9
  special period (.), underscore (_) or percent sign (%).

If the symbol has already been assigned to another reference or is incorrectly constructed, an operator error will be generated. If the iou channel or system variable has already been assigned another symbol, the system will ask the operator to confirm that the reference is to be reassigned.

EXAMPLES

| | |
|---|---|
| ASSIGN T1,2 OUT. TEMP | assign input channel 2 of iou 1 to be a temperature input referenced as "OUT. TEMP" |
| A O2, 4 AC. CNTL | assign output channel 4 of iou 2 to be referenced as "AC. CNTL" |
| A | same as above, except system prompted |
| Channel Type (C D T V O SV or SX)? O | |
| IOU Number? 2 | |
| IOU Channel? 4 | |
| Symbol? AC. CNTL | |
| A SV1 USAGECTR | assign the symbol USAGECTR to V-variable 1 |

| Assign | ASSIGN iou-reference symbol |
| | ASSIGN sys-variable symbol |

The ASSIGN command causes the iou-reference or system V or X-variable to be referenceable by the specified symbol. This symbolic reference is the only means of referencing iou input/output channels by drum programs or other operator commands. This assignment must be performed before the iou channel is referenced.

The iou-reference is constructed as follows:

tii,cc where:
t is the channel type
input channels
  C=Counter Input
  D=Digital Input
  T=Temperature Input
  V=Voltage Input
output channels
  O=Output
ii is the iou number (1 . . . 16)
cc is the channel number
  input channel (1 . . . 32)
  output channel (1 . . . 16)

The system variable reference is constructed as follows:

Notes

1. If a symbol is already assigned to the channel or system variable, the system asks the operator to confirm the reassignment of the symbol by the message:

Symbol Already Assigned to Channel—Re-Assign!

The operator confirms this by keying in a 'Y' for yes, else the request is aborted.

2. If the operator attempts to duplicate a symbol already assigned in the symbol table, the request will be aborted and the operator alerted.

| Clear | CLEAR DRUM drum 1 ALL |
| | CLEAR ERROR |
| | CLEAR HISTORY page 1 ALL |
| | CLEAR MEMORY |
| | CLEAR VARIABLES |

The CLEAR command is used to initialize system files. These files are drum program(s), the error message file, the history file or all of memory. Whenever a CLEAR command is requested, the operator is asked to confirm the request by the prompt:
ARE YOU SURE?
a Y (yes) is required to enact the command.

The CLEAR command requires the operator to specify what system file is to be cleared. The various valid responses are:

*DRUM clear specified drum program(s). Either a specific drum (control drum 1 . . . 320, history drum H, message drum M, password drum P, conversion drum V or external drum X) or ALL drums is selected.
*ERROR clear the system error message file
*HISTORY clear either the selected page or all pages in the history file
*MEMORY clear all memory
*VARIABLES clear all iou and internal system variables to 0

The CLEAR MEMORY command performs a total system restart. This is the same as a virgin system restart with all internal data (including drum programs) destroyed. Needless to say, this should only be done after a catastrophic event.

EXAMPLES

| | |
|---|---|
| CLEAR HIST ALL | clear all history pages |
| ARE YOU SURE? Y | |
| C DRUM V | clear the conversion drum |
| ARE YOU SURE? Y | |
| CLEAR | clear all memory, system prompted |
| What? MEMORY | |
| ARE YOU SURE? Y | |

(note after the CLEAR MEMORY command the operator will be required to log onto the system again).

| DIsable | DISABLE variable-list |
|---|---|

The DISABLE command causes the NSP System to freeze the state of iou or internal variables from future application program modifications and external hardware changes. Only the operator may modify a disabled variable via the MODIFY command.

The variables must be ENABLEd before they are modifiable by drum programs.

EXAMPLES

| | |
|---|---|
| DISABLE HEATER4 | disable the iou channel referenced as "HEATER4" |
| DI F50 | disable internal control flag F50 |
| DI 4 | disable all input/output variables associated with iou 4 |
| DI F4, C | disable all internal counters and control flag 4 |
| DI ALL | disable all iou and internal variables |
| DI | same as above, except system prompted |
| Variable? ALL | |

| DUmp | DUMP drum |
|---|---|
| | DUMP ALL |

The DUMP command causes the NSP System to output the the selected drum programs in a condensed format to be stored on an external device (usually an attached computer). These stored drum programs may be quickly RELOADed in event of a catastrophic system crash.

The drum to be DUMPed is selected as follows:
*drum number
  1 . . . 320—control drum
  H—history drum
  M—message drum
  P—password drum
  S—symbol table
  V—conversion drum
  X—external drum
*ALL—all the above drums plus symbols and system data

EXAMPLES

| | |
|---|---|
| DUMP H | dump the history drum |
| DU ALL | dump all drums and system data |
| DU S | dump the system symbol table (assigned IOU points) |
| DU 4 | dump control drum 4 |
| DUMP | same as above, except system prompted |
| Drum? 4 | |

| EDit | EDIT drum |
|---|---|

The EDIT command selects the drum to be edited. Editing is the means by which the drum programs are constructed and modified. The selected drum must be one of the following:
1 . . . 320—control drum
H—history drum
M—message drum
P—password drum
V—conversion drum
X—external drum The operation of the editor is described in section 6.

EXAMPLES

| | |
|---|---|
| EDIT 4 | edit control drum 4 |
| ED M | edit the message drum |
| ED X | edit the external drum |
| ED | same as above, except system prompted |
| Drum? X | |

| ENable | ENABLE variable-list |
|---|---|

The ENABLE commands cause the NSP System to permit iou and internal variable states/values to change, thereby undoing the effect of the DISABLE command.

The enable command functions are not performed until the completion of the next PC/MS cycle.

EXAMPLES

| | |
|---|---|
| ENABLE HEATER4 | enable the iou channel referenced as "HEATER4" |
| EN F50 | enable internal control flag F50 |
| EN 4 | enable all input/output variables associated with iou 4 |
| EN C, F230 | enable all internal counters and internal control flag 250 |
| EN ALL | enable all iou and internal variables |
| ENABLE | same as above, except system prompted |
| Variable? ALL | |

| Graph | GRAPH |
|---|---|

The GRAPH command allows the operator to specify from 1 to 3 history variables to be plotted as a graph on the system console. The graph is plotted on a 72 unit wide grid, the first and last units are used to represent variable data outside the internal 70 point grid range. The 3 variables are denoted on the graph by the letters A, B and C. If two or more variables are to be plotted at the same graph position, an X will be plotted at that point on the graph. The time base for the graph is taken from the first variable (A) specified. It is assumed that the other specified variables will fall within this time base.

The graphics package is an optional feature on the AC256 system.

EXAMPLE

GRAPH
History Variable "A"
 Page # <cr to end>? 2
 Variable # (1 ... 8)? 3
 Low Limit? 0
 High Limit? 700
History Variable "B"
 Page # <cr to end>?

A graph of the data currently on file for history variable 3 in history page 2 will be plotted on the system console.

| Help | HELP |
|---|---|

The HELP command prints a short message (approxiametly 24 lines) concerning the operational features of the system. This message may also be obtained by typing a ? at any time.

EXAMPLE

HELP—print the system help message on the console
?—also prints the system help message

| Iou | IOU iou-number |
|---|---|

The IOU command prints the value of the inputs as received from the specified iou. These are the actual raw inputs and therefore no consideration is given to the usage of the input or whether it is enabled or not. The IOU command is helpful during the installation of the system for checking out the operation of the input subsystem on the attached ious.

The iou report contains the digital state, counter value and millivolt value for each channel on the selected iou. These values are those received on the last correct response to a data poll request.

EXAMPLES

| IOU 1 | print value of raw inputs on iou #1 |
|---|---|
| I | same as above, except system prompted |
| IOU Number? 1 | |

| Modify | MODIFY value variable-list |
|---|---|

The MODIFY command causes the contents of the selected variables to be changed to the specified value. The variable may be an iou input/output channel (referenced via symbolic name) or an internal variable (Counters, control Flags, V-variables or eXternals).

The value argument of the MODIFY command may be:
numeric value
ON, OFF, UP, DOWN, TRUE or FALSE The modify command only modifies the contents of a variable(s) and, specifically, does not disable it.

EXAMPLES

| MODIFY ON HEAT. CTL | set the iou channel referenced by "HEAT. CTL" to ON |
|---|---|
| M 9999 C | set all internal counters to 9999 |
| M 0 F200, C2, V | set all V-variables, internal flag 200 and inter counter 2 to 0. |
| M 10 C5 | set internal counter C5 equal to 10 |
| M | self prompting dialog of above example |
| Value? 10 | |
| Variable? C5 | |

| Print | PRINT DISABLED variable-list |
|---|---|
| | PRINT DRUM <drum 1 ALL> |
| | PRINT ERROR |
| | PRINT HISTORY  |
| | PRINT INDEX <drum 1 ALL> |
| | PRINT POINTER <drum 1 ALL> |
| | PRINT STATUS |
| | PRINT variable-list |

The PRINT command outputs the system data or status message onto the system console. The PRINT command requires the operator to specify what system file, variable or variable class is to be printed. In addition, an additional parameter may be required depending upon the file selected. The valid keyword file names are:

*DISABLED print the variables which are disabled within the specified list. The list may contain single variables, classes of variables (Counters, control Flags, etc) or all assigned variables on an IOU.

*DRUM print specified drum(s) on the console. Either a specific drums or all drums may be selected.

*ERROR print the last 10 system errors on the console. Each error consists of data and time the error was detected, type of error and attribute information concerning the cause of the error.

*HISTORY print the history file regarding a particular history page(s) or all 8 history pages. Each history page consists of upto 8 variables either snapshotted or averaged over the past 32 logging periods.

*INDEX print an index of drum comment lines on the console. Either specific drums or all drums may be specified.

*POINTER print the current drum line for a selected set or all control drums. The listing also includes the elapsed timers for the control drum. An asterick (*) is printed following the drum number of control drums residing in PROM.

*STATUS print the current system status of the NSP system. This includes unit identifier, date and time, free program blocks and a synopsis of system errors.

*variable print the current value of the selected set of variables. Individual variables, classes of variables or ALL variables may be selected.

EXAMPLES

| | |
|---|---|
| PRINT HISTORY 8 | print page 8 of the history file |
| PR ST | print the current system status |
| P D CTR1, X | print the disable/enable state or 'CTR1' and a list of disabled x-variables |
| P P 1,2,3 | print drum line pointers for control drums 1, 2 and 3 |
| P | same as above, except system prompted |
| System File or Variable(s)? P Drums? 1,2,3 | |
| PRINT CTR1 | print the iou variable assigned the symbol 'CTR1' |
| PRINT 4 | print data relating to all ASSIGNed iou variables |
| P C, CTR1 | print data relating to all internal counters and the iou variable assigned to 'CTR1' |
| PRINT | same as above, except prompted |
| System File or variable(s)? C, CTR1 | |

| | |
|---|---|
| REload | RELOAD |

The RELOAD commands cause the NSP System to accept DUMPed program drums from the console device and store them into program memory. Drum programs which are reloaded will be activated on the next scan with the line pointer set to 0.

The format of the input to the reload command is the condensed drum image generated by the DUMP command.

EXAMPLE

| | |
|---|---|
| RE | reload drum image(s) follow |

| | |
|---|---|
| ROtate | ROTATE line-number drum |
| | ROTATE line-number ALL |

The ROTATE command causes the specified control drum(s) to be rotated to the specified line. This is the command issued to start drum processing. The line-number specifies the drum line which is to be executed next. Either a list of control drums or all drum(s) may be specified.

The action field of the specified drum line is not executed until the next PC/MS cycle. All counters and timers for the drum are cleared. The drum may, of course, be moved from the specified line during the next cycle, depending on its exit specifications and emergency conditions.

Rotation of a drum to line 0, or a line not programmed on the drum, stops the drum from being processed. However, its emergency line may move it away from line 0, thereby starting it up again.

EXAMPLES

| | |
|---|---|
| ROTATE 1 5 | rotate control drum 5 to drum line 1 |
| RO 99 ALL | rotate all control drums to line 99 |
| RO 0 4,5 | rotate control drums 4 and 5 to line 0. (Causes drum execution to stop, unless a drum emergency condition is met). |
| ROTATE LINE? 0 DRUM? 4, 5 | same as above, except system prompted |

| | |
|---|---|
| Set | SET HISTORY <ON 1 OFF>  |
| | SET OUR <UP 1 DOWN> |
| | SET SCAN scan-time |
| | SET TIME time-array |

The SET command allows the operator to set various system parameters which control the execution of the NSP system. They are:

SET HISTORY <ON 1 OFF> activate (ON) or deactivate (OFF) the accumulation of history data for a specific or ALL history pages. Setting history accumulation ON, automatically sets internal flag 273 . . . 280 ON, depending on the history page activated.

SET OUR <UP 1 DOWN> set the current system hour 1 hour ahead (UP) or 1 hour back (DOWN), usually to adjust for daylight savings time.

SET SCAN scan-time set the time interval (in seconds) between the NSP processing scans. A time interval of O signifies a variable scan interval, with processing scans occurring as soon as the processing for the previous scan has been completed.

SET TIME time-array set the system time to be used within the NSP system. The format of the time-array is:

YY MTH DD WKD HH MM SS where:
YY is the year since the start of the century
MTH is the current month using a standard 3 character abbreviation (JAN . . . DEC)
DD is the day of the month
WKD is the day of the week using a standard 3 character abbreviation (MON . . . SUN)
HH is the 24 hour time
MM minute
SS second

Examples

| | |
|---|---|
| SET H ON ALL | start collection of history data for all history pages. |
| SET OUR UP | bump system time by 1 hour |
| SET SCAN 5 | set processing scan to 5 seconds |
| SET TIME 81 JAN 15 THU 13 20 0 | set system time to JAN 15, 1981 13:20:0 (1:20 PM) |
| S S 0 | set continuous processing scan mode |
| SET What? SCAN Time? 0 | same as above, except system prompted |

| Trace | TRACE <OFF> drum |
|---|---|
| | TRACE <OFF> ALL |

The TRACE command is used during the testing of control drum programs to find possible problems and insure the correctness of execution of the drum program. Drum tracing refers to the monitoring of changes in a drum line being executed. If a change in the drum line being executed is made, a message is printed on the system console. The optional OFF argument is used to disable TRACEing on the specified drum(s).

EXAMPLES

| TRACE 5 | trace execution of control drum 5 |
|---|---|
| T OFF 5,6 | turn off tracing of control drums 5 and 6 |
| T OFF ALL | turn off tracing of all control drums |
| TRACE OFF | same as above, except prompted by the system |
| Drum? ALL | |

NSP COMMUNICATION PROTOCOLS

This appendix discusses the various intelligent communications protocols employed within the NSP network. These protocols are:
C-Bus communications to an intelligent remote device;
L-Bus communications between the Comm Processor and IOUs;
X-Bus communications between NSP Systems within the NSP network.

C-BUS-INTELLIGENT REMOTE DEVICE COMMUNICATIONS

The NSP supports a simple message-oriented communications protocol for transmitting text blocks between an NSP System and an intelligent remote device over the C-Bus. The communications protocol utilizes simple error detection and correction techniques to efficiently transmit text data between the two system. This communications protocol is employed for all transmissions between an NSP System and a remote device "Logged on" via the &R command.

COMMUNICATIONS PACKET FORMAT

The format of the communications packet is:

STX Text . . . Text ETX CKS

Where:
STX—Start of Text Indentifier (Hex 02)
TEXT—ASCII Message being Transmitted (The data and format of the data is the same as for standard operator commands.)
ETX—End of Text Indentifier (Hex 03)
CKS—Message Checksum
  6-bit additive checksum of all characters within the Text Message, transmitted as 1 ASCII character with both bits 7+8 set.

COMMUNICATION PROTOCOL CONTROL CODES

The communication protocol codes are:
ACK—Packet Acknowledgement (Hex 06)
NAK—Packet Negative Acknowledgement (Hex 15)
EOT—End OF Transmission—Log Off (Hex 04)
ESC—Abort Transmission-Log Off (Hex 1B)

SEQUENCE/RESPONSE DIAGRAM

Figure 27:
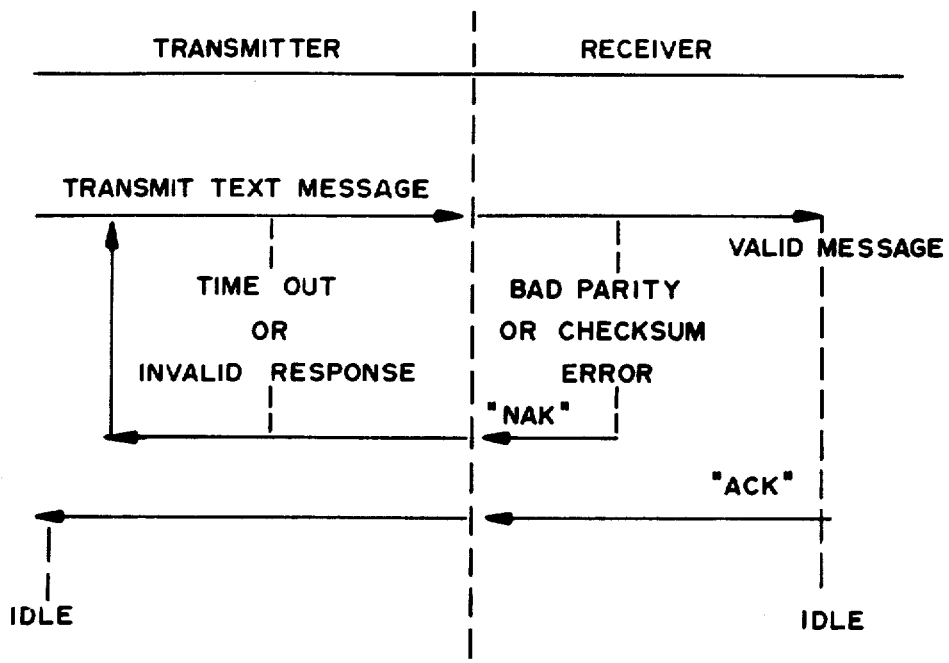
FIGS. 27, 28, 29, and 30 are diagrams illustrating communication protocols within the system of the invention.

C-Bus communications are over a full-duplex communications line and operate in a block per message mode. After a successful logon via the "&Rxxxx" command, the following diagram depicts further communication. Note that either the NSP System or remote device may be the transmitter and, in fact, both may be transmitting simultaneously. (FIG. 27)

Notes

1. The NSP maintains an interrecord time-out of 10 seconds. If neither an ACK or NAK has been received within that time period, the last data block will be retransmitted until an appropriate code is received, or until three retries attempted.
2. It is the sole responsibility of the remote device to insure that duplicate blocks are not inadvertently received.

L-BUS-COMM PROCESSOR TO IOU COMMUNICATIONS

The L-Bus supports a high-speed data link between the Comm Processor and the IOU for the transfer of collected inputs and controlled outputs. Because of the high band width required to timely communicate all the necessary data, all communication is in a binary data format. L-Bus communication is in a master/slave environment; the Comm Processor is the master; the IOU is the slave.

It should be noted that L-Bus communications only employ error detection not correction techniques. That is, messages received in error are ignored at the receiving device with the last correct data message being used for subsequent computation.

The Comm Processor employs the following logic to control communications with the IOU:
1. At the start of a new PC/MS scan (as directed by the Drum CIU), a Stop Collection request is transmitted to all IOU's. The IOU saves the collected inputs for subsequent transmission to the Comm CIU. This insures that all IOU inputs are over the same time base;
2. Poll each IOU collecting the stored input data;
3. Transmit previously buffered output commands to each IOU.

COMMUNICATION MESSAGE FORMATS

IOU TO COMM PROCESSOR MESSAGE

The IOU generated message is sent only in response to a Comm Processor poll request. The format of the IOU message is:

| Byte | Name | Description |
|---|---|---|
| 1 | STX | STX - Start of Message (Hex 01) |
| 2 | COUNT | Count of bytes in message, excluding STX, Count and Checksum. |
| 3,4 | FLAG | Two-byte status indicator denoting output failures at the IOU. Each bit represents an output, with the most significant bit representing output channel 16. |
| 5 | NUMBER | IOU Serial Number. |
| 6...N | DATA | IOU collected inputs consisting of IOU bytes for each input monitored. The first 16-bits are the analog raw voltage value, the next 8-bits are the number of transitions detected. The most significant bit of the first 16-bits specifies the discrete state of |

| Byte | Name | Description |
| --- | --- | --- |
| | | the input (on & off). |
| N + 1 | ETX | ETX - End of Text (Hex 03) |
| N + 2 | CHECKSUM | One byte checksum of the Count through the ETX. The Checksum is the 'exclusive or' of these bytes. |

COMM PROCESSOR TO IOU MESSAGE

The Comm Processor generated message is sent to an IOU to signal the outputs to be asserted. The format of this message is:

| Byte | Name | Description |
| --- | --- | --- |
| 1,2 | SELECT | The Select field signifies the IOU to receive this data. Both bytes are identical and must be received without error for the IOU to continue. The Select is a hex (Ex) where "x" is the IOU number. |
| 3 | COUNT | Count of TYPE and DATA Bytes in Message. |
| 4 | TYPE | Type of Message 00 - Output Specification |
| 5...N | DATA | Output settings for the IOU. Each output consists of 2 byte values. These values contain either discrete digital outputs (ON/OFF), timed pulsed digital outputs (time in 1/10 of a second pulses the output should be turned on) or simple numeric values multiplied by 10. For digital outputs the following conventions apply. If the value is 0 or negative, the output is permanently OFF. If the value is a positive, the positive integer represents the number 1 seconds the output is to be set ON. If the value is 16383 x'7FFF' the output is permanently ON. |
| N + 1 | ETX | ETX - End of Text (Hex 03) |
| N + 2 | CHECKSUM | One byte checksum of the Count through the ETX. The checksum is the 'exclusive or' of these bytes |

COMMUNICATION PROTOCOL CONTROL CODES

The L-Bus Protocol Control Codes are:
Stop Collection—the stop collection IOU request is two hex (CC)s. The stop collection command requests the IOU to buffer all collection information for subsequent transmission to the Comm CIU.
Poll—the poll IOU request is two hex (Fx)s, where "x" is the IOU number. Both poll bytes must be received by the IOU before a response is generated.

SEQUENCE/RESPONSE DIAGRAM

Figure 28:
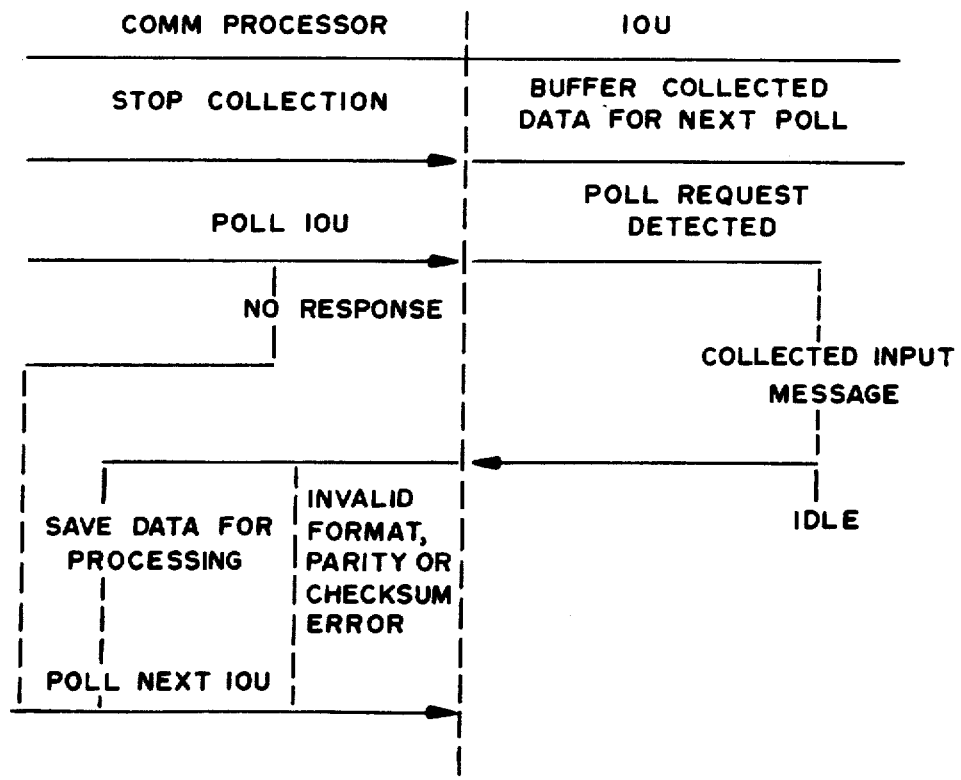
Figure 29:
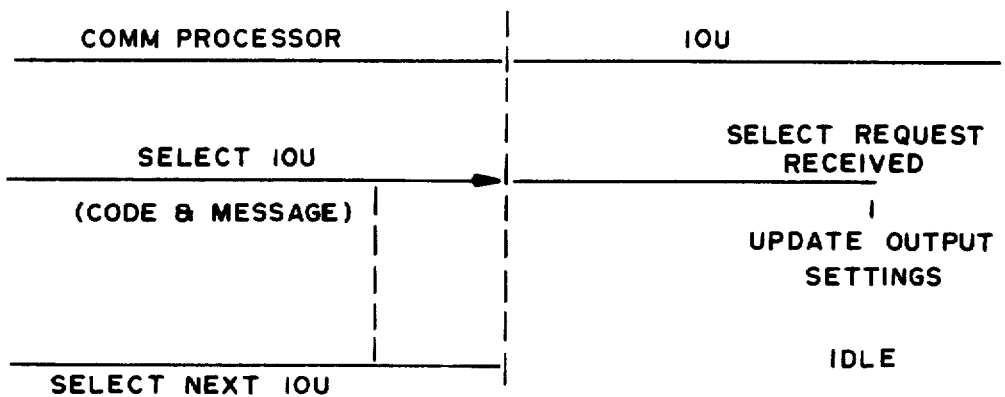

L-Bus communications are performed in a master/slave environment controlled by the Comm Processor. FIG. 28 depicts the control flow of L-Bus communications. FIG. 29 depicts the IOU select processing of the Comm Processor.

Note

All transmissions are checked for format, parity and checksums. Messages in error are ignored. The previously transmitted data block will be used for processing.

X-BUS-NSP SYSTEM TO NSP SYSTEM

The X-Bus supports a low-speed, half-duplex link between NSP Systems within an NSP network. The X-Bus is used to share external (X) variables between the NSP System processing units.

The protocol between the X-Bus units is in a data time-plexed environment. That is, each X-variable is deticated a time window when it is to be transmitted over the X-bus. The NSP system generating the X-variable is reponsible for transmitting the data over the X-bus in its unique time slot. Other NSP systems should be monitoring the line to collect the shared variable.

The current time slot is 0.5 seconds for each X-variable. This is considerably less if all X-variables are assigned.

COMMUNICATIONS MESSAGE FORMAT

The format of the shared external variable message is:

| Byte | Name | Description |
| --- | --- | --- |
| 1 | NUMBER | X-Variable Number (1 ... 64). |
| 2...4 | DATA | X-Variable value (in floating point). |
| 5 | LRC | Message LRC. Exclusive Or of the variable number and value bytes. |

SEQUENCE/RESPONSE DIAGRAM

Figure 30:
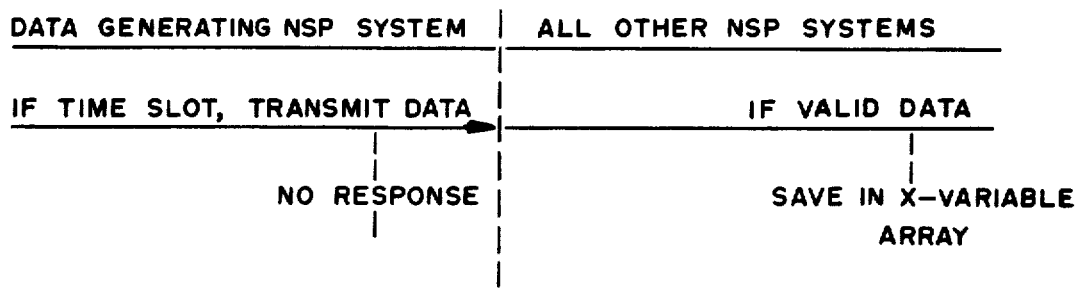

The sequence response diagram of the X-bus is shown in FIG. 30.

Note

Only error detection is employed. If the data received by the master or monitoring NSPs contains a protocol, format, parity or checksum error, the entire message is ignored. The previously collected shared variables will be used in subsequent processing.

SYSTEM ERROR MESSAGES

OPERATOR ERROR MESSAGES

The following error messages may occur during interaction with the operator. These error messages are surrounded by question marks (?) and accompanied by the data element in error [enclosed in square brackets] and a bell. In all cases, the command was aborted and must be re-entered to be executed.

ACCESS DENIED

The operator is not permitted to perform the command entered. This is determined by the access-code associated with the operator's password.

AMBIGUOUS KEYWORD

The keyword specified was not unique to the available command set. Re-enter a command using a longer, hence more unique, abbreviation.

BAD NUMBER

An invalid number was entered. Either the number contained more than four digits or a floating point number was specified where an integer is required.

BAD RELOAD BLOCK

During program reload, an illegally formatted data block was detected. The drum line in question is not reloaded into the system.

BINARY OPERATOR EXPECTED

During drum program editing, the expression entered requires a binary operator (+, −, *, /, etc) to be complete.

DUPLICATE SYMBOL ASSIGNMENT

During the ASSIGN command, the operator attempted to specify a symbol already assigned to another IOU channel.

ENTRY OUT OF RANGE

One of the arguments entered was out of range for the selected command. Recheck command syntax and re-enter.

EXPRESSION TOO COMPLEX

During editing, the specified equation is too complex to be solved by the NSP System. Reduce the equation and re-enter.

INVALID DRUM NUMBER

Drum Number entered is not valid for system. Correct and re-enter command.

INVALID KEYWORD

Keyword is invalid. Look up correct keyword and re-enter.

INVALID LINE NUMBER

Line Number entered is either not supported by the system, or, in certain cases, not programmed on the selected drum. Correct and re-enter command.

INVALID SYMBOL

The symbol was not constructed from the rules applying to NSP symbol format. Correct error and re-enter line.

INVALID VARIABLE

A variable was required for the selected command. Recheck command syntax and re-enter the command.

LINE LOST—PLEASE ZAP AND RETYPE

The object code for the specified line is in error. The line must be "zapped" and re-entered.

LINE TOO LONG

During editing, a line was created which is longer than the allowable maximum. Shorten program line and re-enter.

PROGRAM AREA FULL!!

During editing, the line previously entered could not be stored because the application program area was exhausted. Other line(s) must be zapped before the line can be stored into the application program area.

REQUIRED ENTRY MISSING

A keyword argument is required for the specified command. Recheck command syntax and re-enter the command.

SYNTAX ERROR

The command syntax or the syntax of the program line is incorrect. Re-check command and syntax and re-enter command or program line.

VARIABLE OUT OF RANGE

The Variable Subscript (specifier) was out of limits for the variable type referenced. Correct and re-enter command or program line.

VARIABLE OR UNARY OPERATOR EXPECTED

During program drum editing, the entered expression requires a variable or unary operator (−, $ or ~) as the next element of the expression. Instead a binary operator was detected. Correct the expression and re-enter.

SYSTEM ERROR MESSAGES

The following error messages may be printed upon initiation of the Print Error (PE) command. The general format of all System Error Messages is:

DDDD ERROR, TYPE—TT @ LLL X=XXXX
B=BB TIME DD: HH: MM: SS

Where:
DDDD=Alphabetic Error Descriptor Code (INTP, PROM, CPU, etc.)
TT=Type of Error Code
LLLL=Program Location Generating Error Message
XXXX=X-Register at time of error. (Sometimes contains encoded data).
BB=B-Register at time of error. (Sometimes contains encoded data).
DD: HH: MM: SS=Time of Error, Day of Month, Hour, Minute and Second A synopsis of the Error messages currently logged may be obtained via the Print System Status (PS) command. The Zap Error (ZE) command clears all logged error messages.

CPU—CPU Performance Error

This error denotes that a problem was detected by the CPU Operational Test. The X-Register indicates the address within the CPU test that the error was detected. This should be considered a fatal system error. System integrity is questionable.

Suggested Course of Action

Contact your Andover Controls Corporation representative regarding this problem.

FAIL—System Failure/Restart

This error indicates the system has been restarted because of:
External System Power Failure,
External System Power Recovery,
Operator initiated system start-up (Z&) command,
Watch Dog Timer Error.

Suggest Course of Action

All error reasons except the Watch Dog Timer Error are informational only and should be ignored. Restarts attributed to Watch Dog Timer Failures should be reported to your Andover Controls Corporation representative.

Failure Error Codes

50—System Restart
51—System Power Failure

INTP—Interpreter Detected Error

This error type is critical and denotes that the interpreter detected a corrupted drum program line. The corrupted drum line is specified in the X-Register. The drum line will be exempted from further execution and the drum (if a control drum) will be parked at line O.

Suggested Course of Action

The best course of action is to reload all the control drum programs. If that is not possible, the drum line in error may be zapped and re-entered.

Interpreter Error Codes

01—Variable Decode Error
02—RPN Stack Error (Overflow/Underflow)
03—Drum/Line Integrity Error
04—Drum Line Format Error
05—Control Drum Operation Decode Error

OVRN—Data Overrun Error

This error indicates that the start of a PC/MS cycle was delayed because the last cycles data has not begun being processed. This error may be caused by system start-up, operator interaction or too small PC/MS Scan Time.

Suggested Course of Action

If the error was caused by system startup or operator interaction, the error should be ignored. Other causes of the Overrun Error indicate the PC/MS Scan Time should be increased.

INFORMATIONAL/STATUS MESSAGE

The following messages are printed at system Log-on, during the Print System Status (PS) command or with some tape commands:

ENTER SYSTEM TIME

The system time has not been entered. The operator should issue the Set Time command to remedy the situation.

PRG BLOCKS FREE xxx xxx Application Program Blocks remain unused. Normally, one drum line requires one program block for storage.

SYSTEM START-UP ON UNIT xxxx

NSP System xxxx has been restarted.

SECURITY

The NSP System maintains three levels of security to prevent unauthorized tampering with the system. They are:
1. Device Security,
2. User Security,
3. Command Security.

These three forms of security are described below.

DEVICE PASSWORD SECURITY

This is the first level check for a user to gain access to a particular device. Until this code is correctly entered no communications may be made with the device.

USER PASSWORD SECURITY

After the user gains access to the selected device, he must then enter his personal password to perform further communications. A user will be given four attempts to enter a valid password (six alphanumeric characters) before communication is terminated. If communication is terminated, the user must relog onto the device. Once a user successfully logs onto a system, his identification is saved for logging purposes and he can execute a preselected set of commands (see below).

The personal passwords are specified both in the system configuration prom and by the Passowrd Drum.

COMMAND SECURITY

After a user has successfully logged onto a system, a preselected set of commands is enabled for his use. All other commands are prohibited from execution. The set of valid commands is selected on the basis of the access-code associated with his user password. This access-code enables the user to execute commands as defined below:

1 = Print Information & System Monitoring Commands only,
2 = Above, plus Program Editing & Diagnostic Commands,
3 = Above, plus access to Password Drum.

Access-code 3 is only selectable by the passwords set the system configuration prom. This access-code is the only access-code which permits access to the password drum for the purpose of specifying or displaying other personal passwords.

It will thus be seen that the objects set forth above, among those made apparent from the preceding description, are efficiently attained and since certain changes may be made in the above system, and in carrying out the above functions without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention what we claim as new and desire to secure by Letters Patent is:

1. A programmable controller system comprising:
   a plurality of central processing units;
   a data exchange bus interconnecting each of said central processing units for the transmission and receipt of data between all of said central processing units;
   each of said central processing units being adapted to transmit preselected data assigned to said unit to each of said other central processing units along said data exchange bus;
   each of said central processing units including a memory for storage of data;
   said memory in each of said central processing units being adapted to store all preselected data assigned to that unit and all data transmitted by each of said other units along said data exchange bus such that all of said preselected data assigned to each of said plurality of units is stored in every one of said units.

2. A programmable controller system as claimed in claim 1 including at least one input/output unit associated with each of said central processing units and a local bus connecting each of said input/output units to its respective central processing unit for transmission of data therebetween such that data received from said input/output unit by said associated central processing unit is transmitted to each of the other of said central processing units along said data exchange bus.

3. The system of claim 1 wherein said data exchange bus is an asynchronous bus.

4. The system of claim 1 wherein each of said Central Processing Units comprises a console port for data exchange connection to peripheral equipment, and C. a console bus to which each of said console ports in each of said Central Processing Units is connected, whereby peripheral equipment connected to the console port of one of said Central Processing Units may communicate with each of said Central Processing Units.

5. The system of claim 4 wherein said console bus has a different protocol than said console ports, and D. a console port converter connected between each said port and said console bus at each of said Central Processing Units.

6. The system of any one of claims 1, 3, 4 or 5, wherein each of said Central Processing Units controls a plurality of output circuits in response to a plurality of input conditions.

7. The system of any one of claims 1, 3, 4, or 5, and

E. a plurality of Input/Output Units, each controlling a plurality of output circuits and responsive to a plurality of input conditions, and each of said Central Processing Units having connected thereto a local bus and a plurality of said Input/Output Units connected to each local bus.

8. The system of claim 7 wherein at least one of said Input/Output Units is provided with a plurality of identical electrical inputs and repetitively records an analog electrical condition at all of said inputs and whether said analog condition has become greater or lesser than at least one preselected value.

9. The system of claim 8 wherein at least one Input/Output Unit also records the number of times said condition has become greater (or lesser) than one of said preselected values since the last time it transmitted its recorded information to said Central Processing Unit connected to the same local bus.

10. The system of claim 9 wherein at least one of said Input/Output Units comprises a digital filter utilizing the prior recorded analog value and the new analog value to arrive at a new recorded value.

11. A programmable controller system for monitoring a plurality of input conditions and input events and for controlling a plurality of output conditions and output events in accordance with a stored control program and said input and output conditions comprising:

A. a plurality of identical electrical inputs, and
   B. a computer system connected to said plurality of electrical inputs,
      a. said computer system adapted to repetitively record for each of said inputs the value of an identical analog condition at all of said inputs and a binary condition defined by whether said analog condition has become greater or lesser than at least one preselected value, and
      b. said computer system being user programmable to select said analog condition or said binary condition derived therefrom as an input condition or event.

12. The system of claim 11 wherein said computer system comprises a conversion table for converting the values of said analog condition according to at least one preselected function under user control.

13. The system of claims 11 or 12 wherein said computer system further comprises a digital filter for smoothing the values of said analog condition that are recorded.

14. The system of claim 13 wherein said filter utilizes the prior recorded filtered value and the existing value to compute the new value to be recorded.

15. The system of claim 14 wherein the algorithm of said filter has the formula $$\text{Filtered}_1 = \left( \frac{|\text{Filtered}_0 - \text{Raw}_1|}{2^k} \right) + \text{Filtered}_0$$

Where:
   $\text{Filtered}_1$ is the newly computed filtered value, i.e., the value to be recorded;
   $\text{Filtered}_0$ is the filtered value from the prior scan, i.e., the previously recorded value;
   $\text{Raw}_1$ is the newly sampled unfiltered value; and
   K is the filter factor.

16. The system of claim 11 or 12 wherein said computer system further records the number of times said binary condition has changed from one value to the other.

17. The system of claim 11 wherein said binary condition is determined by two preselected values.

18. A programmable controller system comprising:
   A. a Central Intelligence Unit for executing a control program,
   B. a local bus connected to said Central Intelligence Unit,
   C. a plurality of electrically identical inputs,
   D. a plurality of outputs,
   E. a plurality of Input/Output Units to which said inputs and outputs are connected
      a. said Input/Output Units being repetitively polled at a polling rate by said Central Intelligence Unit as to the condition of their inputs,
      b. each of said Input/Output Units recording repetitively for each of said inputs, at a greater rate than said polling rate, an identical analog condition and a binary condition defined by whether said analog condition has become greater or less than at least one predetermined value, both said records being transmitted to said Central Processing Unit when polled.

19. The system of claim 1 wherein said at least one Input/Output Unit also records with respect to each of said inputs the number of times said binary condition has changed from one value to the other.

20. The system of claims 18 or 19, wherein said Central Intelligence Unit is adapted to execute a user program which may call up a preselected type of information recorded for each of said inputs.

21. The system of claim 18 and a digital filter executed in at least one of said Input/Output Units for smoothing the value of said analog condition that is recorded.

22. The system of claim 21 wherein said filter utilizes the prior recorded filtered value and the existing value to compute the new value to be recorded.

23. The system of claim 22 wherein the algorithm of said filter has the formula $$\text{Filtered}_1 = \left( \frac{|\text{Filtered}_0 - \text{Raw}_1|}{2^k} \right) + \text{Filtered}_0$$

Where:

Filtered$_1$ is the newly computed filtered value, i.e., the value to be recorded;

Filtered$_0$ is the filtered value from the prior scan, i.e., the previously recorded value;

Raw$_1$ is the newly sampled unfiltered value; and

K is the filter factor.

24. In a programmable controller system for monitoring a plurality of input conditions and input events and for controlling a plurality of output conditions and events in accordance with a control program and said input and output conditions, comprising:
  A. an input unit comprising,
    a. a plurality of input terminal pairs,
    b. an analog to digital converter,
    c. multiplex means for connecting each of said input terminal pairs in turn to said analog to digital converter,
    d. a first table for storing the digital value of an identical electrical condition at each of said terminal pairs,
    e. a second table for storing a first binary value when the value of said condition increases to above a predetermined value and the opposite binary value when the value of said condition decreases to below a predetermined value, and
  B. a Central Intelligence Unit connected to said input unit for storing a control program and providing for user selection of whether the digital value stored in said first table or the binary value stored in said second table shall be used by said program as the input condition of the corresponding input terminal pair.

25. A programmable controller system as defined in claim 24, and said input unit forther comprising:
  f. a third table for storing the number of times each of the binary values stored in said second table has changed its value;
said Central Processing Unit further providing for user selection of the number stored in said third table as the input condition of the corresponding input terminal pair that shall be used by said program.

26. The system defined in claim 24 or 25 and said input/output unit further comprising:
  g. means for biasing said input terminal pairs to a common voltage.

27. The system defined in claim 26 wherein one of the terminals of each of said input terminal pairs are connected together.

28. A system as defined in claim 24 and
  C. at least a second identical input unit connected to said Central Intelligence Unit, and
said Central Intelligence Unit further comprising means for repetitively transferring the user chosen values in said tables to said central processing unit.

29. A system as defined in claim 28 wherein the entire contents of said tables are transferred.

30. A programmable controller system comprising:
  A. a data exchange bus; and
  B. a plurality of Central Processing Units connected to said data exchange bus,
    a. each of said Central Processing Units comprises a memory and has assigned to it the transmission of one or more data exchange variables on said bus,
    b. a plurality of said Central Processing Units storing all of said data exchange variables in their memories, and
    c. a plurality of Input/Output Units, each controlling a plurality of output circuits and responsive to a plurality of input conditions, and each of said Central Processing Units having connected thereto a local bus and a plurality of said Input/Output Units connected to each local bus, wherein at least one of said Input/Output Units is provided with a plurality of identical electrical inputs and repetitively records an analog electrical condition at all of said inputs and whether said analog condition has become greater or lesser than at least one preselected value.

31. The system of claim 30 wherein at least one Input/Output Unit also records the number of times said condition has become greater (or lesser) than one of said preselected values since the last time it transmitted its recorded information to said Central Processing Unit connected to the same local bus.

32. The system of claim 31 wherein at least one of said Input/Output Units comprises a digital filter utilizing the prior recorded analog value and the new analog value to arrive at a new recorded value.

* * * * *